(12) United States Patent
Suzuki et al.

(10) Patent No.: US 6,480,297 B1
(45) Date of Patent: Nov. 12, 2002

(54) IMAGE FORMING APPARATUS

(75) Inventors: Tomohiro Suzuki, Hachioji (JP); Kunio Shijo, Hachioji (JP); Seiichi Watanabe, Hachioji (JP); Hirohiko Yamazaki, Hachioji (JP); Masaki Kakutani, Hachioji (JP); Kensaku Ogiwara, Hachioji (JP); Satoru Kashiwada, Hachioji (JP); Takayuki Suzuki, Hachioji (JP); Koichi Kitamoto, Hachioji (JP); Kazuo Izumi, Hachioji (JP); Yasuhiko Yamaguchi, Hachioji (JP); Akihiko Oda, Hachioji (JP); Toru Ichiki, Hachioji (JP); Kenji Okuyama, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/425,982

(22) Filed: Oct. 25, 1999

(30) Foreign Application Priority Data

Oct. 28, 1998 (JP) ............................................ 10-307668

(51) Int. Cl.$^7$ .............................................. G06K 15/00
(52) U.S. Cl. ........................................ 358/1.16; 358/1.1
(58) Field of Search ................................. 358/1.1, 1.11, 358/1.13, 1.16, 467, 470, 404, 444, 468, 296, 1.14, 401, 400; 399/1, 2, 8, 9, 13, 411, 27, 29

(56) References Cited

U.S. PATENT DOCUMENTS 6,195,170 B1 * 2/2001 Mizutani et al. ........... 358/1.14
6,359,698 B1 * 3/2002 Kawaguchi ................ 358/1.16

* cited by examiner

Primary Examiner—Arthur G Evans
(74) Attorney, Agent, or Firm—Frishauf, Holtz, Goodman & Chick, P.C.

(57) ABSTRACT

An image forming apparatus includes: an image reading device for reading an image of a document to obtain image data; a data communication device connected with a computer for receiving an image data from the computer; a facsimile device connected with a telephone line for receiving an image data through the telephone line; an image memory for storing the image data obtained through the image reading device, the image data obtained through the data communication device, and the image data obtained through the facsimile device; an image memory controller for mediating an access to the image memory in a predetermined priority order for storing and reading the image data among the image reading device, the data communication device, and the facsimile device; and an image forming device for forming the image according to the image data controlled by the image memory controller.

9 Claims, 36 Drawing Sheets

IMAGE FORMING APPARATUS

BACKGROUND OF THE INVENTION

The present invention relates to an image forming apparatus which is suitably applied to a hybrid machine provided with a copy function, a facsimile function and a printer function.

Particularly, an image memory for storing the image data obtained from an image recording means, the image data obtained from a facsimile means, and the image data obtained from a data communication means, is provided, and the image memory is used in common by at least above-described three means, and the image formation and the image communication can be carried out during the document image reading, or the image reading and the image communication can be carried out during the image formation, or the image reading and the image formation can be carried out during the image communication, and the image memory is made so that it can be effectively used.

Recently, a digital copier by which the image formation is conducted based on the image data obtained from the document image, comes to be used. In this copier, the image information of the document is read by a scanner, or the like, and the image information of the document is temporarily stored in an image memory. Image processing such as image reduction, enlargement, and rotation, is conducted on the image information stored in the image memory, corresponding to the request of customers. An image based on the image data which is image-processed herein, is formed on a predetermined transfer sheet by an image forming means (printer). As the result, the document image can be copied.

Further, a hybrid machine in which the above-described digital copy function, facsimile function and printer function are compounded, and a printer is used in common by these three functions, and an image reading means (scanner) is used in common by a copy function and a facsimile function, is on the market.

FIG. 36 is a block diagram showing an example of a structure of this type of hybrid machine 10. The hybrid machine 10 shown in FIG. 36 has a data bus 1. A communication modem 2, coding section 3, scanner 4, image processing section 5, data communication section 6, image memory 7, printer 8 and control section 9 are connected to this data bus 1. An operation section 9A and a display section 9B are connected to this control section 9. In this type of hybrid machine 10, the image memory 7 is divided into a copy area 7A and a FAX area 7B.

In the copy function, the copy area 7A is used, and the document image data read by the scanner 4, or the like, is stored after being compressed. In the facsimile function, the Fax area 7B is used, and when the image data sent from the remote station is received by the communication modem 2, it is decoded in the coding section 3, then, recorded in the FAX area 7B allotted for the facsimile function.

In the printer function, the copy area 7A is used in common and when the image data from a computer is received by the data communication section 9, after predetermined image processing is carried out on the image data in the image processing section 5, the processed image data is stored in the copy area 7A. Relating to the copy area 7A and the FAX area 7B, when the memory capacity of these two area are compared to each other, in many cases, a larger capacity is allotted to the copy area 7A, although it is related to the working property thereof.

After the image data stored in the image memory 7 is expanded, predetermined image processing is conducted on the image data in the image processing section 5, then, the processed image data is outputted to the printer 8. In the printer 8, the image data is transferred onto the recording sheet for one page unit, and an image is formed.

Incidentally, in the hybrid machine 10 having the copy function, the facsimile function and printer function, it is very inconvenient that, when one function is used, the other functions can not be used. Accordingly, it is preferable that compounded each function can be independently operated. Even if these functions can not be simultaneously operated in the structure of the hybrid machine, it is important that the function by the operation input of the operator is conducted prior to other functions, thereby, no stress is given to the operator. This priority function is designated so-called multi-access or dual access.

Under this multi-access, there is a case where, after facsimile receiving has been completed, the communication report is automatically printed out, or after its completion, the image data received from the computer is printed out. There is a case where, while the print out is being conducted, a request of emergency copy by the operator is designated to the control section 9 through the operation section 9A. For this request, it is necessary that the print out operation is sopped once, and the copy requested by the operator can be conducted being prior to the other operation.

Further, it is necessary that setting operation of the operation conditions for FAX transmission or document reading can be conducted independently of the print out operation or FAX communication even while these are being conducted. Further, when a print job for each function is overlapped with print jobs for others, it is necessary to print out from the highest urgency job prior to others.

However, according to the conventional type hybrid machine 10, the copy area 7A is allotted to the copy function and printer function, and the FAX area 7B is allotted to the facsimile function, and the image data is written or read corresponding to execution of the facsimile function, copy function, and printer function by the control section 9.

Accordingly, when there is a request of image formation and image communication during document reading, it is necessary to mediate to which function the data bus 1 is given and write the image data into the image memory 7, or read the image data from the image memory 7, corresponding to the request for use of the data bus 1 for the execution of the print function and the facsimile function. Thereby, the mediation processing in the control section 9 is complicated, and a burden for the control is increased.

Accordingly, it is difficult to conduct the image formation and image communication during document reading, to conduct image reading and image communication during image formation, or to conduct image reading and image formation during image communication. In this connection, the following methods are also considered to lighten the bus mediation processing of the control section 9, the bit width of the data bus is extended, or a high performance control section 9 is provided, however, it results in cost-up of the hybrid machine 10, which is disadvantageous.

SUMMARY OF THE INVENTION

Accordingly, the present invention solves the foregoing problems and an object of the present invention is to provide an image forming apparatus by which the image formation and the image communication can be carried out during the document image reading, or the image reading and the image communication can be carried out during the image formation, or the image reading and the image formation can be carried out during the image communication, and the image memory can be effectively used.

In order to solve the above-described problems, the image forming apparatus of the present invention has: an image reading means for reading a document image and obtaining the image data; a data communication means for being connected to a computer and receiving image data from the computer; a facsimile means for being connected to a telephone line and receiving the image data; an image memory which is used in common for storing the image data obtained from the facsimile means, image data obtained from the data communication means, and image data obtained from the image reading means; and an image forming means for forming an image based on the image data stored in the image memory, and the image forming apparatus is characterized in that the image forming means is made to be used based on a predetermined priority level of respective functions embodied by a combination of the image reading means, data communication means, facsimile means, and image memory.

According to the image forming apparatus, when the image formation is conducted based on the image data stored in the image memory, for example, the image data is mediated by the image storing control means, and thereby, the image forming means is made to be used based on a predetermined priority level.

For example, the copy function realized by the image reading means, image memory and image forming means, and the printer function realized by the data communication means, image memory, and image forming means, competes with each other, the image forming means is made to be used by the copy function prior to the other function, and the image data by the data communication means is temporarily stored in the image memory. Further, when the above-described copy function competes with the facsimile receiving function realized by the facsimile means, image memory and image forming means, the image forming means is made to be used by the copy function prior to the other functions, and the image data from the remote station by the facsimile means is received and can be stored in the image memory. Incidentally, when the print function competes with the facsimile receiving function, the image forming means can be made to be used based on a predetermined priority level.

Accordingly, the image formation and image communication can be carried out during the document reading, or the image reading and image communication can be carried out during the image formation, or the image reading and image formation can be carried out during the image communication. Thereby, a hybrid machine which has very good operability and excellent flexibility, can be structured.

Further, according to the image forming apparatus of the present invention, because the image memory is used in common, when the image reading means, facsimile means, or data communication means does not use the memory area, or even when these means use the memory area, when the rate of the use of the memory is low, the empty memory area can be used with fluidity by the image reading means, facsimile means, or data communication means which are operating now. Accordingly, the image memory can be effectively used.

DETAILED DESCRIPTION OF THE PREFERRED EMBODIMENT

Referring to drawings, an image forming apparatus as an embodiment of the present invention will be described below.

(1) The First Embodiment

Figure 1:
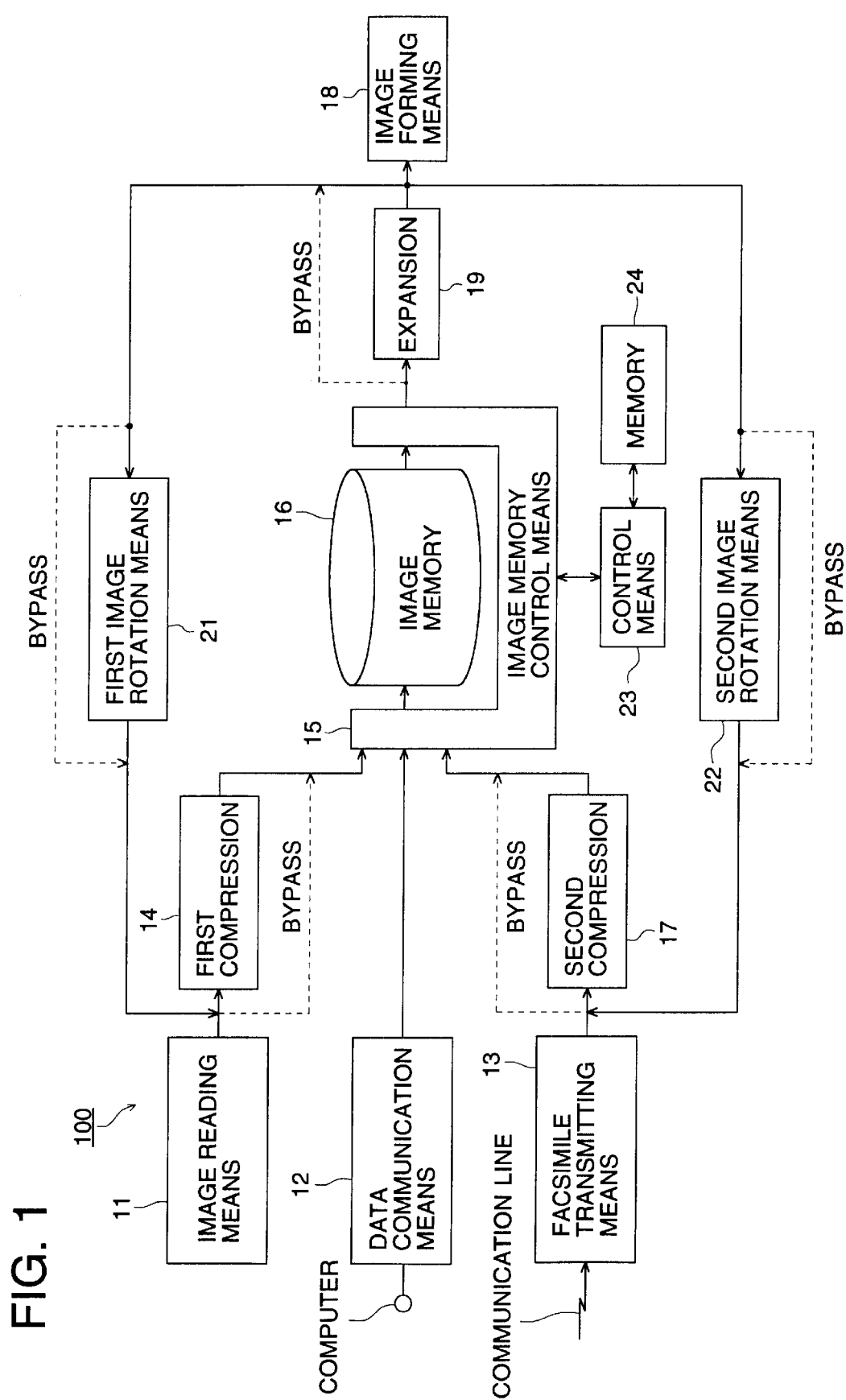
FIG. 1 is a block diagram showing an example of the structure of an image forming apparatus 100 as an embodiment of the present invention.

FIG. 1 is a view showing an example of a structure of an image forming apparatus 100 as an embodiment of the present invention.

In the present embodiment, an image memory is provided for storing image data obtained from an image reading means, image data obtained from a facsimile means, and image data obtained from a data communication means, and the image memory is used in common, with the image reading means, facsimile means, and data communication means, and image formation and image communication can be carried out during document image reading, or image reading and image communication can be carried out during image formation, or image reading and image formation can be carried out during image communication, and thereby, the image memory can be effectively used.

The image forming apparatus 100 of the present invention has a facsimile reception function, copy function, and printer function. The image forming apparatus 100 shown in FIG. 1 is provided with an image reading means 11, data communication means 12 and facsimile means 13. In the image reading means 11, an image of the document is read and image data is obtained. Relating to the image reading means 11, an automatic document feeding and reading apparatus, which is an example of the image reading means 11, will be described in FIG. 5. The first compression means 14 is connected to an output stage of the image reading means 11, and compressed image data after image data from the image reading means 11 is compressed, is outputted.

An image memory control means 15 is connected to an output stage of the compression means 14, and an image memory 16 which is used in common at least by the image reading means 11, data communication means 12 and facsimile means 13, is connected to the image memory control means 15, and image data obtained from the image reading means 11, image data obtained from the data communication means 12, and image data obtained from the facsimile means 13 are stored therein. The image memory 16 is used by being divided into a plurality of memory areas. For example, the image memory 16 is allotted to a copy/printer area, and a FAX area, and these memory areas are sometimes used by being further divided into a file memory and a page memory. Of course, the image memory 16 can be further extended.

Further, in the data communication means 12 connected to a computer, image data sent from the computer is received, and transmitted to the image memory 16 by the control of image memory control means 15. In this example, after image data received from the data communication means 12 is temporarily stored in the image memory 16, the image data is compression-processed, then, sometimes, stored again in the image memory 16. This is for the reason that the size of the image data is made so as to coincide with the size of a previously prepared recording sheet.

Further, in the facsimile means 13 connected to the communication line, the image data sent from a terminal equipment of a remote station is received, or the image data read by the image reading means 11, or the image data received from a computer is sent to the terminal equipment of the remote station. When the image data is sent, coding processing is conducted.

The second compression means 17, which can be independently operated of the above-described compression means 14, is connected to an output stage of the facsimile means 13, the image data after coded image data received from the remote station is decoded, is compressed, and the compressed image data compressed herein, is transmitted to the image memory 16 by the control of the image memory control means 15. The above-described first and second compression means 14 and 17 have respectively a bypass circuit, and thereby, the image data can pass by the compression processing.

In this image memory control means 15, mediation between the image data stored in the image memory 16 and the image data read from the image memory 16 is carried out, and the access control to the image memory 16 is carried out. In this example, and the image reading means 11, image forming means 18, or the like, is made to be used based on a predetermined priority level of respective functions embodied by a combination of the image reading means 11, data communication means 12, facsimile means 13, and image memory 16.

In this example, the copy function is realized by the image reading means 11, image memory 16 and image forming means 18, the printer function is realized by the data communication means 12, image memory 16 and image forming means 18, and the facsimile function is realized by the facsimile means 13, image memory 16 and image forming means 18. The facsimile function is further divided into a facsimile reception function and a facsimile transmission function.

In this example, in the case where the facsimile reception function, copy function and printer function are carried out, when the use of the image forming means 18 is requested, the image memory control means 15 reads the image data from the image memory 16 so that the image forming means 18 is made to be used in the order of functions of a predetermined higher priority level.

For example, when the copy function and the printer function compete with each other, the image memory control means 15 mediates so that the image forming means 18 is made to be used by the copy function prior to the other function, and the image data by the data communication means 12 is temporarily stored in the image memory 16.

Further, when the copy function and the facsimile reception function compete with each other, the image memory control means 15 mediates so that the image forming means 18 is made to be used by the copy function prior to the other function, and the image data from the remote station by the facsimile means 13 is received and temporarily stored in the image memory.

Further, when the printer function and the facsimile reception function compete with each other, the image memory control means 15 mediates so that the image forming means 18 is made to be used by the function of a predetermined higher priority level, and the image data by the function of a lower priority level is temporarily stored in the image memory 16. Incidentally, when the facsimile reception function is not carried out, because the communication line is empty, the image memory control means 15 controls so that the facsimile transmission function reads the image data from the image memory 16 at any time.

An expanding means 19 is connected to an output stage of the image memory control means 15, and the image data after the compressed image data read from the image memory 16 is expanded, is outputted. The expanding means has a bypass circuit and thereby, the image data can pass by the expanding processing. This is for the reason that sometimes the image data from the data communication means, or the like, is not compression processed and directly stored in the image memory 16, therefore, in that case, the expansion processing is not necessary for the image data read from the image memory 16.

In this example, the output of the expanding means 19 is divided into three systems, and the first image rotation means 21, the second image rotation means 22 and the image forming means 18 are connected to respective output stages of the expanding means 19. In the image rotation means 21, the image data from the expansion means 19 or the image data passed by the expansion means 19 is image rotation-processed. In this image rotation processing, when the image data from the image reading means 11 or the data communication means 12 is image formed as it is, there is a case in which sometimes the longitudinal or lateral length of the image size is not well placed within the previously prepared recording sheet, therefore, the image data is rotated by 90°.

Of course, the image rotation processing is not limited to 90°, but when the document is placed being deflected to the image reading means 11, or the similar case, the image data is corrected by being rotated by a predetermined angle so that the deflection of the position is eliminated. The output of the image rotation means 21 is connected to the input of the above-described compression means 14. The image rotation means 22 also has the same function as the image rotation means 21, and the output of the image rotation means 22 is connected to the input of the above-described compression means 17.

The first and the second image rotation means 21 and 22 have bypass circuits, and the image data can pass by the image rotation processing. This is for the reason that, in the case where image formation is carried out by using the image data from the data communication means 12 or the like, when the longitudinal or the lateral length of the image size is well placed within the previously prepared recording sheet, the rotation processing is not necessary for the image data.

As described above, when the compression system and rotation system of the image data are structured by being divided into two paths shown in FIG. 1, after the image data obtained from the data communication means 12 is temporarily stored in the image memory 16, the image data is read from the image memory 16, and then the image data is image rotation processed, and after the image data is compressed by the compression means 14 or the compression means 17, the image data can be stored again in the image memory 16, thereby, the waiting for data processing can be avoided.

Further, it can be done that the image data obtained from the data communication means 12 is once stored in the image memory 16, read from the image memory 16, processed with the image rotation, thereafter compressed by the compressing means 14 or the compressing means 17, and then stored again in the image memory 16, thereby suspension in terms of the data processing can be avoided.

The image forming means 18 is connected to the output stage of the above-described expanding means 19, and image formation is carried out based on the image data stored in the image memory 16. In this example, image formation is carried out based on the image data from the expanding means 19, or the image data passed by the expanding means 19. Relating to the image forming means 18, an example thereof will be described in FIG. 5.

A control means 23 and a memory 24 are connected to the image memory control means 15. In the memory 24, a plurality of job commands of a predetermined priority level for the image formation by the image forming means 18 are stored. In the control means 23, the image reading means 11, data communication means 12 and image forming means 18 are driven according to the job commands in the memory 24, and the job commands are executed.

In this example, when the request for interruption to use the image forming means 18 while the job command for image formation of the plurality of pages is executed by the control means 23, the image forming processing according to the job command which is executed, is temporarily suspended at the end of the corresponding page, the other job command is executed according to the order of priority of the plurality of job commands by the memory 24.

Figure 2:
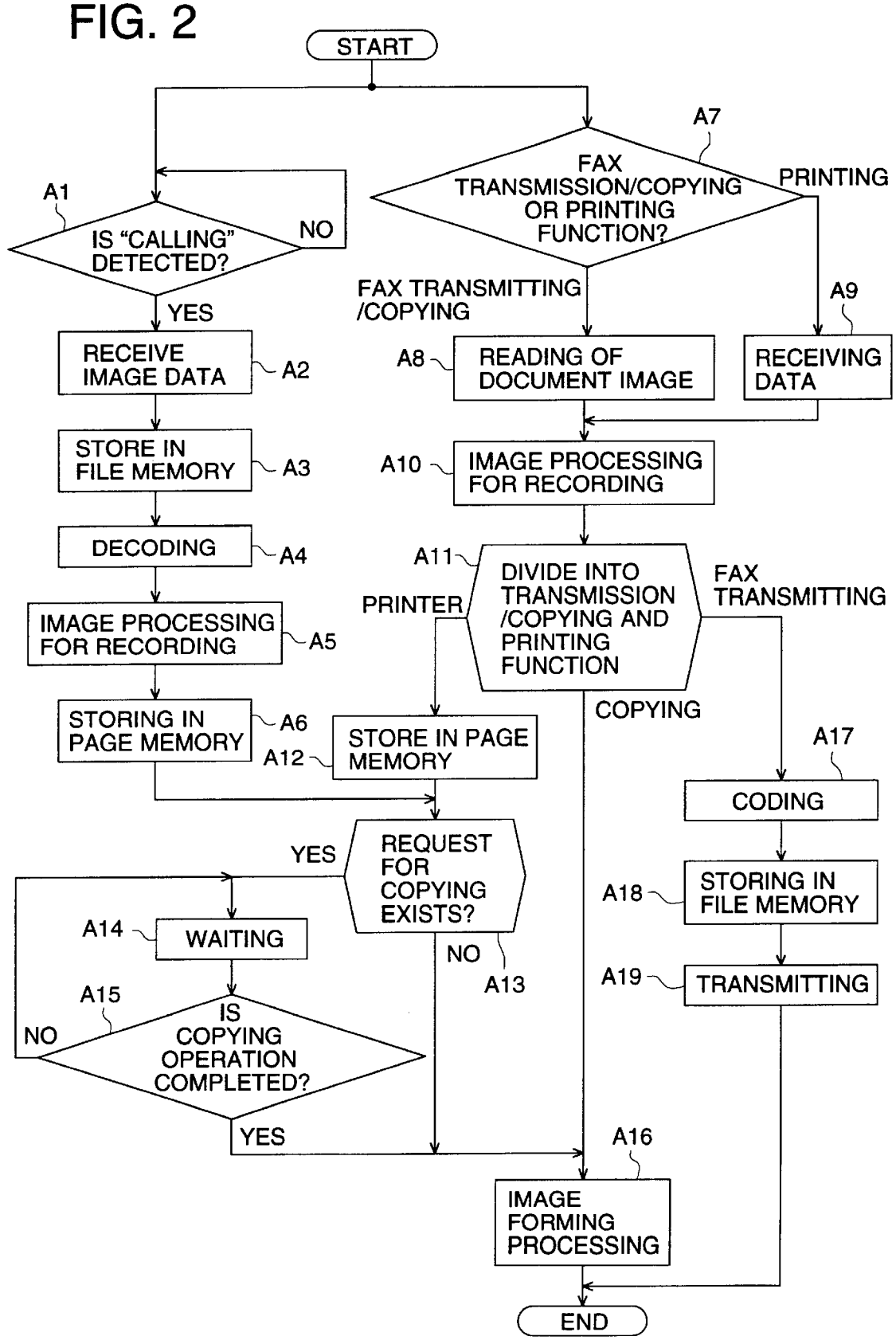
FIG. 2 is a flow chart showing an example of operations of the image forming apparatus 100.

Following to the above description, an example of operations of the image forming apparatus 100, will be described. FIG. 2 is a flow chart showing an example of operations of the image forming apparatus 100 as the present embodiment. In this example, the following case will be described as the presupposition, in which, when the facsimile reception function, copy function and printer function compete with each other, the copy function is carried out prior to the other, and when the facsimile function and the printer function compete with each other, the facsimile function is carried out prior to the other.

In this example, the data processing system to the image formation processing is largely divided into two. That is, the data processing for the facsimile reception function is carried out in step A1–step A16 in the flow chart shown in FIG. 2, and data processing for the copy function, print function, and facsimile function is carried out in step A7–A19.

In the facsimile reception function, initially, it waits "calling" of the terminal equipment of the remote station in step A1. Herein, "calling" of the remote station is detected in the facsimile means 13. When "calling" of the remote station is detected, the sequence advances to step A2, and the coded image data sent from the remote station is received by the facsimile means 13. Then, the sequence advances to step A3, and the coded image data received by the facsimile means 13 is temporarily stored in a file memory of the image memory 16.

Then, the sequence advances to step A4, and the coded image data from the remote station is read from the file memory and decoded, and the image data is expanded. Then, the sequence advances to step A5, and thus decoded image data from the remote station is recording image-processed.

Then, the sequence advances to step A6, and the image data from the remote station is written into the page memory. Then, in step A13, it is detected whether the use of the image forming means 18 is requested by the copy function. In this case, the request of use of the image forming means 18 generated by the execution of the copy function is received by, for example, control means 23, and in the control means 23, it is collated with the priority level for the use of the image forming means 18 which is written in the memory 24, and according to the result of the collation, allowance of the use of the image forming means 18 is given to the copy function.

Accordingly, when there is no request of the use of the image forming means 18 by the copy function in step A13, the sequence advances to step A16, and the image forming processing by the facsimile function is conducted. When there is a request of the use of the image forming means 18 by the copy function in step A13, the sequence advances to step A14, the facsimile function is caused to wait while the image data is being held in the page memory, until the image forming processing by the copy function has been completed.

Then, the sequence advances to A15, it is detected whether the image forming processing by the copy function has been completed. Relating to the detection, the following methods are adopted: it is checked for each time when a predetermined period of time passed, whether the image forming means 18 is used; or a completion flag is generated when the use of the image forming means 18 by the copy function has been completed, and the control means 23 checks the completion flag.

Accordingly, when the use of the image forming means 18 has not been completed, the sequence returns to step 14, the facsimile function waits until the image forming means 18 becomes empty. When the use of the image forming means 18 has been completed, the sequence advances to step A16, and the image data is read from the page memory of the image memory 16, and image forming processing is carried out.

Further, the copy function, print function and facsimile function are largely divided into two jobs, that is, the copy function/facsimile function, and the print function, by the operation input of the operator at step A7. The former is a job to use the image reading means 11, and the latter is a job by the data communication means 12. Accordingly, when the former is selected, the sequence advances to step A8, and the document image is read by the image reading means 11, and after the document image data is compressed by the compression means 14, the compressed image data is stored in the image memory 16 by the control of the image memory control means 15.

When the latter is selected, the sequence advances to step A9, the image data sent from the computer is received by the data communication means 12, and the compressed image data is stored in the image memory 16 by the control of the image memory control means 15. Then, the sequence advances to step A10, document image data or received image data is recording image-processed. Herein, for example, the image data received from the data communication means 12 is read from the image memory 16, and image rotation processing is conducted on the image data so that the size of the image data is made to coincide with the size of a previously prepared recording sheet, and then, after the image data is compression processed by the compression means 14, the compression image data is stored in the image memory 16 again.

Then, the sequence advances step A11, jobs of the copy function, print function and facsimile transmission function are respectively divided by the control means 23. When the copy function is carried out by the control means 23, the sequence advances to step A16, the image forming means 18 is used prior to print function and facsimile reception function, and image forming processing is carried out.

Further, when the printer function is carried out at step A11, the sequence advances to step A13, and it is detected by the control means 23 whether the use of the image forming means 18 is requested by the copy function. The detection is as described above. Accordingly, when the use of the image forming means 18 is not requested by the copy function at step A13, the sequence advances to step A16, the image forming processing based on the image data read from the page memory is conducted.

When the use of the image forming means 18 is requested by the copy function at step A13, the sequence advances to A14 in the same manner as the case of the facsimile reception function, and the printer function waits until the image forming processing by the copy function has been completed. Then, in step A15, it is detected whether the use of the image forming means 18 by the copy function has been completed, and when the use of the image forming means by the copy function has not been completed yet, the printer function waits until the image forming means 18 is empty, at step A14. When the use of the image forming means has been completed, the sequence advances to step A16 and image forming processing is carried out.

Further, when the facsimile transmission function is carried out in step A11, the sequence advances to step A17, and after the image data to be sent to the remote station is coded and compressed, the coded image data is temporarily stored in a file memory in step A18. Then, the sequence advances to step A19, and the coded image data is transmitted to the terminal equipment of the remote station by the facsimile means 13.

As described above, according to the image forming apparatus 100 as the present embodiment, when image formation is carried out based on the image data stored in the image memory 16, the image data is mediated by the image memory control means 15, and the image forming means 18 is made to be used based on a predetermined priority level.

Accordingly, when the copy function and the printer function compete with each other, the image forming means 18 is made to be used for the copy function prior to the other function, and the image data by the data communication means 12 can be temporarily stored in the image memory. Further, the copy function and the facsimile function compete with each other, the image forming means 18 is made to be used for the copy function prior to the other function, and the image data from the remote station by the facsimile means 13 is received and can be stored in the image memory. When the print function and the facsimile reception function compete with each other, the image forming means 18 is made to be used for the facsimile reception function in a predetermined priority level.

Accordingly, while the document is read by the document reading means 11, the previously obtained image data from the facsimile means 13 or computer is read from the image memory 16, and image formation can be carried out. During the document reading, the image data received from the remote station by the facsimile means 13 is recorded (memory reception) in the image memory 16, or the image data previously stored in the image memory 16 is red from the image memory 16, and can be transmitted (memory transmission) to the remote station. Further, during the document reading, the image data from the computer is received by the data communication means 12 and can also be temporarily stored in the image memory 16.

Further, in the middle of the time period when image formation is carried out based on the image data read from the image memory 16, a document for transmission or a new document is read by the image reading means 11 and the image data can be stored in the image memory 16. During the image formation, new image data from the computer is received by the data communication means 12 and can also be temporarily stored in the image memory 16.

Further, according to the image forming apparatus 100 of the present embodiment, because the image memory 16 is used in common to respective functions, when the memory area is not used by the image reading means 11, the facsimile means 13 or the data communication means 12, or although the memory area is used by the image reading means 11, the facsimile means 13 or the data communication means 12, when the rate of use of the memory is low, the empty memory area can be used by the image reading means 11, the facsimile means 13 or the data communication means 12, which is operating now. Accordingly, the image memory 16 can be effectively used. Thereby, a hybrid machine whose operating property is very excellent, can be structured.

(2) A Hybrid Machine to which the Image Forming Apparatus is Applied

Figure 3:
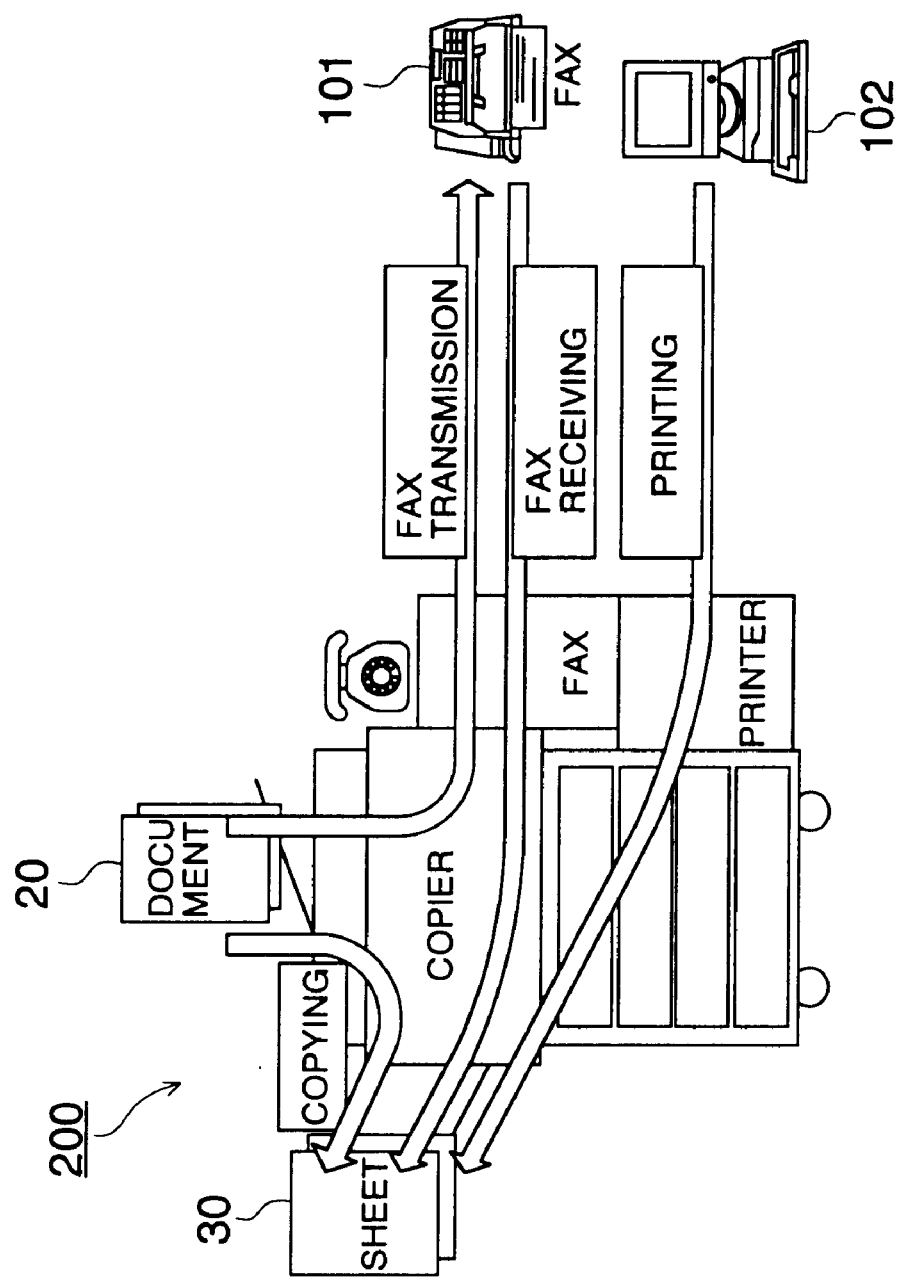
FIG. 3 is an image view showing an example of functions of a hybrid machine 200 to which the image forming apparatus as an embodiment is applied.

FIG. 3 is a conceptual view for explaining an example of functions of a hybrid machine 200 to which the image forming apparatus as the present embodiment is applied. The hybrid machine (copier) 200 shown in FIG. 3 is the machine to which the image forming apparatus 100 is applied. In this example, at least four functions, that is, the copy function by which the document 20 is read and the image is formed on the recording sheet 30; the facsimile transmission (FAX transmission) function by which the document is read and the document image is transmitted to the remote station; the facsimile reception (FAX reception) function by which the document image received from the terminal equipment 101 of the remote station is formed on the recording sheet; and the print function by which the image is formed on the recording sheet based on the image data received from the personal computer 102.

Figure 4:
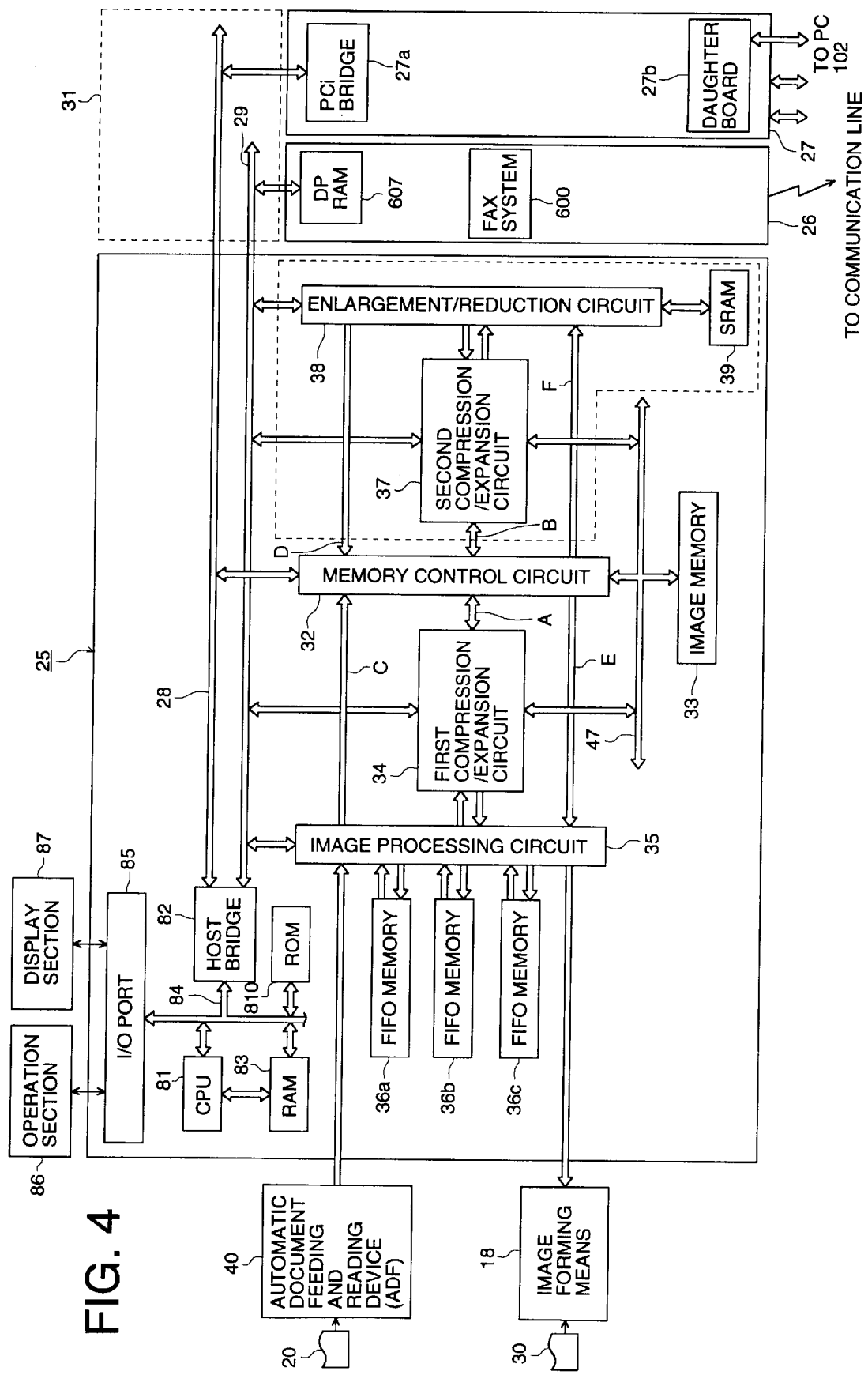
FIG. 4 is a block diagram showing an example of the structure of the hybrid machine 200 to which the image forming apparatus is applied.

This hybrid machine (the second image forming apparatus) 200 has, as shown in FIG. 4, an image memory control substrate 25, a FAX substrate 26 as the facsimile means 12, and a personal computer communication substrate 27 as the data communication means 13, and 2 data buses 28 and 29.

In this example, the FAX substrate 26 and the personal computer communication substrate 27 are arranged in order on the right side of the image memory control substrate 25. When these substrates can not be arranged on the same plane due to the combination method of these substrates 25–27, sometimes a socket substrate for substrate lamination, which is called a mother board 31, is arranged. In this case, the FAX substrate 26 and the personal communication substrate 27 are inserted in the mother board 31, and arranged such that these substrates are laminated vertically on the mother board 31.

According to such the arrangement, compactness at the substrate mounting can be attained. The above-described image memory control substrate 25 and the personal computer communication substrate 27 are connected to the data bus 28, and the image memory control substrate 25 and the Fax substrate 26 are connected to the second data bus 29.

In this example, at almost central portion of the image memory control substrate 25, the memory control circuit 32, which is formed into a semiconductor integrated circuit (hereinafter, called IC), as the image memory control means 15, is arranged and connected to the data bus 28. In the lower area of the memory control circuit 32, the image memory 33 as the image memory 16 is arranged such that it is parallelly arranged with the memory control circuit 3, and is connected to the memory control circuit 32 through the memory bus 47, and is used in common to each other to store the image data obtained from the personal computer communication substrate 27, the image data obtained by reading the document, and the like.

The image data stored in the image memory 33 and the image data read from the image memory 33 are mediated by the memory control circuit 32, and the access control to the image memory 33 is carried out. In this example, when the copy function and the printer function compete with each other, these functions are mediated by the memory control circuit 32 in such a manner that the image forming means 18 is made to be used by the copy function prior to the printer function, and the image data by the personal computer communication substrate 27 is temporarily stored in the image memory 33.

Further, when the copy function and the facsimile reception function compete with each other, these functions are mediated by the memory control circuit 32 in such a manner that the image forming means 18 is made to be used by the copy function prior to the facsimile reception function, and the image data from the remote station by the facsimile means 13 is received and temporarily stored in the image memory 33. Further, when the printer function and the facsimile reception function compete with each other, these functions are mediated by the memory control circuit 32 in such a manner that the image forming means 18 is made to be used by the predetermined higher priority function, and the image data by the lower priority function is temporarily stored in the image memory 33. Incidentally, when the facsimile reception function is not carried out, because the communication line is empty, the facsimile transmission function is mediated by the memory control circuit 32 in such a manner that it can read the image data from the image memory 33 at any time.

The first compression expansion circuit 34 in which the compression means 14 and the expansion means 19 are formed into an IC, is arranged in the direction almost perpendicular to the direction in which the memory control circuit 32 and the image memory 33 are parallelly arranged, and on the left side of the memory control circuit 32, and connected to the memory control circuit 32 through the internal bus A, and the document image data obtained by reading the image is compressed or expanded. The image processing circuit 35 for read image formation, which is an rotation means 21, is arranged on the left side of the compression and expansion circuit 34, and connected to the compression and expansion circuit 34, and thereby, the document image data is image processed, or the image data outputted to the image forming means 18 is image processed.

An automatic document feeding and reading apparatus (ADF) 40, which is the image reading means 11, is connected to the image processing circuit 35, and the image data which is automatically read from the image of the document, is generated. In the peripheral area of the image processing circuit 35 (on the left side, in this example), three FIFO memories 36a, 36b, and 36C are arranged as line memories, and connected to the image processing circuit 35, and the image data is temporarily held thereby to adjust the input and output timing when the image data is inputted or outputted.

The second compression and expansion circuit 37 in which the compression means 17 and the expansion means 19 are formed into IC, which can be independently operated of the compression and expansion circuit 34, is arranged on the right side of the memory control circuit 32, and is connected to the memory control circuit 32 through internal bus B, thereby, the image data obtained by the FAX substrate 26 is compressed or expanded. On the right side of the compression and expansion circuit 37, the image processing circuit (hereinafter, called enlargement and reduction circuit) 38 for the facsimile image formation, as the second image rotation means 22, is arranged, and connected to the compression and expansion circuit 37.

In this enlargement and reduction circuit 38, the image data obtained from the FAX substrate 26 is enlarged or the image data is reduction processed, and the image data to be outputted to the image forming means 18 is enlarged, or the image data is reduction processed. To this enlargement and reduction circuit 38, an SRAM 39 is connected as a line memory, and is used as the same function as the above-described FIFO memories 36a, 36b and 36c.

In this example, the image processing circuit 35 and the memory control circuit 32 are directly connected through the internal bus C and the internal bus E, so that these can pass by the compression and expansion circuit 34, and the enlargement and reduction circuit 38 and the memory control circuit 32 are directly connected through the internal bus D and the internal bus F, so that these can pass by the compression and expansion circuit 37.

In the left upper area of the image control substrate 25, a CPU 81, host bridge 82, and I/O port 85, as the control means 23, and a RAM 83 and a ROM 810, as the memory 24, are arranged, and the CPU 81, RAM 83, I/O port 85 and ROM 810 are connected to the host bridge 82 through a CPU bus 84.

A plurality of job commands whose priority levels for the image formation by the image forming means 18 are predetermined, are stored in the RAM 83. The CPU 81 drives the automatic document feeding and reading apparatus 40, personal computer communication substrate 27 and image forming means 18, and executes job commands. A control program to control overall system is stored in the ROM 810. The operation section 86 and display section 87 are connected to the I/O port 85.

In this example, when an interrupt request for the use of the image forming means 18 is received through the host bridge 82, while a job command to image-form a plurality of pages is executed, the executing job command is temporarily stopped at an end of the concerned page, and the other job command is executed based on the priority levels of the plurality of job commands by the RAM 83, or the concerned job is carried out continuously.

The host bridge 82 is connected to the data bus 28 and the data bus 29, which is provided independently of the data bus 28, and mediation processing of the right of use of the bus is carried out for the request of use of the image forming means 18, in the host bridge 82.

To the data bus 28, the personal computer communication substrate 27 which is connected to the personal computer 102 (hereinafter, called PC), or the like, is connected, and the image data sent from the PC 102 is received. The PC communication substrate 27 has a PCi bridge 27a, and a network board 27b (daughter board).

The PCi bridge 27a is connected to the memory control circuit 32 and the host bridge 82 through the data bus 28, and the PCi bridge 27a transmits the request of the use of the image forming means 18 to the host bridge 82, or the image data from the PC 102 is transmitted to the PCi bridge 27a. The daughter board 27b is used when being connected to the Internet such as LAN (Local Area Network) and the PC communication is conducted. An example of the internal structure of the PCi bridge 27a will be described in FIG. 6 together with the host bridge 82.

Further, the FAX substrate 26 is connected to the data bus 29 and connected to the telephone line, and the image data is transmitted to the terminal equipment of the remote station, or the image data from the remote station is received. The FAX substrate 26 has a FAX system IC 600 or a dual board RAM 607, and is connected to the compression and expansion circuit 34, image processing circuit 35, compression and expansion circuit 37, and enlargement and reduction circuit 38, through the data bus 29. An example of the internal structure of the FAX substrate 26 will be described in FIG. 9. The image forming means 18 is connected to the image processing circuit 35, and the image formation is conducted based on the image data read from the image memory 33 by the memory control circuit 32.

As described above, according to the hybrid machine 200, the compression and expansion circuit 34, image memory 33, and compression and expansion circuit 37 can be arranged in good order at the periphery of the memory control circuit 32, which is placed at the center. Accordingly, in the layout design, there is no possibility that the internal buses (data buses) A through F are arranged disorderly, therefore, the memory bus 47 between the memory control circuit 32 and the image memory 33 is arranged as the center, and the internal bus A between the compression and expansion circuit 34 and the memory control circuit 32, and the internal bus B between the memory control circuit 32 and the compression and expansion circuit 37, can be symmetrically arranged.

According to this, an interface section 63 which connects between the compression and expansion circuit 34 and the memory control circuit 32, which will be described in FIG. 7, and an interface section 66 which connects between the memory control circuit 32 and the compression and expansion circuit 37, can be symmetrically arranged, thereby, the layout design can be simplified.

Figure 5:
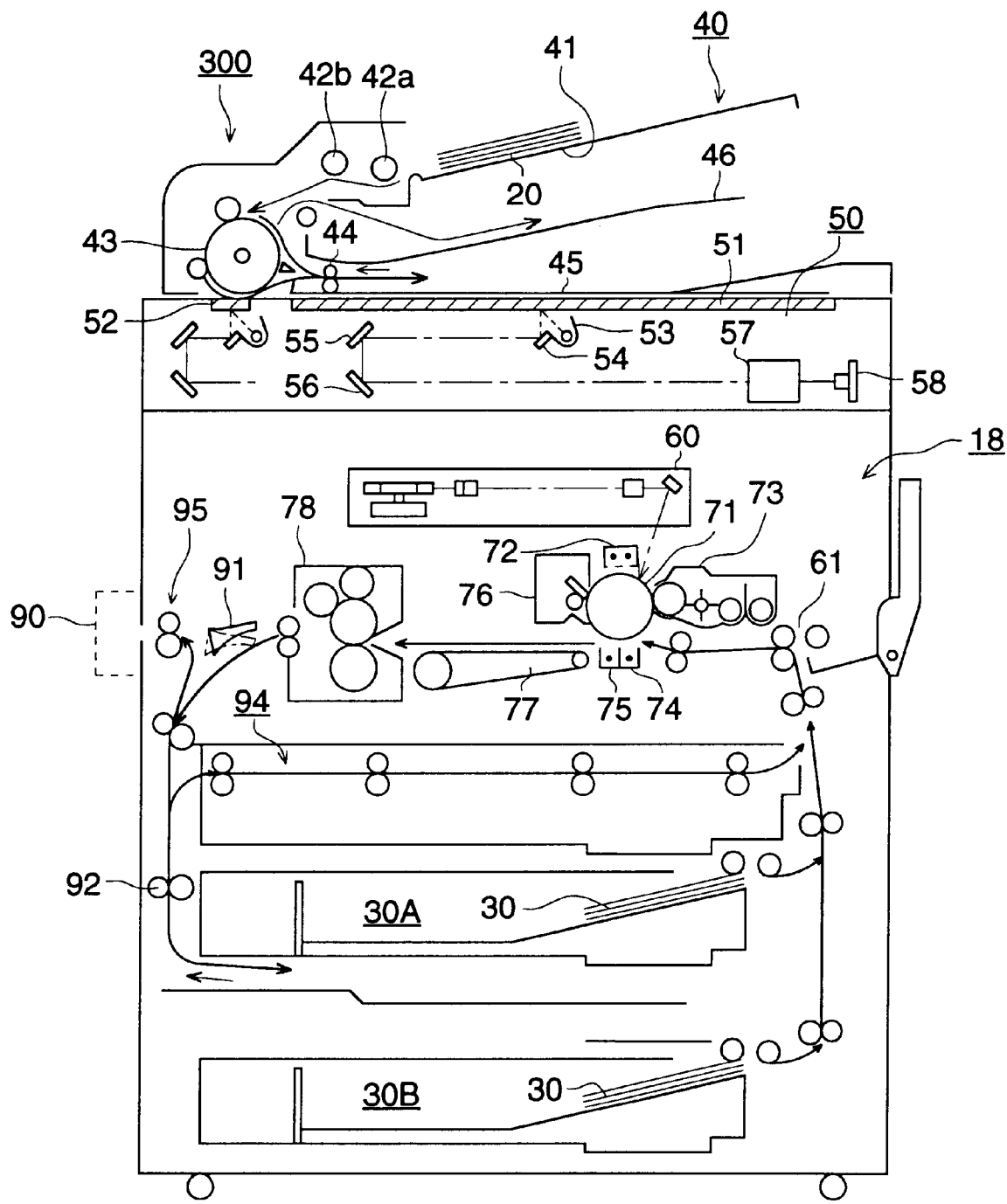
FIG. 5 is a conceptual view showing an example of the structure of the section of the hybrid machine 200.

Next to the above, an example of the sectional structure of the hybrid machine 200 will be described. FIG. 5 is a sectional view showing an example of the structure of the image reading section 50 (for platen) of the automatic document feeding and reading apparatus (ADF) 40 and the image forming means 18. The above-described automatic document feeding and reading apparatus 40 has a document placement section 41, roller 42a, roller 42b, roller 43, reversal roller 44, reversal section 45 and delivery sheet tray 46, shown in FIG. 5.

Further, the image reading section 50 has the first platen glass, the second platen glass 52, light source 53, mirrors 54, 55, 56, an image forming optical system 57, a CCD image sensor apparatus 58, and optical driving system, not shown. The image forming means 18 has a photoreceptor drum 71, charging section, 72, developing section 73, transfer section, 74, separation section 73, cleaning section 76, conveyance mechanism 77, and fixing section 78.

For example, a plurality of document 20 sheets are placed on the document placement section 41 with the surface of the fist page of the document facing upward. When the roller 42a and the roller 42b are driven by the ADF control section, not shown, the first sheet of the document 20 fed through the roller 42a and the roller 42b is conveyed through the roller 43.

At this time, by the control of the reading control section, not shown, the light beam is irradiated onto the image surface of the document 20 from the light source 53 of the image reading section 50. The reflected light is guided through mirrors 54, 55 and 56, and the reflected light enters into the CCD image sensor apparatus 58 through the image forming optical system 57. Thereby, the image of the document 20 is formed on the light receiving surface of the CCD image sensor apparatus 58.

Herein, when the document 20 is placed on the document placement section 41 under the condition that the reading surface of the document 20 faces downward on the platen glass 51, the optical driving system scans the image reading section 50 along the platen glass 51, and the image data enters into the CCD image sensor apparatus 58. Then, an image obtaining signal Sin of the read document 20 is transferred from the CCD image sensor apparatus 58 to the image processing circuit 35 shown in FIG. 4. In the image processing circuit 35, an image data Din after the image obtaining signal Sin has been converted into digital data, is temporarily stored in the FIFO memory 36a or the like. Then, after the image data is read from the FIFO memory 36 and compressed in the compression and expansion circuit 34, the image data is stored in the image memory 33 by the control of the memory control circuit 32.

The power source of the image memory 33 is bucked up, and thereby, even if the main power source is turned off due to instantaneous power tripping, or other failures, the image data Din can be bucked up, therefore, elimination of the important image data Din which is read in for image editorial processing, or similar processing, can be prevented.

Incidentally, in the automatic document feeding and reading apparatus 40, in the case of operation mode in which the document 20 is automatically fed, the document 20 turns around the roller 43. In this case, under the condition that the light source 53 and the mirror 54 are fixed under the platen glass 52, the document image is read out by the image reading section 50. Then, when the first page of the document 20 is read out, next, the wind up operation using the roller 43 is conducted again through the reversal roller 44, and the back side image of the document 20 is read out by the image reading section 50, and its image obtaining signal Sin is outputted to the image processing circuit 35.

As described above, the document 20 whose obverse and back side images are read, is reversed again by the reversal roller 44, and stacked on the delivery sheet tray 46 under the condition that the obverse side of the document 20 faces downward. Together with this, the image obtaining signal Sin read in the image reading section 50 is converted into digital image data Din in the image processing circuit 35, then, stored in the image memory 33 shown in FIG. 4.

On the other hand, the recording sheet 30 is fed from the sheet feed cassettes 30a or 30b on which the recording sheets 30 are stacked, and fed to the image forming means 18. The recording sheet 30 is in timed relationship with the photoreceptor drum 71 by the register roller 61, and then, in more proximity to the photoreceptor drum 71.

In such a situation, the image data Dout read from the image memory 33 is image processed in the image processing circuit 35, and then, outputted to the image writing section 60. The image data Dout is read from the image processing section 35 being headed by the obverse side of each document 20. In the image writing section 60, the laser light corresponding to the image data Dout is irradiated onto the photoreceptor drum 71, and an electrostatic latent image of the document 20 is formed on the photoreceptor drum 71. The electrostatic latent image is developed by the developing section 73, and after that, formed as the toner image on the photoreceptor drum 71.

The toner image is transferred onto the recording sheet 30 by the transfer section 74 provided under the photoreceptor drum 71. In this case, the recording sheet 30 is attracted onto the photoreceptor drum 71. Then, the recording sheet 30 attracted onto the photoreceptor drum 71 is separated from the photoreceptor drum 71 by the separation unit 75. After that, the recording sheet 30 separated from the photoreceptor drum 71, is sent to the fixing section 78 through the conveyance mechanism 77, and the toner image is fixed by the heat and pressure. According to this operation, the image (the second page image) of the back side of the document is formed on the recording sheet 30.

The recording sheet 30 on which the toner image is fixed, is conveyed downward though the guide 91, and sent to the reversal section 93. Next, the recording sheet 30 sent to the reversal section 93, is sent upward again by the reversal roller 92, and transferred again to the image forming means 18 through the reversal conveyance path 94 provided on the sheet feed cassette 30a.

In the image forming means 18 in which the image formation of the back side of the document 20 has been completed, remaining toner adhered to the photoreceptor dram 71 is removed by the cleaning section 76, and the image forming means 18 stands by for the next image formation. Under this condition, the recording sheet 30 is sent to the image forming means 18 through the register roller 61 under the condition that the obverse side (the surface on which the image formation is not completed yet) of the recording sheet 30 faces upward. In the image forming means 18, the electrostatic latent image of the obverse side of the document is formed on the photoreceptor drum 71, and the electrostatic latent image is developed by the developing section 73, therefore, the toner image of the obverse side of the document is formed on the photoreceptor drum 71.

This toner image is transferred onto the recording sheet 30 by the transfer section 74, and therefore, the toner image of the first page is formed on the surface of recording sheet 30. The recording sheet 30 attracted to the photoreceptor drum 71 is separated from the photoreceptor drum 71 by the separation section 75, after that, sent to the fixing section 78 through the conveyance mechanism 77, and the toner image is fixed by the heat and the pressure. Thereby, the image of the obverse side of the document (the first page image) can be formed on the recording sheet 30.

After that, the recording sheet 30 on the back side and the obverse side of which the image formation has been completed, is delivered outside the apparatus as it is, corresponding to the output mode (the operation designation for the sorter function, stapler function, or the like) in the finisher section 90, or reversed by the reversal section 93 again, and delivered outside the apparatus by the delivery roller 95. Thereby, images of the obverse side and back side (both sides) of the document 20 can be copied on the two sides of the recording sheet 30.

Figure 6:
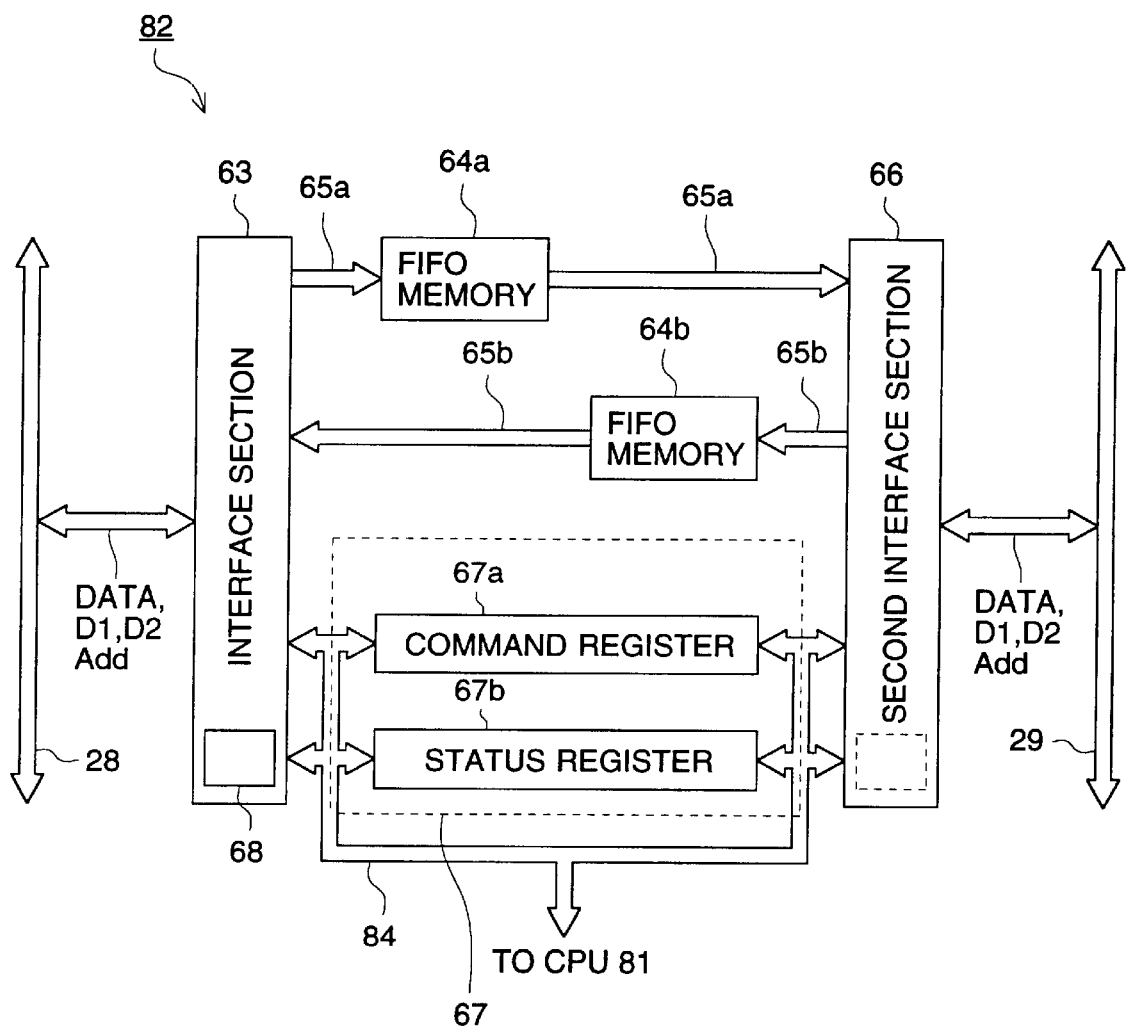
FIG. 6 is a block diagram showing an example of the internal structure of a host bridge 82 of the hybrid machine 200.

Next to the above description, the host bridge 82 will be described. FIG. 6 is a block diagram showing an example of the internal structure of the host bridge 82. The host bridge shown in FIG. 6 is used being connected among the data bus 28, data bus 29 and CPU bus 84. The two-way first inter face section 63 is connected to the data bus 28, and data is inputted and outputted between this data bus 28. A FIFO memory 64a is connected to the output stage to the interior of the interface section 63, and data inputted from the PC communication substrate 27 or the memory control circuit 32 through the data bus 28, is temporarily stored. The data from the FIFO memory 64a is outputted in such a manner that the data inputted first is outputted first. The second interface section 66 is connected to the output stage of the FIFO memory 64a through the internal bus 65a.

A FIFO memory 64b is connected to the output stage to the interior of the interface section 66, and the data inputted from the data bus 29 is temporarily stored therein from the above-described reason. The interface section 63 is connected to the output stage of the FIFO memory 64b through an internal bus 65b. The data bus 28 is connected to the output stage to the outside of the interface section 63, and data for the request of the use of the image forming means 18 by the FAX substrate 26, or the like, is outputted to the host bridge 82 through the data bus 29.

A memory 67 for control is connected between 2 interfaces of the interface section 63 and the interface section 66, and the memory 67 is connected to the CPU bus 84. For example, a control command D1 to make the image forming means 18 used, or the like, from the CPU 81, is temporarily stored in the memory 67. In this example, the memory 67 has a command register 67a and a status register 67b, and the above-described control command D1 is stored in the command register 67a.

As the access method to the host bridge 82, a univocally determined chip selection signal is used, or the address decode method is used. In the address decode method, an address Add which is previously mapped in the ROM, not shown, or the like, is driven on the data bus 28 by the CPU 81, or the like, at the time of access. According to this, when the control command D1 is set in the command register 67a in the host bridge 82, and the address is decoded in the host bridge 82, the access can be received. In the following example, the latter case is presumed, and will be described below.

For example, in the interface section 63 or interface section 66, an interface control section 68 is provided, and data writing and reading control of the FIFO memories 64a and 64b is carried out based on the control command D1 recorded in the command register 67a, and input/output of the interface sections 63 and 66, and the internal buses 65a and 65b is controlled. In this example, a control notice information is temporarily recorded in a status register 67b.

The control notice information is like completion status data which shows data transfer result, or the like, executed corresponding to the control command D1, and when the CPU 81 receives the completion status data, the CPU 81 can judge whether data processing corresponding to the control command D1 previously given to the host bridge 82 has been completed. Incidentally, relating to the PCi bridge 27a in the PC communication substrate 27, because the structure is almost the same as the host bridge, the explanation will be omitted.

Next to the above description, the operation of the host bridge 82 will be described. In this example, in the case where image data is transferred from the PC communication substrate 27 to the memory control circuit 32, when the request of use is sent from the PCi bridge 27a to the host bridge 82 through the data bus 28, the control command D1 from the CPU 81 is written in the command register 67a of the host bridge 82, and the control command D1 is written in a command register, not shown, in the PCi bridge 27a.

That is, when the control command D1 is received in the interface control section 68 of the host bridge 82, the control command D1 is decoded in the interface control section 68, and the internal bus 65a is connected to the data bus 29 based on the decoded result. Then, the request data of the use, or the like, inputted from the data bus 28 is temporarily stored in the FIFO memory 64a. This is for the reason that the data transfer speed on the data bus 28 and the data transfer speed on the data bus 29 are adjusted to each other. The data is read from the FIFO memory 64a in order from the data recorded at first in the FIFO memory 64a, passes through the interface section 66, and is outputted to the data bus 29.

Further, when data is transferred from the data bus 29 to the data bus 28, the control command D1 of that effect is written into the command register 67a in the host bridge 82. When the control command D1 is received in the interface control section 68, it is decoded in the control section 68, and according to the decoded result, the data bus 28 is connected to the internal bus 65b in the interface section 63 and the internal bus 65b is connected to the data bus 29 in the interface section 66.

Then, the data inputted from the data bus 29 is temporarily recorded in the FIFO memory 64b, and the data transfer speeds of the data bus 28 and data bus 29 are matched with each other. The data is read from the FIFO memory 64b in order from the data recorded at first in the FIFO memory 64b, passes through the interface section 63, and is outputted to the data bus 28.

When the data transfer is completed, the completion status data is written from the PCi bridge 27a of the PC communication substrate 27 into the status register 67b in the host bridge 82. Incidentally, of course, the completion status data D2 of the host bridge 82 itself is written into the status register 67b, and further, the completion status data from the memory control circuit 32, or the like, is recorded in the status register 67b. According to that, when the CPU 81 confirms the recorded content of the status register 67b in the host bridge 82, the CPU 81 can easily judge whether the data processing corresponding to the control command D1 given to the memory control circuit 32 or PC communication substrate 27, has been completed.

Next, an example of the internal structure of the memory control circuit 32 will be described. FIG. 7 is a block diagram showing an example of the structure of the memory control circuit 32. The memory control circuit 32 in this example is a circuit in which the internal bus selector 48, the writing and reading control section 69, and the like, are added to the above-described host bridge 82. The interface sections are used in such a manner that the interface section 63 is connected to the internal bus A and the internal bus C shown in FIG. 4, and the interface section 66 is connected to the internal bus B and the internal bus D. The internal bus A is connected to the compression and expansion circuit 34, the internal bus B is connected to the compression and expansion circuit 37, the internal bus C is connected to the image processing circuit 35, and the internal bus D is connected to the enlargement and reduction circuit 38.

That is, in the memory control circuit 32, memory buses 62a and 62b which are respectively branched from the internal bus 65a of the interface section 63 and the internal bus 65b of the interface section 66, are connected to each other, and a writing and reading control section 69 is connected to these memory buses 62a and 62b through FIFO memories 63a and 63b, and thereby, the inputted or outputted data in the interface sections 63 and 66, is writing and reading controlled based on the control command D1. Incidentally, because the same codes and the same names as those of the host bridge 82 have the same functions as in the host bridge 82, the explanation will be omitted.

Figure 7:
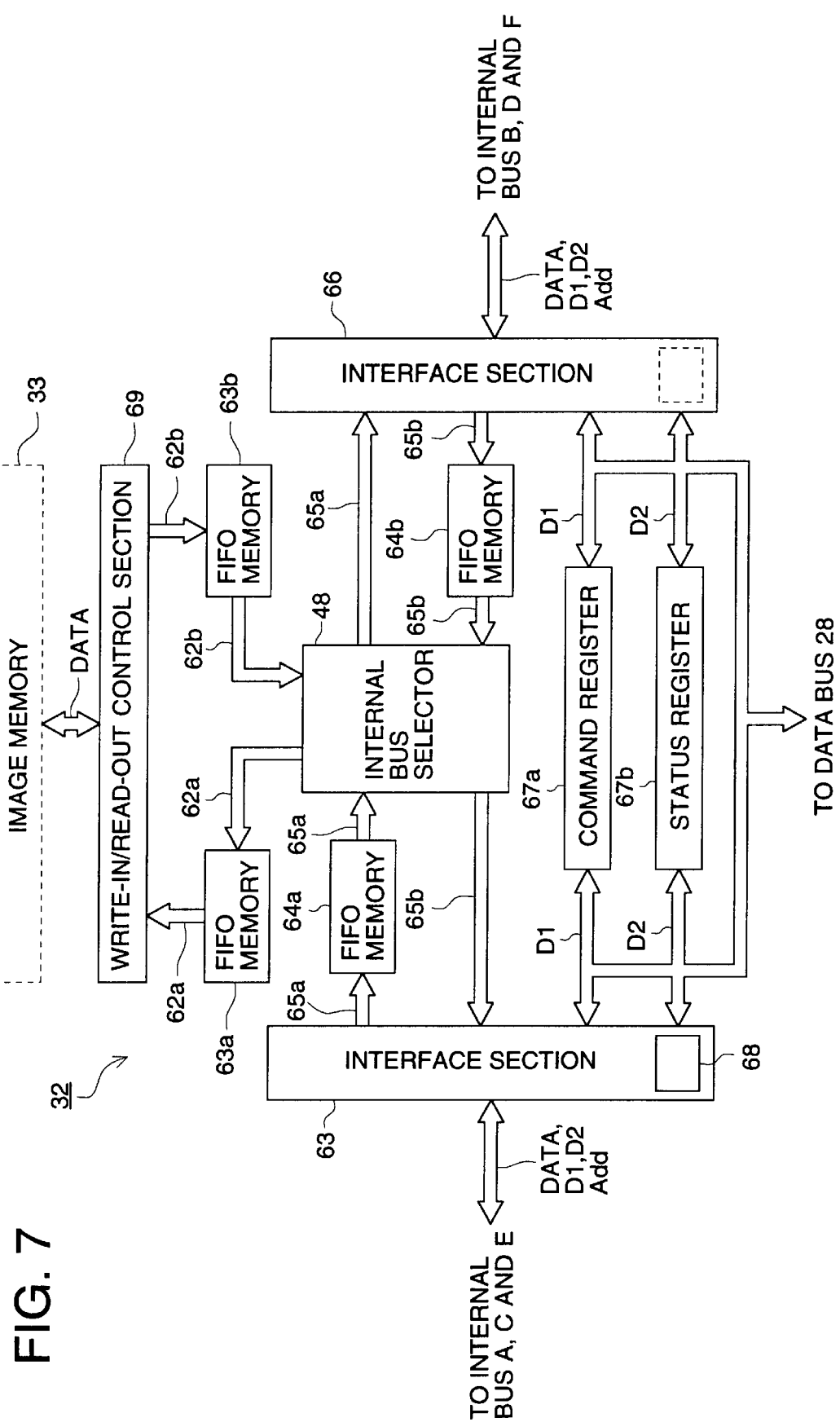
FIG. 7 is a block diagram showing the internal structure of the memory control circuit 32 of the hybrid machine 200.

In this memory control circuit 32, the internal bus selector 48 shown in FIG. 7 is provided. The internal bus selector 48 is connected between the FIFO memory 64a of the output stage of the interface section 63 and the internal bus 65a of the input stage of the interface section 66, and connected between the FIFO memory 64b of the output stage of the interface section 66 and the internal bus 65b of the of the input stage of the interface section 63.

A FIFO memory 63a is connected to a writing memory bus 62a branched from the internal bus 65a and the internal bus 65b, and writing image data branched from the internal bus 65a or the internal bus 65b is temporarily stored. The writing and reading control section 69 is connected to the output stage of the FIFO memory 63a, and writing and reading control of the image data branched from the internal bus 65a or the internal bus 65b, is carried out. The image memory 33 is connected to the output stage toward the outside of the writing and reading control section 69.

Further, a FIFO memory 63b is connected to the output stage, which is toward the inside, of the writing and reading control section 69, and reading image data to be outputted to the internal bus 65a or the internal bus 65b is temporarily stored therein. The memory bus 62b for reading is connected to the output stage of the FIFO memory 63b. This memory bus 62b is connected to the internal bus selector 48, and inside the internal bus selector 48, the memory bus 62b is connected to the input stage of the interface section 66 through the internal bus 65a, and connected to the input stage of the interface section 63 through the internal bus 65b.

An interface control section 68 is provided in the interface section 63 and the interface section 66, and data writing and reading control for FIFO memories 64a, 64b and 63a, 63b, and input and out control for interface sections 63, 66, and internal buses 65a, 65b, and switching control of the internal bus selector 48, are carried out according to the control command D1 recorded in the command register 67a.

Next, an operation of the memory control circuit 32 will be described. In this example, the control commands D1 for the following 9 data transfer phases are written in a command register 67a in the memory control circuit 32. The data transfer phases are as follows:

(1) A case where image data is transferred (data through) from the internal bus A (C or E may be allowed, in this example, A will be described.) to the internal bus B (D or F may be allowed, in this example, B will be described.);

(2) A case where image data is written from the internal bus A into the image memory 33;

(3) A case where image data is written from the internal bus A into the image memory 33, and simultaneously, the same image data is transferred to the internal bus B;

(4) A case where image data is transferred (data through) from the internal bus B to the internal bus A;

(5) A case where image data is written from the internal bus B into the image memory 33;

(6) A case where image data is written from the internal bus B into the image memory 33, and simultaneously, the same image data is transferred to the internal bus A;

(7) A case where image data is read from the image memory 33 to the internal bus A;

(8) A case where image data is read from the image memory 33 to the internal bus B; and (9) A case where the same image data is read from the image memory 33 to the internal bus A and the internal bus B.

For example, in the case where the control command D1 for the data transfer phase (1) is written into the command register 67a in the memory control circuit 32, when the control command D1 is received by the interface control section 68, the control command D1 is decoded in the interface control section 68, and the internal bus A is connected to the internal bus 65a in the interface section 63 based on the decoded result, and in the same manner, in the interface section 66, the internal bus 65a is connected to the internal bus B.

In the internal bus selector 48, the memory bus 62a is separated from the internal bus 65a based on the decoded result of the control command D1, and in the same manner, in the internal bus selector 48, the memory bus 62b is separated from the internal bus 65b based on the decoded result. Then, the image data inputted from the internal bus A is temporarily recorded in the FIFO memory 64a. Image data is read in order from the image data recorded at first in the FIFO memory 64a based on the decoded result, and passes through the interface section 66 and is outputted to the internal bus B. According to that, the image data can be transferred (data through) from the internal bus A to the internal bus B.

When the control command D1 for the data transfer phase (2) is written into the command register 67a in the memory control circuit 32, the internal bus A is connected to the internal bus 65a based on the decoded result of the interface control section 68, and in the internal bus selector 48, the memory bus 62a is connected to the internal bus 65a based on the decoded result.

Then, the image data inputted from the internal bus A is temporarily recorded in the FIFO memory 64a based on the decoded result. Image data is recorded in the FIFO memory 63a in order from the image data recorded at first in the FIFO memory 64a. The image data recorded in the FIFO memory 63a is read out based on the decoded result, and written into the image memory 33.

At this time, the memory bus 62b remains being separated from the internal bus 65b. In this case, by which method the internal bus B is connected to internal buses 65a and 65b, is not a problem. According to this, image data can be written from the internal bus A into the image memory 33.

When the control command D1 for the data transfer phase (3) is written into the command register 67a in the memory control circuit 32, the internal bus A is connected to the internal bus 65a based on the decoded result of the interface control section 68, and the internal bus 65a is connected to the internal bus B based on the decoded result. In the internal bus selector 48, memory bus 62a is connected to the internal bus 65a based on the decoded result.

Then, the image data inputted from the internal bus A is temporarily recorded in the FIFO memory 64a based on the decoded result. Image data is recorded in the FIFO memory 63a in order from the image data recorded at first in the FIFO memory 64a. In company with this, the image data recorded in the FIFO memory 64a is outputted to the internal bus B. The image data recorded in the FIFO memory 63a is read out based on the decoded result, and written into the image memory 33. According to that, the image data can be written from the internal bus A into the image memory 33, and simultaneously, the same image data can be transferred to the internal bus B.

Further, when the control command D1 for the data transfer phase (4) is written into the command register 67a in the memory control circuit 32, the internal bus A is connected to the internal bus 65b based on the decoded result of the interface control section 68, and the internal bus 65b is connected to the internal bus B based on the decoded result. In the internal bus selector 48, the memory bus 62a is separated from the internal bus 65a based on the decoded result, and in the same manner, in the internal bus selector 48, the memory bus 62b is separated from the internal bus 65b based on the decoded result.

Then, the image data inputted from the internal bus B is temporarily recorded in the FIFO memory 64b based on the decoded result. Image data is read from the FIFO memory 64b in order from the image data recorded at first in the FIFO memory 64b based on the decoded result, passes through the interface section 63, and is outputted to the internal bus A. According to that, the image data can be transferred (data through) from the internal bus B to the internal bus A.

Next, when the control command D1 for the data transfer phase (5) is written into the command register 67a in the memory control circuit 32, the internal bus B is connected to the internal bus 65b based on the decoded result of the interface control section 68, and in the internal bus selector 48, the memory bus 62a is connected to the internal bus 65a based on the decoded result.

Then, the image data inputted from the internal bus B is temporarily recorded in the FIFO memory 64b based on the decoded result. Image data is recorded in the FIFO memory 63a in order from the image data recorded at first in the FIFO memory 64b. The image data recorded in the FIFO memory 63a is read out based on the decoded result, and is written into the image memory 33.

At this time, the memory bus 62b remains being separated from the internal bus 65b. In this case, by which method the internal bus A is connected to internal buses 65a and 65b, is not a problem. According to this, image data can be written from the internal bus B into the image memory 33.

Further, when the control command D1 for the data transfer phase (6) is written into the command register 67a in the memory control circuit 32, the internal bus A is connected to the internal bus 65b based on the decoded result of the interface control section 68, and the internal bus 65b is connected to the internal bus B based on the decoded result. In the internal bus selector 48, the memory bus 62a is connected to the internal bus 65a based on the decoded result.

Then, the image data inputted from the internal bus B is temporarily recorded in the FIFO memory 64b based on the decoded result of the control command D1. Image data is recorded in the FIFO memory 63a in order from the image data recorded at first in the FIFO memory 64b. In company with this, the image data recorded in the FIFO memory 64b is outputted to the internal bus A. The image data recorded in the FIFO memory 63a is read out based on the decoded result, and written into the image memory 33. According to that, the image data can be written from the internal bus B into the image memory 33, and simultaneously, the same image data can be transferred to the internal bus A.

Further, when the control command D1 for the data transfer phase (7) is written into the command register 67a in the memory control circuit 32, the internal bus A is connected to the internal bus 65b based on the decoded result of the interface control section 68, and in the internal bus selector 48, the memory bus 62b is connected to the internal bus 65b based on the decoded result.

Then, the image data read from the image memory 33 is temporarily recorded in the FIFO memory 63b based on the decoded result of the control command D1. Image data passes through the interface section 63 in order from the image data recorded at first in the FIFO memory 63b and is outputted to the internal bus A. At that time, the memory bus 62a is under the condition that it is separated from the internal bus 65b. In this case, the internal bus 65b is separated from the internal bus B based on the decoded result. According to that, the image data can be read from the image memory 33 to the internal bus A.

Further, when the control command D1 for the data transfer phase (8) is written into the command register 67a in the memory control circuit 32, the internal bus A is separated from the internal bus 65a based on the decoded result of the interface control section 68, and in the internal bus selector 48, the memory bus 62b is connected to the internal bus 65a based on the decoded result.

Then, the image data read from the image memory 33 is temporarily recorded in the FIFO memory 63b based on the decoded result. The image data passes through the interface section 66 in order from the image data recorded at first in the FIFO memory 63b and is outputted to the internal bus B. At that time, the memory bus 62a is under the condition that it is separated from the internal bus 65b. In this case, the internal bus 65a is separated from the internal bus A based on the decoded result of the control command D1. According to that, the image data can be read from the image memory 33 to the internal bus B. Incidentally, when the control command D1 for data transfer phases (1) through (6), and (8) is executed, the situation that a part of the switch functions of the internal bus selector 48 is turned off based on the decoded result of the control command D1, is maintained.

Further, when the control command D1 for the data transfer phase (9) is written into the command register 67a in the memory control circuit 32, the internal bus A is connected to the internal bus 65b based on the decoded result of the interface control section 68, and the internal bus B is connected to the internal bus 65a based on the decoded result. Further, in the internal bus selector 48, the memory bus 62b is connected to the internal bus 65a based on the decoded result, and a switch function of the internal bus selector 48, which is previously turned off based on the decoded result, is turned on, thereby, the internal bus 65a and the internal bus 65b is short circuited.

Then, the image data read from the image memory 33 is temporarily recorded in the FIFO memory 63b based on the decoded result. The image data passes through the interface section 63 in order from the image data recorded at first in the FIFO memory 63b and is outputted to the internal bus A, and simultaneously passes through the interface section 66, and is outputted to the internal bus B. At that time, the memory bus 62a is under the condition that it is separated from the internal bus 65a and 65b. According to that, the same image data can be read from image memory 33 to the internal bus A and the internal bus B. When any one of data transfer phases (1) through (9) is completed, the completion status data D2 is written into the status register 67b in the memory control circuit 32 to notice the data transfer result.

Figure 8:
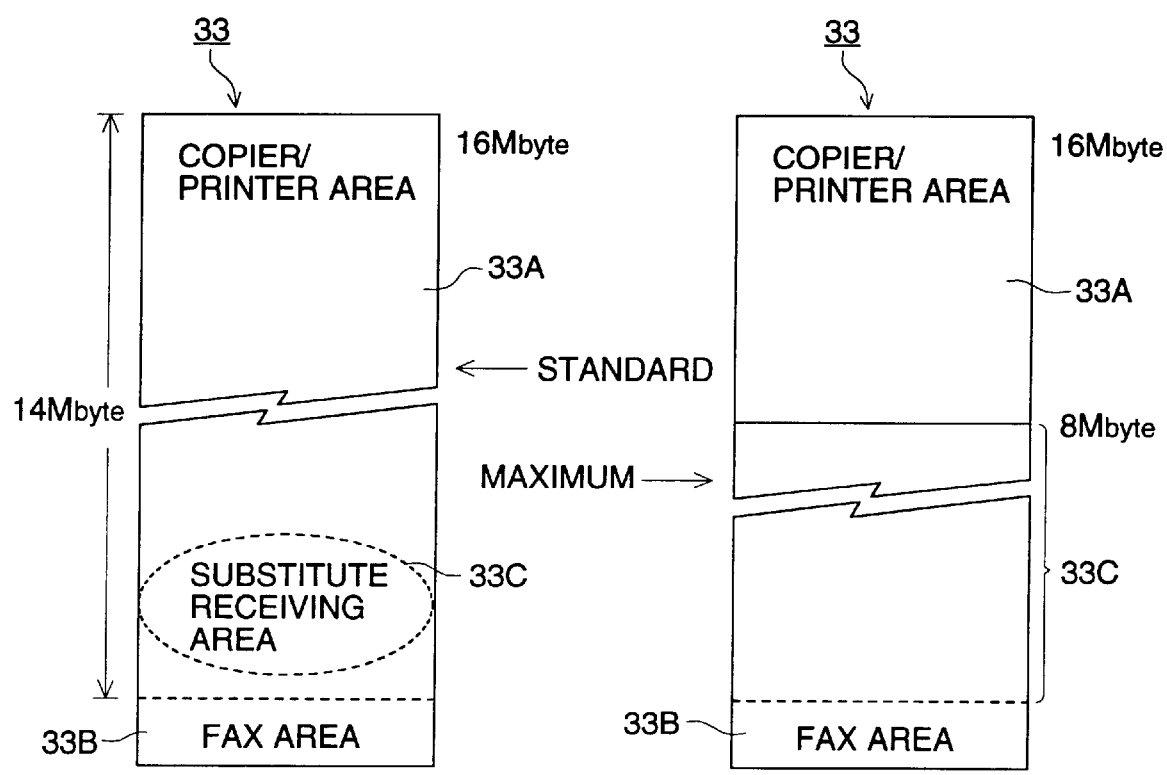
FIG. 8 is an image view showing an example of allotment of the image memory 33 area.

Next, an example of the structure of the internal memory area of the image memory 33 will be described. FIG. 8 is a conceptual view showing an example of allotment of the copy/printer area and the FAX area of the image memory 33. In this example, the copy/printer area 33A is allotted for the copy function and printer function, and the FAX area 33B is allotted for the facsimile function. In this example, a DRAM, for which memory holding operation is necessary, or similar memory, may be used for the image memory 33.

In the copy/printer area 33A, the compression image data obtained after the document image data read by the automatic document sheet feeding and reading apparatus 40 is compressed in the compression and expansion circuit 34 or 37, is stored. In this example, to the copy/printer area 33A, a memory area which is a larger capacity than that of the FAX area 33B is allotted, and this area is used as a substitute reception area 33C. A memory capacity of this copy/printer area 33A and FAX area 33B may be freely set previously corresponding to the environment of use of the customer by the operation section 86 by the operator or service man.

For example, as the image memory 33 shown in FIG. 8, totally 16 M byte memory capacity is prepared. For the copy/printer area 33A, 14 M byte is allotted, and for the FAX area, 2 M byte is allotted as a standard. As the copy function, the maximum 16 M byte memory area including the FAX area 33B can be used as the copy/printer area 33A. In the FAX area 33B, the transmission image data at the document transmission, and the reception image data when the image forming means 18 is normally operated, are stored, and the reception image data at an abnormal operation is stored in the substitute reception area 33C.

The FAX area 33B can be extended to the maximum 8 M bytes. For that purpose, the power source is backed up for the total 8 M byte memory area of the normal FAX area 33B and the substitute reception area 33C. Hereinafter, this area is called a power source back-up area (EBA). In this example, even if the power source is failed due to lightning or the like, in a rare possibility, the image data in this 8 M byte memory area can be held for a long period of time.

This substitute reception area 33C is controlled by the CPU 81 in such a manner that the power source back-up area is assured with priority. When such the situation that the power source back-up area is filled up occurs, the substitute reception area 33C is extended to the power source non-back-up area. When the power source is shut off under such the situation, only the data stored in the power source non-back-up area, is eliminated.

In this example, the image data at the facsimile operation is file-controlled. For example, the image data inputted into the image memory 33 is controlled for each page, and each file of the image data is controlled by the following items: file No.; reception start time; reception information (kind of file; width of reception sheet; resolution of reception; reception condition/00: empty, 01: under reception, 10: completion of reception); ordinary numbers of reception files; and number of substitution reception files. Accordingly, when the image forming means 18 is restored to the normal condition, the image data which is read from the image memory 33 for each file unit (for each page unit) in order from the file of earlier reception start time, is supplied to the image forming means 18 through the FAX substrate 26, and the image data is printed out on the recording sheet by the image forming means 18.

Figure 9:
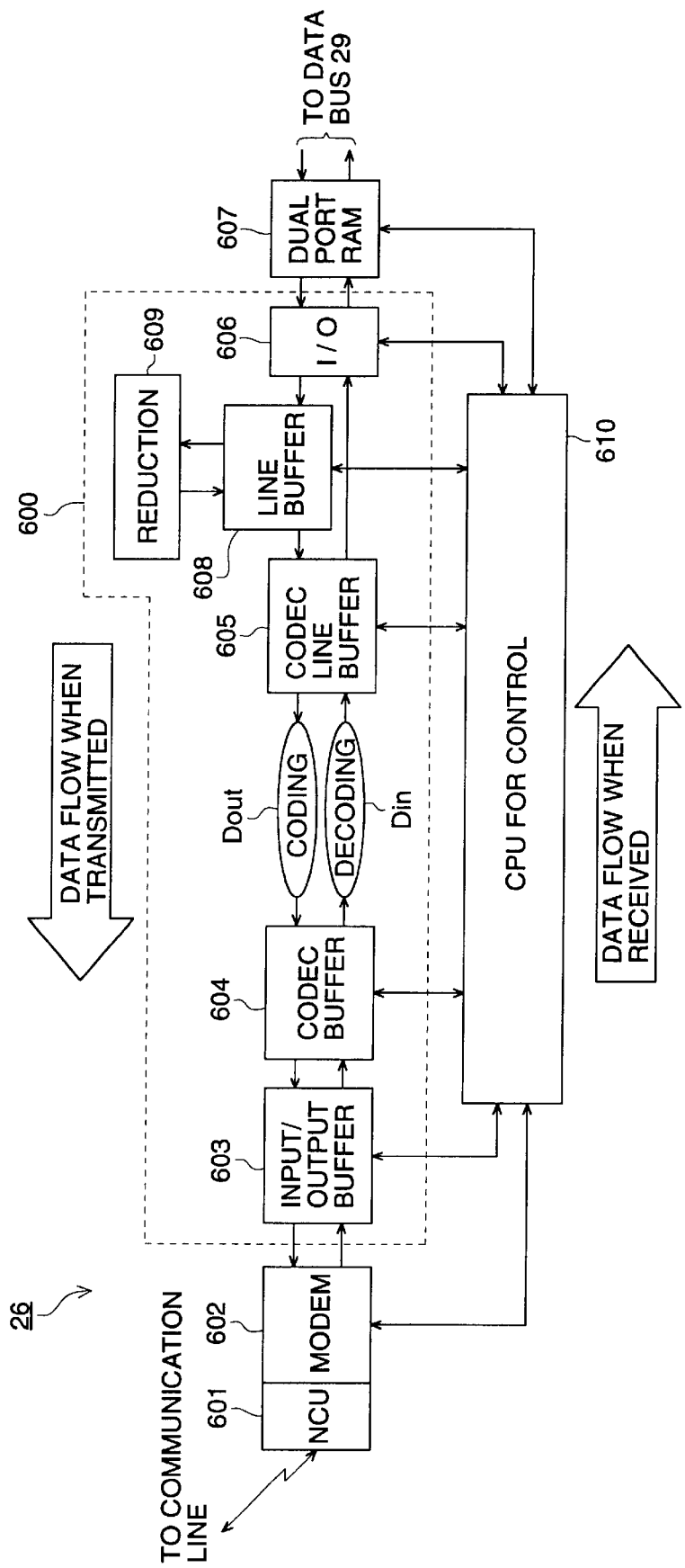
FIG. 9 is a block diagram showing an example of circuit structure of a FAX substrate 26 of the hybrid machine 200.

Next, an example of the internal structure of the FAX substrate 26 will be described. FIG. 9 is a block diagram showing an example of the internal structure of the FAX substrate 26. The FAX substrate 26 shown in FIG. 9 has a network control unit (hereinafter, called NCU 601), communication modem 602, FAX system 600, dual port RAM 607 and control CPU 610, and conducts the data communication according to a predetermined communication control procedure.

The NCU 601 is connected to the communication line, and the following connection control is carried out between the NCU 601 and the public network such as NTT: calling from the hybrid machine 200; incoming call from many and unspecified remote stations; reverting; and disconnection processing. For example, ring detection is carried out by the NCU 601, and a transmission request by calling of the remote station side is received.

A communication modem 602 is connected to the NCU 601, and at the reception, the modulation signal transmitted by the public network is demodulated and converted into digital coded image data, and at the transmission, the coded image data is modulated and converted into a modulation signal so that it is matched with the frequency band of the public network. The FAX system 600 and the control CPU 610 are connected to the communication modem 602. The FAX system 600 has an input/output buffer 603, CODEC buffer 604, CODEC line buffer 605, I/O interface section 606, reduction line buffer 608 and reduction gate array 609. These are controlled by the control CPU 610.

In the input/output buffer 603 connected to the communication modem 602, at the reception, the coded image data from the communication modem 602 is digitized and outputted. The CODEC buffer 604 is connected to the input/output buffer 603, a decoded image data (hereinafter, called reception image data Din) in which the coded image data at the reception is decoded and expanded, is outputted. The CODEC line buffer 605 is connected to the CODEC buffer 604, and reception image data Din is digitized and outputted to the I/O interface section 606. The dual port RAM 607 is connected to the I/O interface section 606, and the reception image data Din is outputted to the data bus 29. The reception image data Din is outputted to the image processing circuit 35, expansion and compression circuits 34, 37 or enlargement and reduction circuit 38.

At transmission of the FAX substrate 26, a transmission image data is inputted in the I/O interface section 606 from the data bus 29 through the dual port RAM 607. Sometimes, a line buffer 608 for reduction of the image is connected to the I/O interface section 606 depending on the system, and the image reduction gate array is connected to the line buffer 608. At transmission, a transmission image data is reduced in the image reduction gate array 609 through the line buffer. Reduced transmission image data is outputted to the CODEC line buffer 605 through the line buffer 608.

In this CODEC line buffer 605, image data in which transmission image data from the line buffer 608 is coded and compressed, (hereinafter, called coded image data Dout), is outputted to the CODEC buffer 604. In the CODEC buffer 604, the coded image data Dout is digitized, and outputted to the input/output buffer 603. In the input/output buffer 603, the coded image data Dout from the CODEC buffer 604 is outputted to the communication modem 602. In the communication modem 602, the coded image data Dout is modulated and converted into the modulation signal so that it is matched with the frequency band of the public network, and the modulation signal is outputted to the communication line through the NCU 601.

Figure 10:
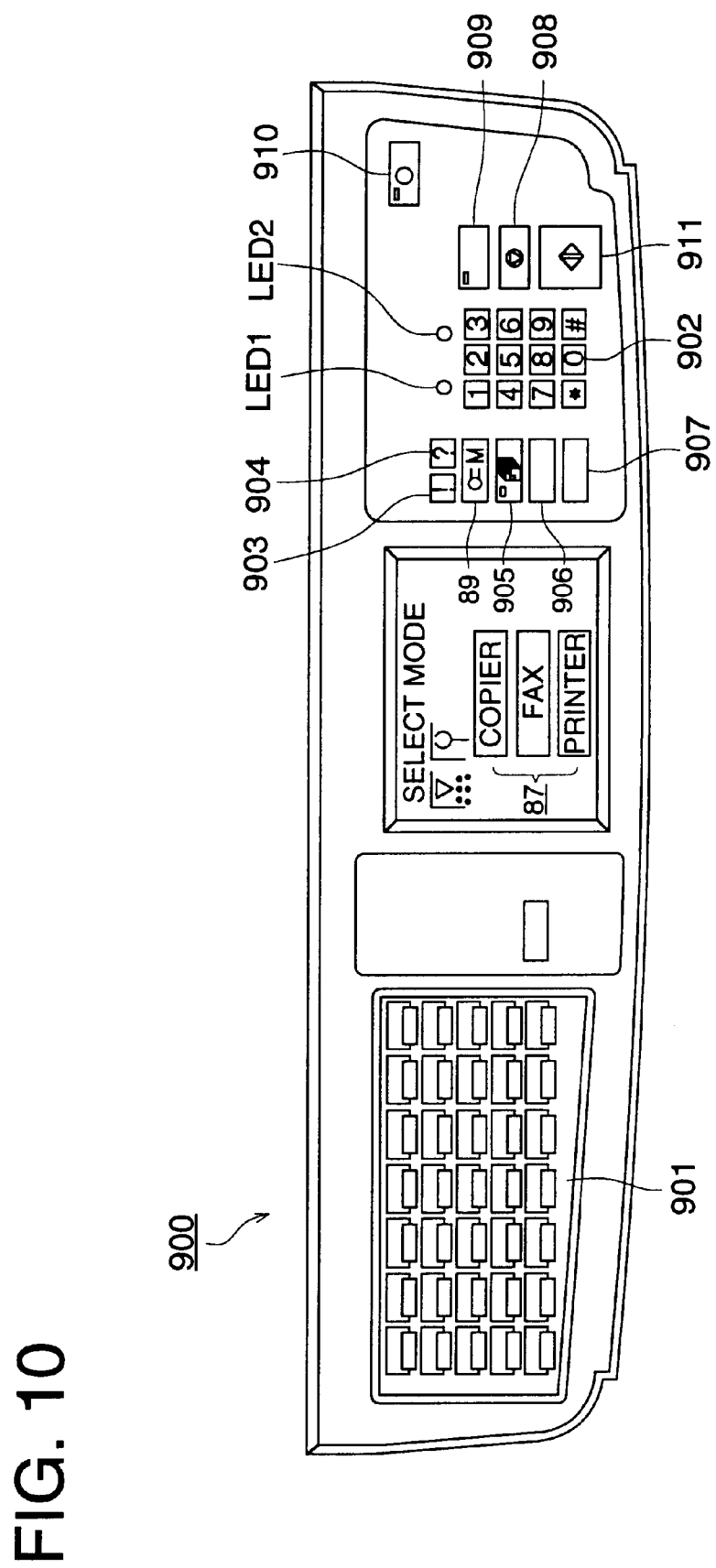
FIG. 10 is an image view showing an example of the structure of an operation panel 900 of the hybrid machine 200.

Next, the operation section 86 and the display section 87 will be described. FIG. 10 is a plan view of an example of the structure of an operation panel 900, which is an example of the operation section 86 and the display section 87. The operation panel 900 shown in FIG. 10, has the rectangular shape whose corners of one side are roundish, and is mounted at a position in the vicinity of this side of the automatic document feeding and reading apparatus (not shown) 40 of the copier 200 so that the operator can easily operate it.

On this operation panel 900, at least a display section 87 and a mode change key 89 are attached. In this example, a liquid crystal display (LCD) is used as the display section 87. Other than this, as the display section 87, a planer display element such as an PDP (Plasma Display Panel), electroluminescent diode, or the like, may be used, and these display apparatus is arranged at almost the center of the operation panel 900. A touch panel is attached on the display screen of the display section 87 so that the input operation property of the operator becomes good.

In addition to this, push-button switches 901 for one-touch dial are arranged matrix-like on the left side of the display section 87, thereby the one-touch transmission and a special communication mode such as multi-address calling, or the like, can be carried out. The mode change key 89 is provided on the right side of the display section 87, and for example, corresponding to the operation of the mode change key 89, the copy screen P10, facsimile screen P20, and printer screen P30 are successively displayed in rotation on the display section 87.

Further, on the right side of the display section 87, other than the mode change key 89, numeral keys of "1" through "0", key buttons 902 for telephone dial input of "*" key, "#" key, etc., a check button 903, help button 904, application button 905, program button 906, reset button 907, stop/clear button 908, interrupt copy button 909, power switch 910, start button 911, etc., are arranged. Two light emitting diodes LED 1, and LED 2 are attached on the arrangement area of numeral keys of "1" through "3", so that the display by which a file or an error is discriminated, can be made.

Next, an example of the display of the copy screen P10 will be described. On the copy screen P10 shown in FIG. 11, a message of "ready for copying" is displayed, and other than that, the copy setting, image quality, reservation list, document reading, etc., are displayed on the same screen. On the copy setting screen, "copy mode", "copy density", "magnification", "size selection", etc., are displayed. In the "copy mode", the recording mode of the document can be selected. In this example, when documents are set in RADF, the automatic document reading mode can be selected. Further, when "2-sided to 2-sided" is pressed, a mode by which two sides of the document are recorded on two sides of the recording sheet, can be selected, and when "2-sided to 1-sided", "1-sided to 2-sided", or "1-sided to 1-sided" is pressed, the document can be recorded on the recording sheet in the mode corresponding to the display.

In the "copy density", the copy density (also called image density) at the recording of image data can be arbitrarily adjusted. In this example, "arbitrary 1", and "arbitrary 2" can be selected. When the arbitrary key is selected, the copy density can be arbitrarily adjusted by pressing "void triangle", or "normal" key. Incidentally, when "void triangle" is pressed, the copy density is set in the direction toward the thin density, and when "triangle on a black ground" is pressed, the copy density is set toward the thick density. In these key areas, "automatic" key is provided, and by which the copy density can be automatically adjusted.

In the "magnification", an image formation size at the image data recording can be arbitrarily set. In this example, a display area for magnification display is provided. In addition to that, mode keys such as independent, zoom, fixed, life-size, etc., are prepared, and for example, when the life-size mode is touched, "1.00" is displayed in the display area.

In the "size selection", the size of the recording sheet can be arbitrarily set. In this example, a multiple stage sheet feeding system is adopted, therefore, a display area displaying the screen of the recording sheet accommodation cassette is provided. The recording sheet feeding cassettes are, for example, provided by 5 stages, and it is displayed that B5 sized recording sheets are accommodated in the first stage. In the same manner, the screen in which A4R sized recording sheets are accommodated in the second stage, A4 sized recording sheets are accommodated in the third stage, A3 sized recording sheets are accommodated in the fourth stage, and A4R sized recording sheets are accommodated in the fifth stage as substitute recording sheets, is displayed.

An auto-size key is provided under the size display area, and thereby, a mode to detect the document size and select an appropriate recording sheet cassette from a specified variable magnification ratio, and record, can be set. Further, when a specified recording sheet accommodation cassette is designated, a mode by which size information of the recording sheet accommodated in the cassette is detected, and given image data is variable-magnified so that it is matched with the size of the recording sheet and recorded, can be set.

Thereby, setting of the recording sheet size and document size can be simply carried out. Incidentally, a display area to count the number of copy sheets is provided on the right upper side in the copy screen P10, and %-remaining amounts of the image memory is displayed in its lower area. In this example, as the number of copy sheets, "001" is displayed, and as the remaining amount of the memory, "100%" is displayed.

Next, an example of the display of the facsimile screen P20 will be described. In the facsimile screen P20 shown in FIG. 12, a message of "ready for transmit" is displayed, and other than that, "addition" key and "numbers of facsimile" display area are provided, and for example, when a telephone number of the remote station "0426-60-9285" is wanted to add, or transmission is required for a plurality of addresses which is wanted to add, the addition key is pressed, and the telephone number of the remote station is registered. Further, the number of a plurality of remote stations, "4 stations", or the like, is displayed.

Further, on the lower area of these, selection keys such as "abbreviated", "re-dial", "on-hook", "tone", "pause", "-", "delete", etc., are displayed. The "abbreviated" is a tag used at abbreviated input of the telephone number of the remote station, "re-dial" is a tag used at re-transmission, "on-hook" is a tag used for channel seizure at manual transmission/manual reception, "tone" is a tag used at switching of pulse/tone line, "pause" is a tag used at a pause between dials, or dial tone detection, "-" is a tag used as a dial number separator (hyphen), and "delete" is a tag used at one character deleting of addressed input data, or the like.

On the lower area of this display area, "address list", "document setting", "setting", "reserved list", "document reading", etc., are displayed on the same image panel. The "address list" is a tag used at switching a waiting screen to an address selection screen, "document setting" is a tag used at switching a waiting screen to an image quality selection screen, "setting" is a tag at registering each matter, "reserved list" is a tag used for calling the operation condition display screen of the reserved job such as the copy function, facsimile function or printer function, and "document reading" is a tag used at reading of the document at transmission of a plurality of platen document sheets, or at the mixed transmission of the ADF document/platen document.

In this example, the "document setting" is touched, and the document setting screen is displayed, and it is a basic waiting screen at the facsimile function selection. On this basic waiting screen, attributions such as "RADF", "resolution", "quality", "density", etc., are displayed, and on the lower area of "RADF", "cover sheet plus 2-sided", "2-sided", "1-sided", etc., is displayed. On the lower area of "resolution", "super-fine", "fine", "normal", "auto" are displayed. The document can be received in a mode corresponding to each display.

On the lower area of the "quality", "photo", "text/photo", "text" are displayed, and the image quality of the document can be set. On the lower area of the "density", "auto", "darker", "normal", and "lighter" are displayed, and the document can be recorded on the recording sheet at the copy density corresponding to each display.

Figure 13:
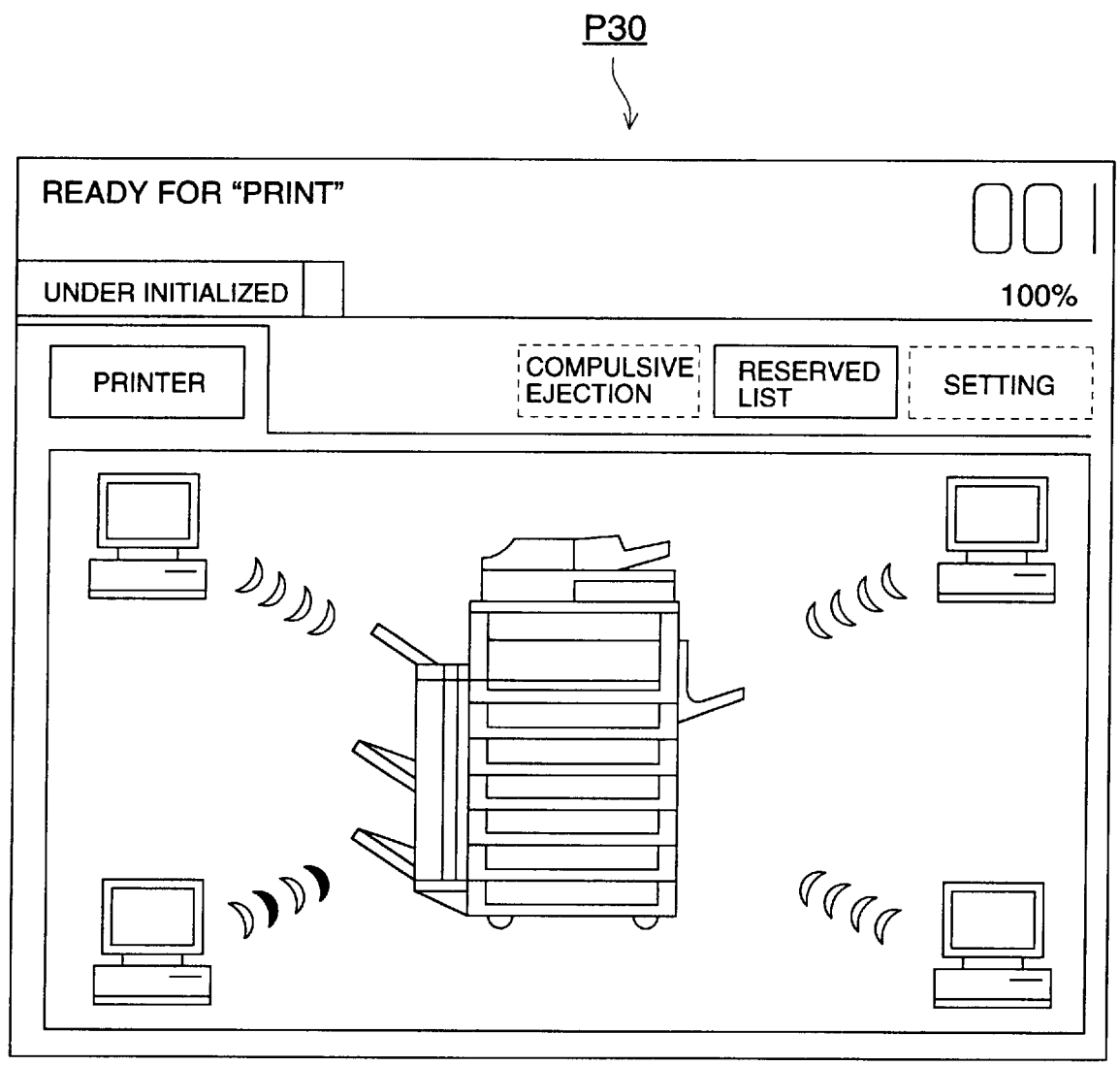
FIG. 13 is an image view showing an example of a display of a printer screen P30 of the hybrid machine 200.

Next, an example of display of the printer screen p30 will be described. The printer screen p30 shown in FIG. 13, is a printer basic waiting screen. On the printer screen p30, a message of "ready for print" is displayed. In this example, on the message area, "ready for print", or "under initialized" which is structured by 2 lines of 33 characters which are formed of alpha-numerical characters, are displayed under printer initialization. Under the condition that print can be performed, only "ready for print" is displayed. Other than that, on the printer screen P30, an icon area of "initial", and selection keys such as "printer", "compulsive ejection", "reserved list", "setting", etc., are displayed.

The "Initial" is an icon area showing a condition of the printer concerned, and is an icon showing that the printer is under initialization. The icon screen of "print" shows that the printer is under printing, or the screen of "waiting" shows that the printer is standby for printing. Other than that, an icon showing "error occurrence" is also prepared. Lower hierarchy icons are prepared for these icons. For example, as the icon showing the condition of the printer concerned, a pattern of "service man call" shown in the shape of spanner, not shown, or a pattern of "toner replenishment" shown in the shape of a toner developing section is prepared. In addition to that, as an icon of an output, a pattern of a group shown in the shape of a plurality of recording sheets, not shown, or patterns of sorting or face-up are prepared. As a stapling icon, a pattern of stapling portions on the recording sheet is prepared. Icons are used in common to the printer function and the copy function.

The "compulsive ejection" is a tag used when a recording sheet is compulsively ejected from a printer, "reserved list" is a tag used when the job operation such as the copy function, facsimile function, or printer function, is confirmed. In this example, compulsive completion of the job, and switching of a priority level can be conducted by the tag of the "reserved list". Further, the presumption time of recording can be displayed in a unit of minute. The "setting" is a tag used when several matters are set from the controller or operation conditions are registered. In this example, a test print can be carried out by the tag of the "setting".

Further, the image screen of the proper hybrid machine 100 is displayed on the lower area of these, and the image screens of the PC are respectively displayed on four corners of the periphery of that screen, and while data is being received from the host PC, a crescent-shaped image arrow is displayed flickering as if image data is transferred from the proper PC to the hybrid machine 100. Incidentally, a display area to count the number of print sheets is provided on the right upper side of the printer screen P30, and on the lower area thereof, remaining amounts of the image memory are displayed in %.

Figure 11:
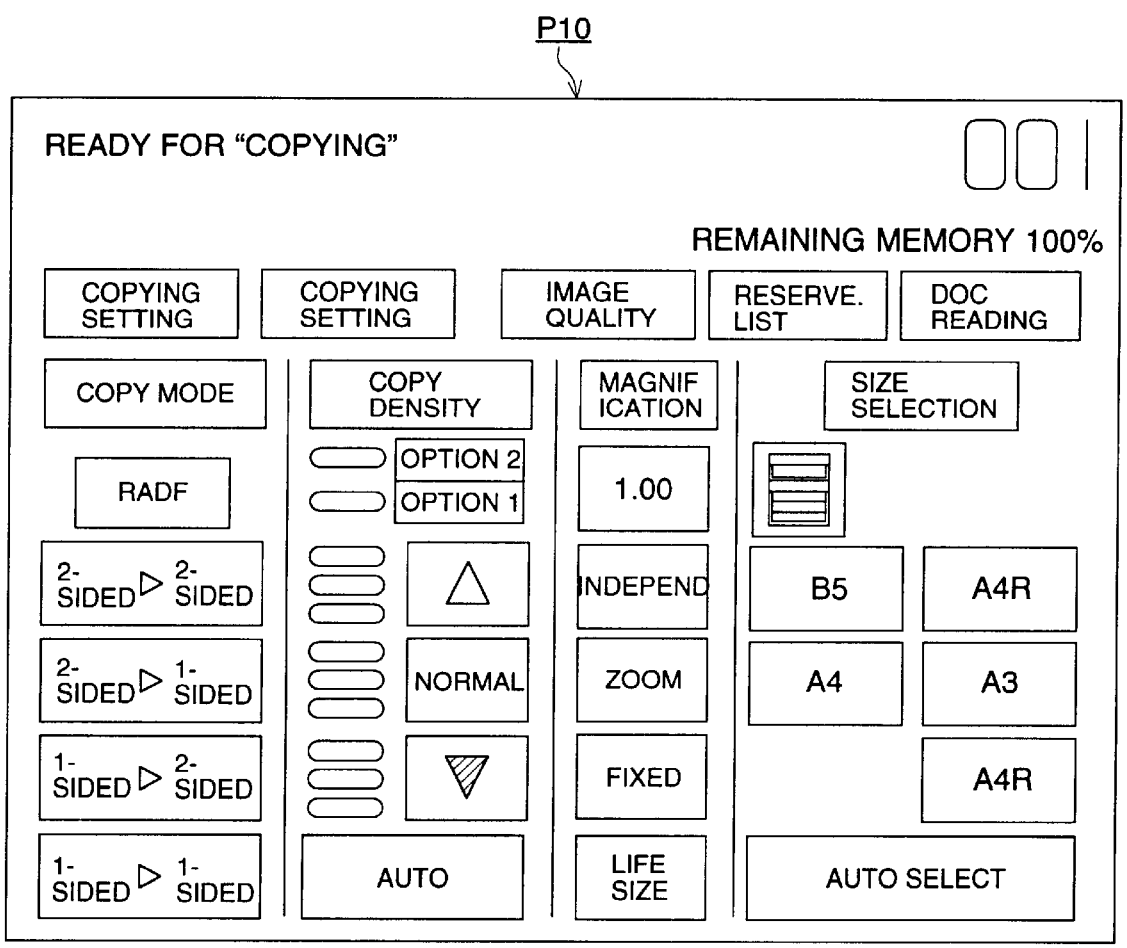
FIG. 11 is an image view showing an example of a display of a copy screen P10 of the hybrid machine 200.
Figure 14:
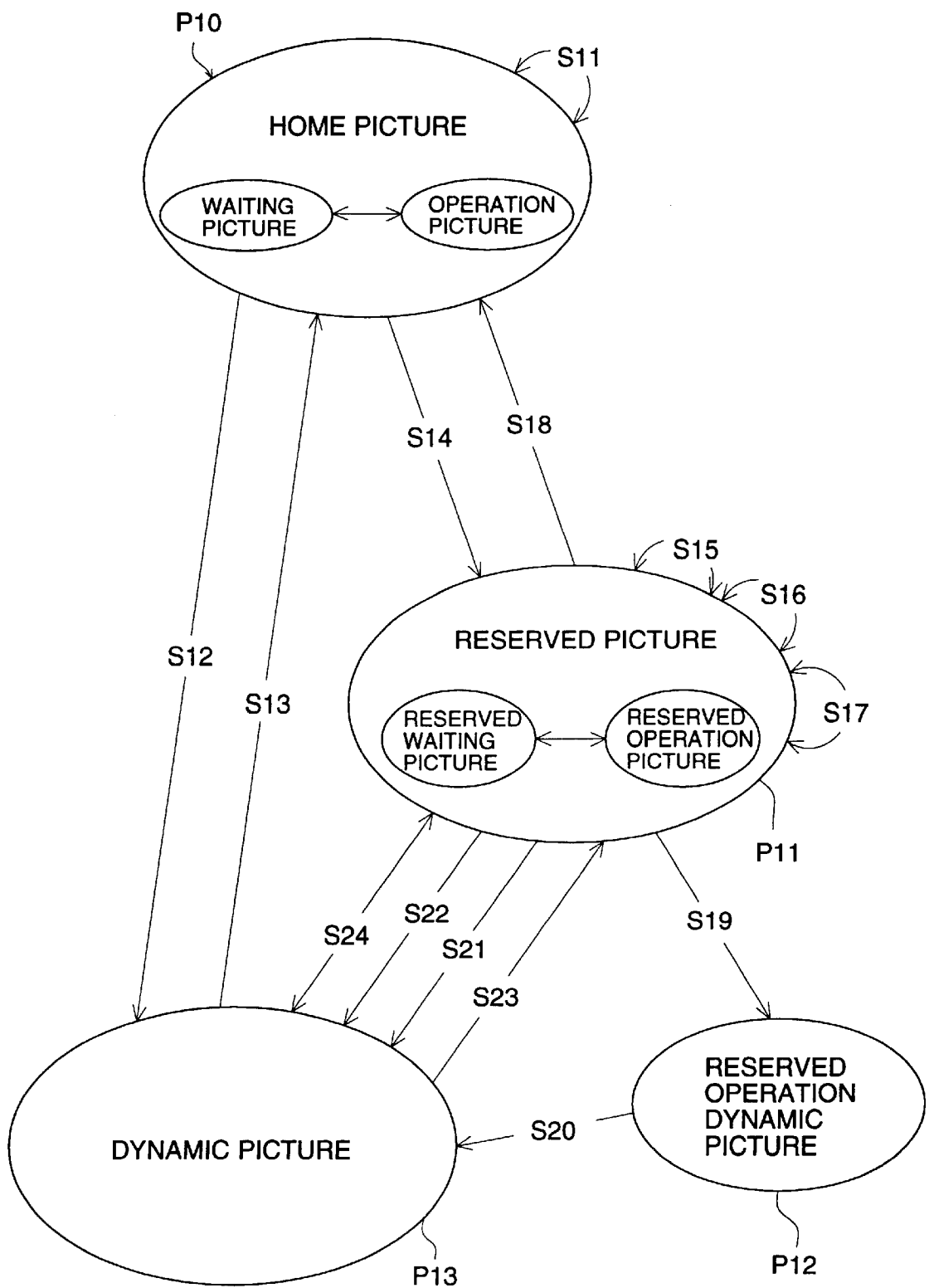
FIG. 14 is a conceptual view showing an example of a transition of a display of a screen at a copy mode.

Next, an example of transition of the display of the screen at copy mode will be described. FIG. 14 is a conceptual view showing an example of transition of the display of the screen at copy mode. In this example, in FIG. 14, when the copy mode is selected by the mode change key 89, the copy screen P10 shown in FIG. 11 is displayed on the display section 87 as a basic waiting screen. Because the operation screen is displayed on the copy screen P10, the operator can set the copy operation condition on the operation screen. On the basic waiting screen P10, as shown in an example of transition S11, operation icons can be displayed or deleted relating to generation and completion of the job in another mode.

Further, when the operation screen of the basic screen P10 is touched for a job start, the print job is started, and the display is switched from the basic waiting screen P10 to the operation screen P13. When the copy operation is completed on the operation screen P13, the display returns from the operation screen P13 to the basic waiting screen P10 in the example of transition S13.

Further, a copy reserve button is displayed on the operation screen of the basic waiting screen P10, and when this button is selected, the display is switched from the basic waiting screen P10 to the reserved screen P11 in the example of transition S14. On the reserved screen P11, a reserved waiting screen and a reserved operation screen are displayed, therefore, the operator can reserve the copy on the reserved operation screen. On the reserved screen P11, as shown in an example of transition S15, operation icons can be displayed or deleted relating to generation and completion of the job in another mode.

Further, as shown in the example of transition S16, when the automatic document feeding and reading apparatus 40 is in service in oneself/other modes, or similar cases, the display of a warning message or rejection of copy start can be carried out. Further, as shown in the example of transition S17, the operation condition set on the above operation screen, can be reset by pressing a mode reset button 907. Incidentally, when the job under printing operation now, is completed on the reserved screen P11, the print icon is deleted in the example of transition S18, and the display returns from the reserved screen P11 to the basic waiting screen P10.

Further, on the reserved screen P11, when the start button 911 is pressed, in the example of transition S19, the display is switched from the reserved screen P11 to a reserved job operation screen P12. During this operation, a message of under reading of the reserved job operation screen is displayed on the display section 87. Then, when the copy operation condition of the reserved job is read and the print job is registered, in the example of transition S20, the display is switched from the reserved job operation screen P12 to the operation screen P13, and the operation screen P13 showing under printing is displayed.

In this example of transition S20, when the print job has been completed already, the print operation of the reserved job is continuously conducted. When the priority level of the order of use of the reserved job is higher, the present job is stopped, and the print of the reserved job can be started. That is because, for example, there is a case where such an interrupt request that the operator wants rapid documents to be copied, comes in when the image data from the PC is printed out. In such the case, the interrupt button 909 is pressed by the operator.

Further, in the reserved screen P11, when the print icon is pressed, in the example of transition S21, the display is switched from the reserved screen P11 to the operation screen P13, and the operation screen P13 of under printing is displayed. Alternatively, in the reserved screen P11, even if no operation is conducted, after a predetermined period of time, the display of under printing is displayed in the example of transition S22, and the display is switched from the reserved screen P11 to the operation screen P13, and the operation screen P13 of under printing is displayed. Incidentally, when reserve button is pressed in the operation screen P13, in the example of transition S23, the display is switched from the operation screen P13 to the reserved screen P11, and the reserve operation can be carried out.

In this example, on the operation screen P13, when the document is set on the automatic document feeding and reading apparatus 40, in the example of transition S24, the display is switched from the operation screen P13 to the reserved screen P11, and the reserved screen is displayed. On the contrary, on the reserved screen P11, when the document set on the automatic document feeding and reading apparatus 40 is pulled out, and there is no document on the document placement section 41, in the example of transition S24, the display returns from the reserved screen P11 to the operation screen P13.

Figure 12:
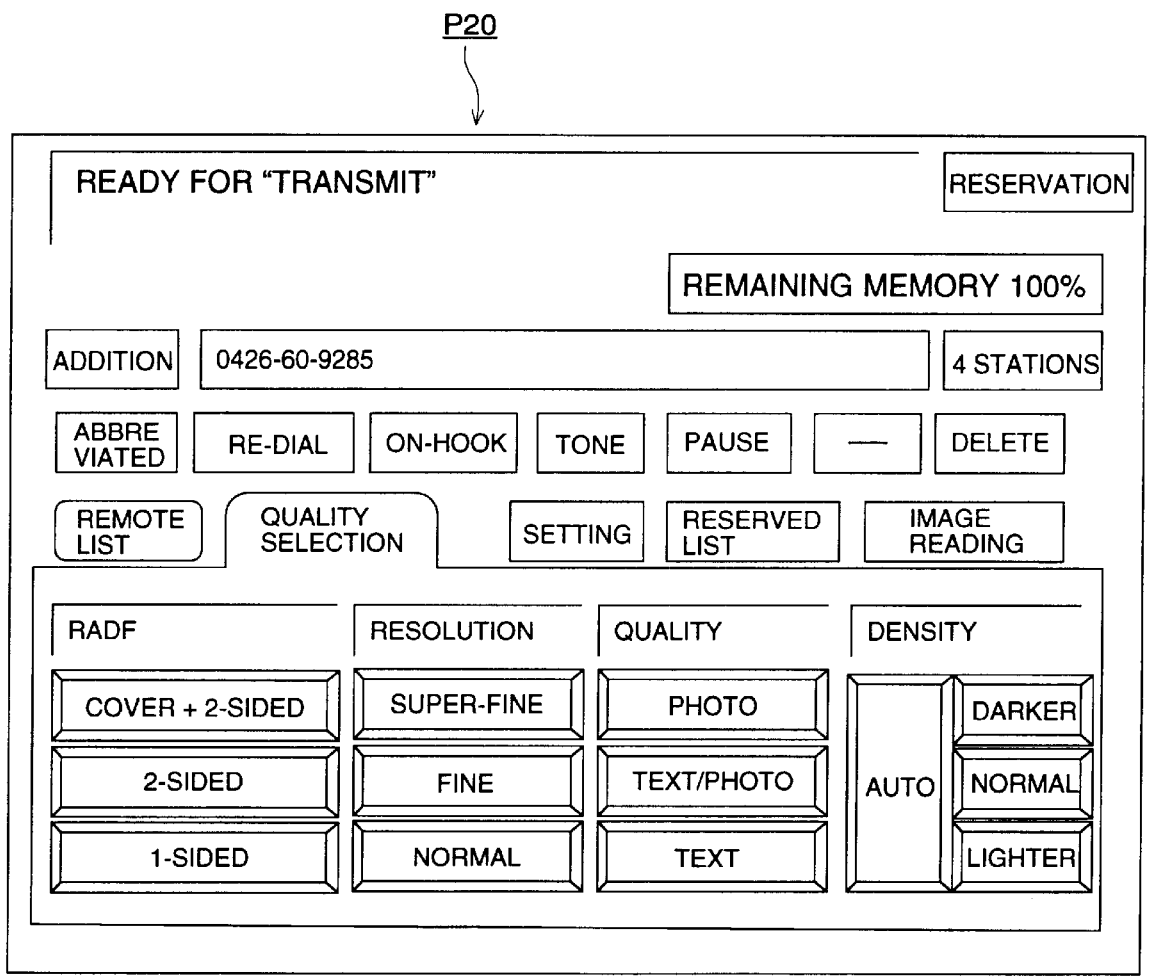
FIG. 12 is an image view showing an example of a display of a facsimile screen P20 of the hybrid machine 200.
Figure 15:
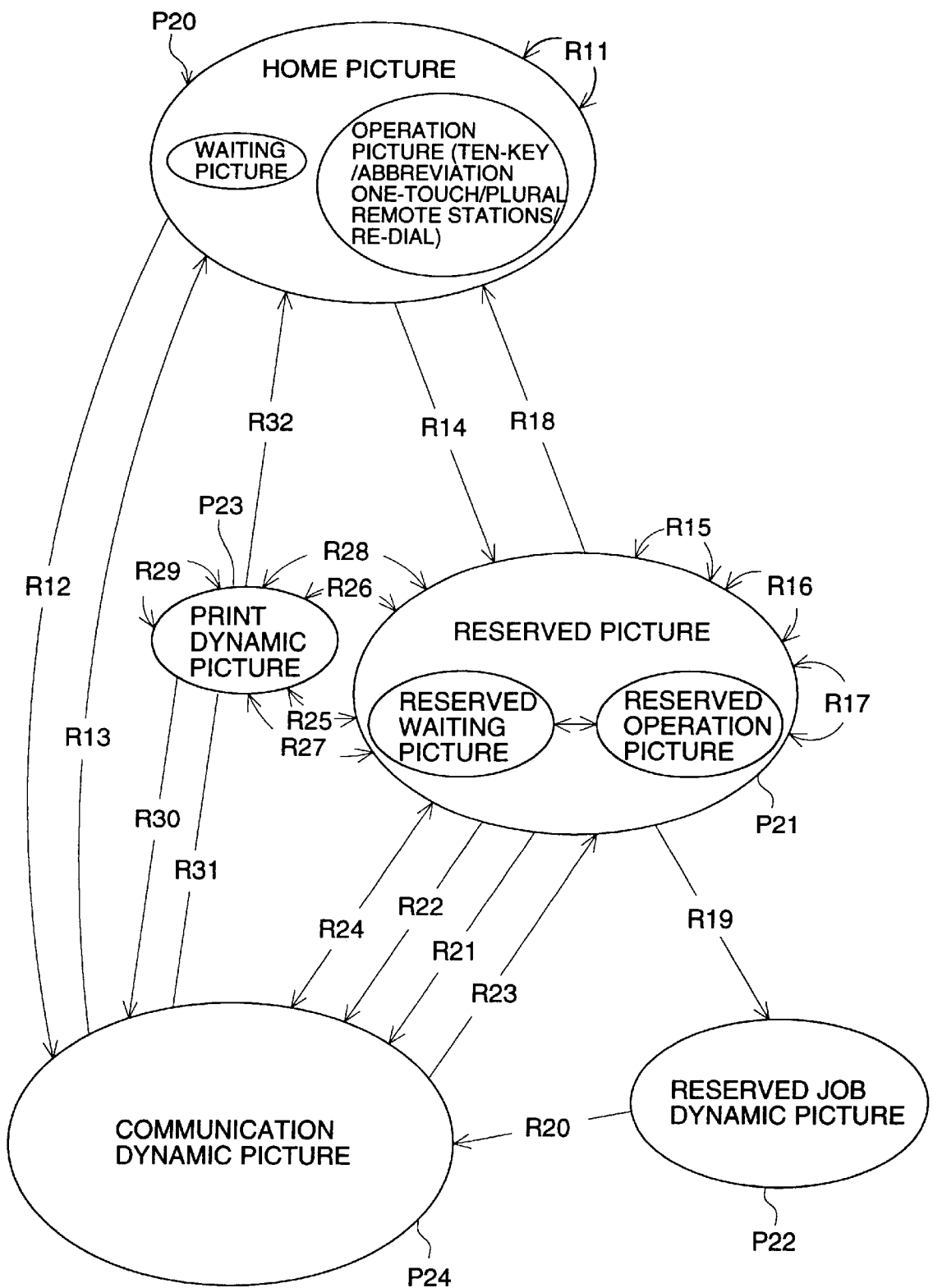
FIG. 15 is a conceptual view showing an example of a transition of a display of a screen at a facsimile mode.

Next, an example of transition of the display of the screen at the facsimile mode will be described. FIG. 15 is a conceptual view showing an example of transition of the display of the screen at the facsimile mode. In this example, when the "FAX" mode is selected by the mode change key 89 of the operation panel 900 shown in FIG. 10, the facsimile screen P20 shown in FIG. 12 is displayed as a basic waiting screen on the display section 87.

On this facsimile screen P20, because the operation screen, numeral keys, abbreviation, one-touch, plural addresses, re-dial, and the like, are displayed, the operator can set the operation condition of the facsimile device on its operation screen. On the basic waiting screen P20, as shown in an example of transition R11, operation icons can be displayed or deleted relating to generation and completion of the job in another mode.

Further, when the start button 911 of the operation panel 900 is pressed, the communication job is started, and the display is switched from the basic waiting screen P20 to the communication operation screen P24. Further, when transmission is completed on the communication operation screen P24, in the example of transition R13, the display returns from the communication operation screen P24 to the basic waiting screen P20.

Further, when the communication is started during user's operation on the operation screen of the basic waiting screen P20, in the example of transition R14, the display is switched from the basic waiting screen P20 to the reserved screen P21. On the reserved screen P21, a reserved waiting screen and reserve operation screen are displayed, therefore, the operator can reserve the communication on its operation screen. On the reserved screen P21, as shown in an example of transition R15, print icons can be displayed or deleted relating to generation and completion of the print job in another mode.

Further, as shown in the example of transition R16, when the automatic document feeding and reading apparatus 40 is in service in oneself/other modes, or similar cases, the display of a warning message or rejection of the start key can be carried out. Further, as shown in the example of transition R17, the operation condition set on the above reserve operation screen, can be reset by pressing a mode reset button 907. Incidentally, when the job under communication operation now, is completed on the reserved screen P21, the communication icon is deleted in the example of transition R18, and the display returns from the reserved screen P21 to the basic waiting screen P20.

On the reserved screen P21, when the start button 911 is pressed, document reading is started, and in the example of transition R19, the display is switched to a reserved job operation screen P22 of the reserved screen P21. During this operation, a message of under reading of the reserved job operation screen is displayed on the display section 87. Then, when the communication operation condition of the reserved job is read and the transmission job is registered, in the example of transition R20, the display is switched from the reserved job operation screen P22 to the communication operation screen P24, and the communication operation is displayed.

In the example of transition R20, when the communication job has been completed already, the transmission operation of the reserved job is continuously conducted. When the priority level of the transmission order of the reserved job is higher, after the present job has been completed, the transmission of the reserved job can be started prior to the other transmission job.

Alternatively, also when the communication icon is pressed on the reserved screen P21, the display is switched from the reserved screen P21 to the communication operation screen P24 in the example of transition R21, and the communication operation is displayed. Further alternatively, on the reserved screen P21, even when no operation is conducted, after a predetermined period of time passes, a message of "under communication operation" is displayed in the example of transition R22, and the display is switched from the reserved screen P21 to the communication operation screen P24, and the communication operation is displayed. Incidentally, when the reserve button is pressed on the communication operation screen P24, the communication icon is displayed, and in the example of transition R23, the display is switched from the communication operation screen P24 to the reserved screen P21, and the communication reserve operation can be carried out.

In this example, when the document is set on the automatic document feeding and reading apparatus 40 on the communication operation screen P24, the display is switched from the communication operation screen P24 to the reserved screen P21 in the example of transition R24, and the communication operation can be carried out. On the contrary, on the reserved screen P21, when the document set on the automatic document feeding and reading apparatus 40 is pulled out, and there is no document on the document placement section 41, in the example of transition R24, the display returns from the reserved screen P21 to the communication operation screen P24.

Further, when the communication icon is pressed on the reserved screen P21, in the example of transition R25, the display is switched from the reserved screen P21 to the print operation screen P23, and the print operation is displayed. Alternatively, on the reserved screen P21, even when no operation is conducted, after a predetermined period of time passes, in the example of transition R26, the display is switched from the reserved screen P21 to the print operation screen P23, and the print operation is displayed. Incidentally, when another communication starts on the print operation screen P23, the communication icon is displayed in the example of transition R29. Then, in the case where there is another communication operation, when the print is completed, the display is switched from the print operation screen P23 to the communication operation screen P24, and the communication operation is displayed.

Incidentally, the communication operation screen P24 is displayed also when image data is received from the remote station. Accordingly, on the communication operation screen P24, when the image data has been received, in the example of transition R31, the display is shifted from the communication operation screen P24 to the print operation screen P23. After that, on the print operation screen P23, when there is no printing out according to the reception document data or no other communication, in the example of transition R32, the display returns from the print operation screen P23 to the basic waiting screen P20.

Next, referring to FIGS. 16–28, the operations of the hybrid machine 200 will be described. In this example, operations of the following items will be described.

(1). For the copy function,
1-1. at the super fine copy,
1-2. at memory copy without rotation,
1-3. at memory copy with rotation,
1-4. at memory copy 2 in 1,
1-5. at memory copy booklet,
1-6. at FCOT copy, and
1-7. at list print.
(2). For the facsimile function,
2-1. at the memory FAX transmission without rotation,
2-2. at the memory FAX transmission with rotation,
2-3. at the memory FAX, quick transmission,
2-4. at the memory FAX, quick transmission with rotation, and
2-5. explanation of operation at the facsimile reception.
(3) For print function, operations of printing out at the PC communication will be described below.

1-1. At Super Fine Copy

Figure 16:
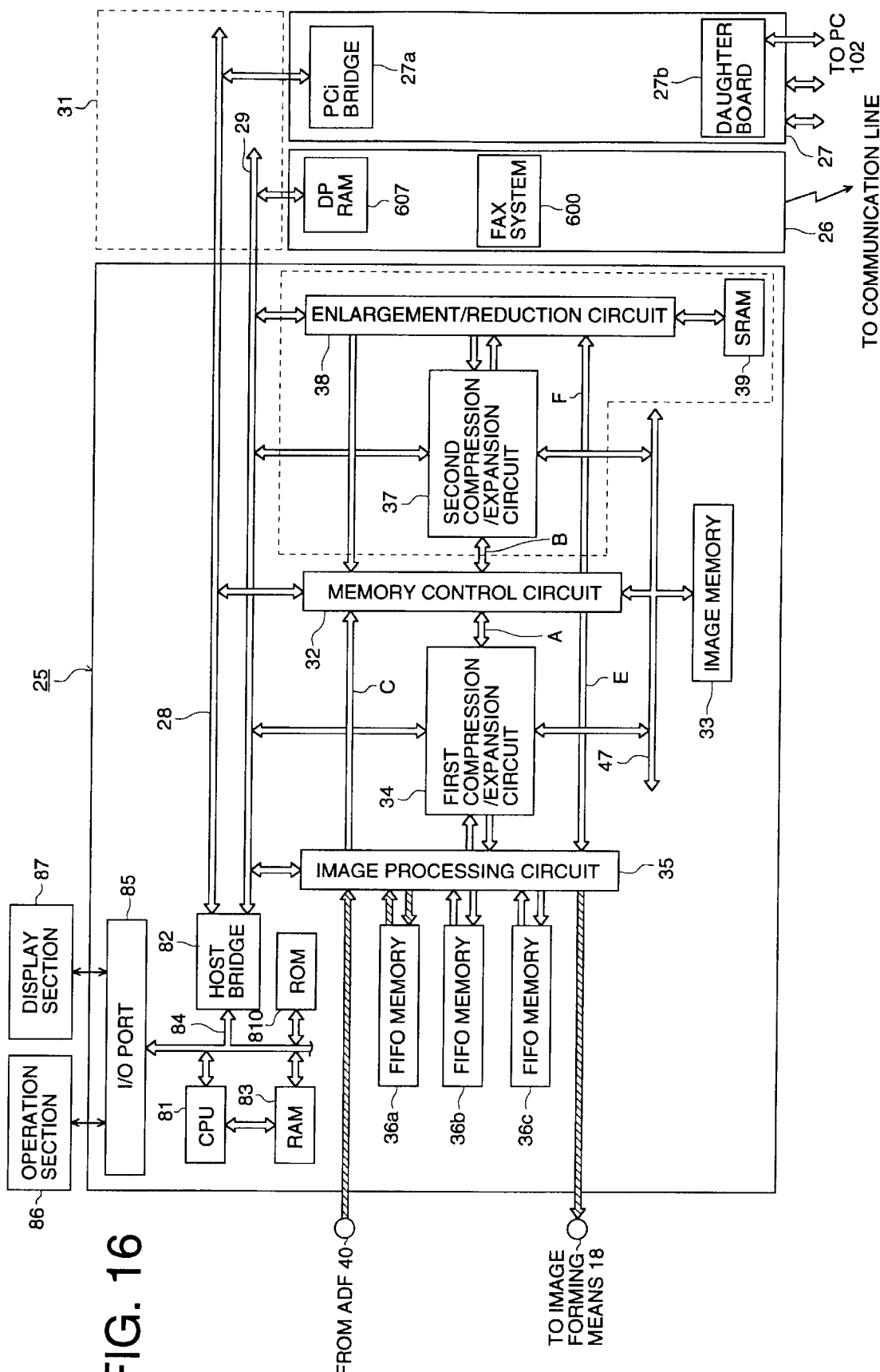
FIG. 16 is a block diagram showing an example of operation (at super fine copying) of the hybrid machine 200.

FIG. 16 is a block diagram showing an example of operations at super fine copy of the hybrid machine 200. In FIG. 16, hatched arrow portion shows a flow of image data. Hereinafter, in FIGS. 17–28, the flow of image data is shown by the same hatched arrow.

In this example, from the operation section 86, a request of "super fine copy" from the operator is made to the CPU 81 through the I/O port 85, data bus 28, and host bridge 82, or when the document is placed on the automatic document. feeding and reading apparatus 40 (hereinafter, called ADF), image data for several lines read by the ADF 40 is inputted into the image processing circuit 35 after temporarily passes through the FIFO memory 36a so that input/output timing is adjusted.

Then, in the image processing circuit 35, after image data received from the ADF 40 has been subjected to a predetermined image processing, the image data is directly sent to the image forming means 18. Accordingly, because the image data is processed without passing through the compression and expansion circuit 34, memory control circuit 32, and image memory, the document image can be formed on the recording sheet 30 shown in FIG. 5 at high speed.

1-2. At Memory Copy without Rotation

Figure 17:
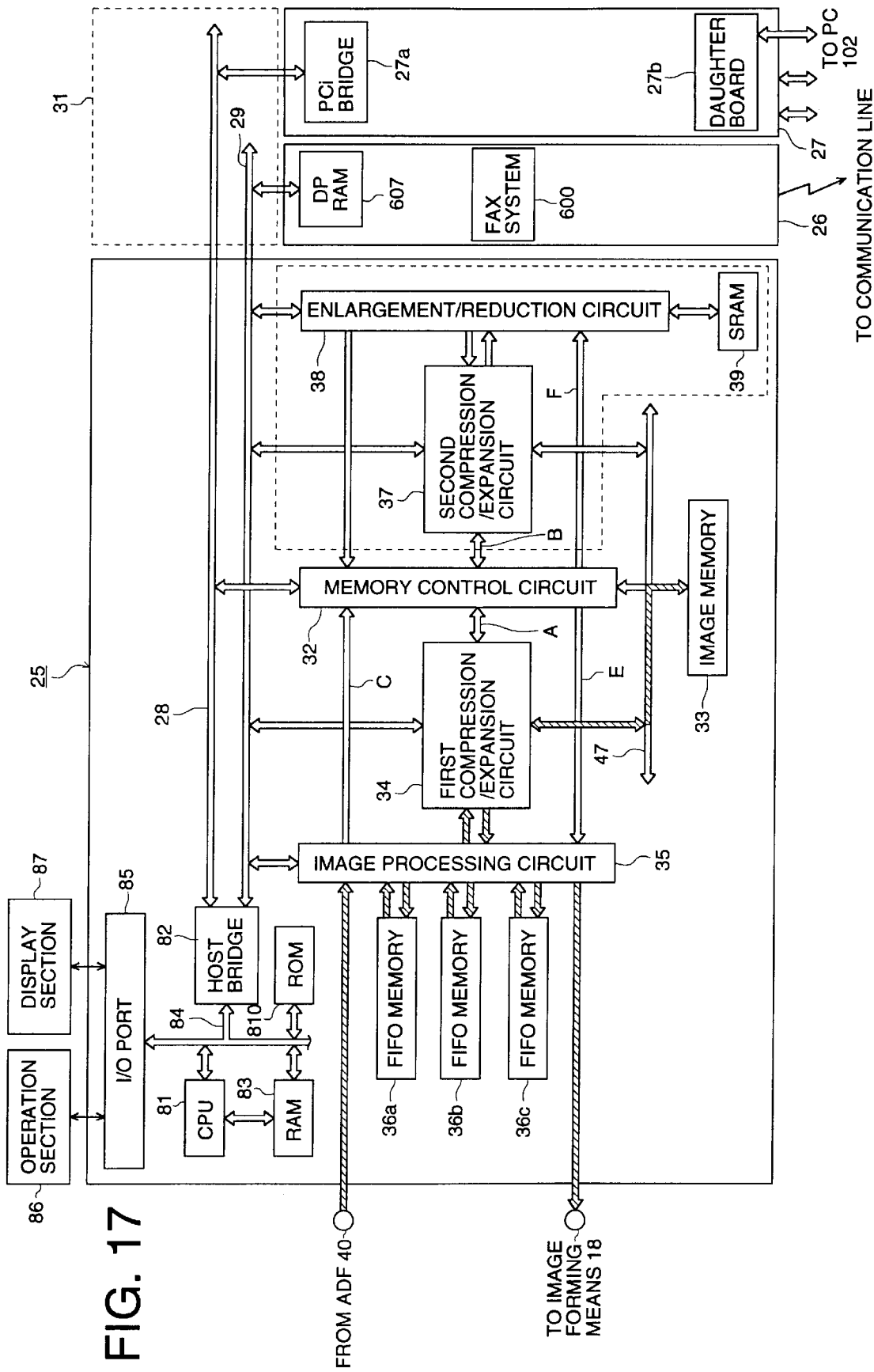
FIG. 17 is a block diagram showing an example of operation (at memory copy without rotation) of the hybrid machine 200.

FIG. 17 is a block diagram showing an example of operations of the hybrid machine 200 at memory copy without rotation. In this example, in the same manner as described above, when a request for the normal copy is made to the CPU 81 through the operation section 86 by the operator, image data for several lines read by the ADF 40 is inputted to the image processing circuit 35 through the FIFO memory 36a in the same manner as described above.

In this image processing circuit 35, the image data received from the ADF 40 is subjected to a predetermined image processing, and is transferred to the compression and expansion circuit 34 through the FIFO memory 36b. In the compression and expansion circuit 34, after the image data is compressed, the compressed image data is transferred to the copy/print area 33A of the image memory 33 and stored therein by the control of the memory control circuit 32.

Then, when the using right of the image forming means 18 is obtained, the compressed image data is read from the image memory 33 to the compression and expansion circuit 34. In the compression and expansion circuit 34, after the compressed image data is expanded, the image data is inputted into the image processing circuit 35, by the control of the memory control circuit 32.

In the image processing circuit 35, after a predetermined image processing is conducted on the image data, the input/output timing of the image data is adjusted through the FIFO memory 36c. The image data is successively read from the FIFO memory 36c to the image forming means 18, and the document image without rotation can be formed on the recording sheet 30 shown in FIG. 5, or the like.

1-3. At Memory Copy with Rotation

Figure 18:
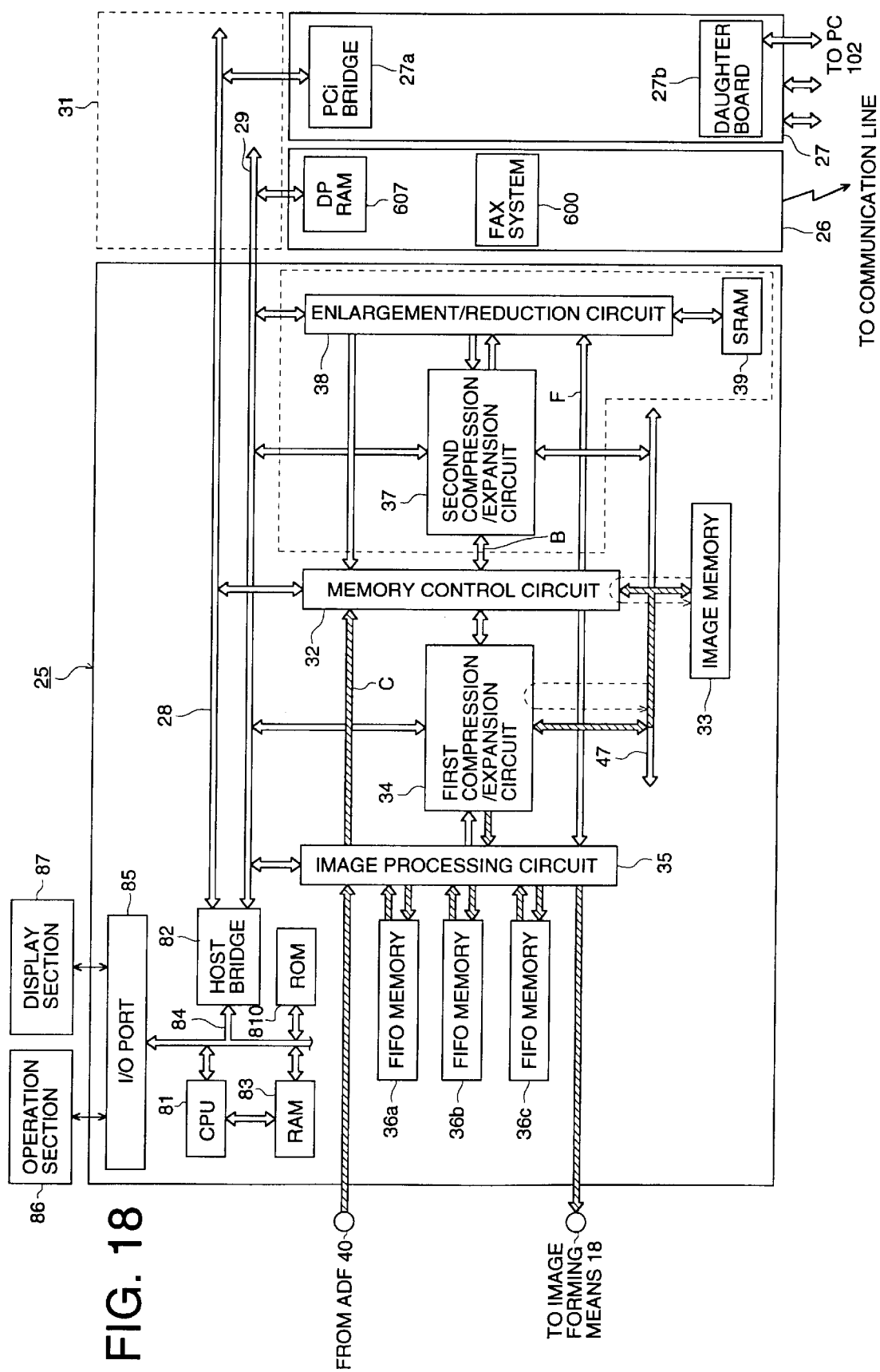
FIG. 18 is a block diagram showing an example of operation (at memory copy with rotation) of the hybrid machine 200.
Figure 19:
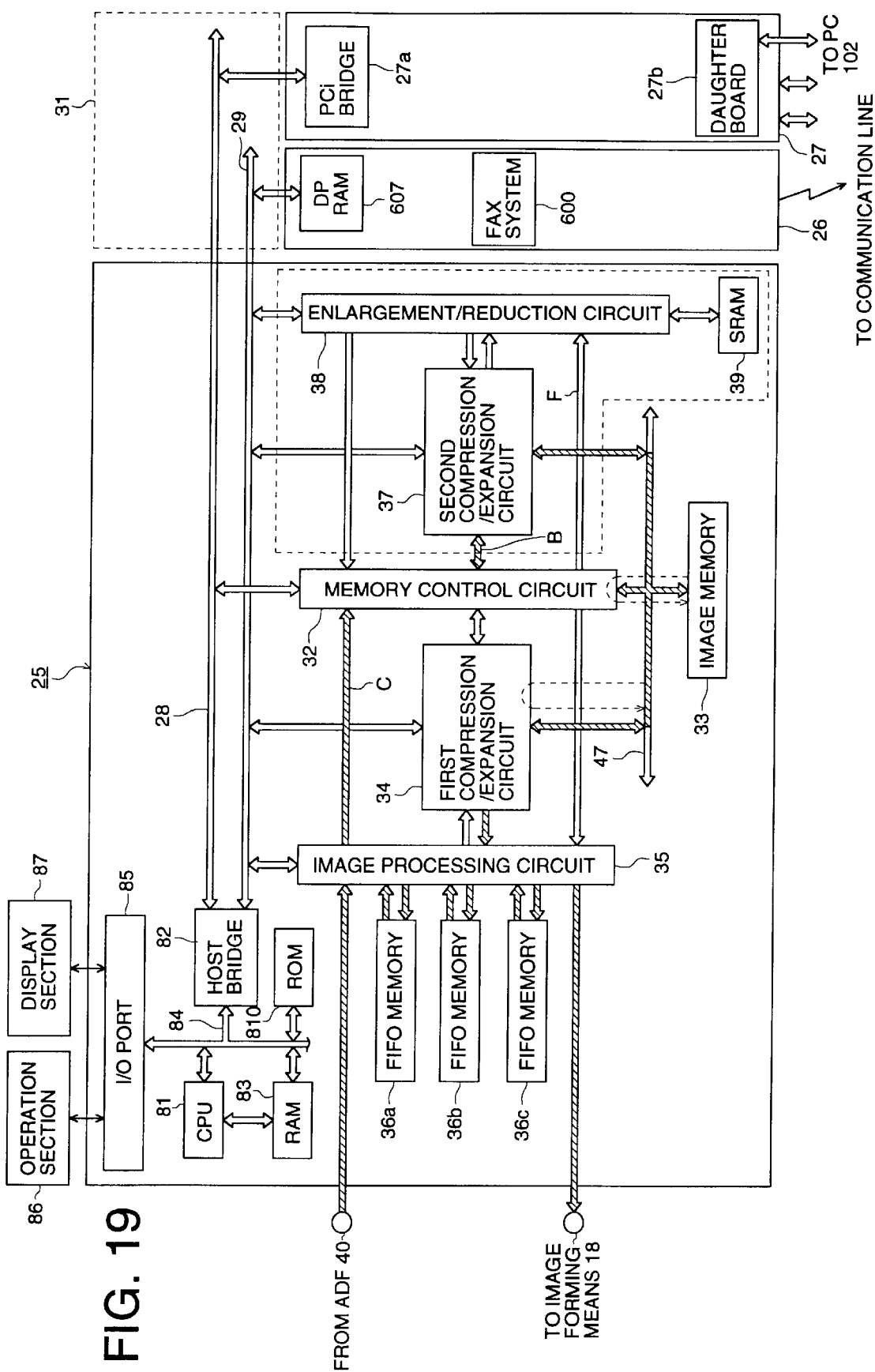
FIG. 19 is a block diagram showing an example of operation (at memory copying 2 in 1) of the hybrid machine 200.

FIG. 18 is a block diagram showing an example of operations of the hybrid machine 200 at memory copy with rotation. In this example, in the same manner as described above, when a request for the normal copy is made to the CPU 81 through the operation section 86 by the operator, image data for several lines read by the ADF 40 is inputted to the image processing circuit 35 through the FIFO memory 36a.

Then, for example, in order to made the size of the image data coincide with the size of a previously prepared recording sheet, in the image processing circuit 35, after the image data received from the ADF 40 is subjected to image rotation processing, the image data is directly stored in the image memory 33. After that, the image data is read from the image memory 33 to the compression and expansion circuit 34 and transferred. In the compression and expansion circuit 34, after the image data is compressed, the compressed image data is transferred again to the image memory 33, and stored therein.

Then, when the using right of the image forming means 18 is obtained, the compressed image data is read from the image memory 33 to the compression and expansion circuit 34. In the compression and expansion circuit 34, after the compressed image data is expanded, the image data is inputted into the image processing circuit 35, by the control of the memory control circuit 32.

In the image processing circuit 35, after a predetermined image processing is conducted on the image data, the input/output timing of the image data is adjusted through the FIFO memory 36c. Because the image data is successively read from the FIFO memory 36c to the image forming means 18, the document image with rotation processing can be formed on the recording sheet 30 shown in FIG. 5, or the like.

1-4. At Memory Copy 2 in 1

FIG. 18 is a block diagram showing an example of operations of the hybrid machine 200 at memory copy 2 in 1. This "memory copy 2 in 1" means that 2 document sheets are read and reduced, and the document is formed on one sheet of the recording sheet 30. In this example, in the same manner as described above, when a request for the "2 in 1"

copy is made to the CPU 81 through the operation section 86 by the operator, image data for 2 sheets read by the ADF 40 is inputted to the image processing circuit 35 through the FIFO memory 36a.

Herein, when the size of the previously prepared recording sheet does not match with the size of the image data, in order to match the size of the recording sheet with the size of the image data, the image data received from the ADF 40 is subjected to image rotation processing or the like, in the image processing circuit 35, and after that, timing of input/output of the image data after the image rotation processing is adjusted through the FIFO memory 36b.

This image data after the image rotation processing passes through the internal bus C from the FIFO memory 36b, and further, passes through the internal bus B connected to the memory control circuit 32, and is transferred to the compression and expansion circuit 37. In the compression and expansion circuit 37, after the image data for 2 pages is compressed, the compressed image data is transferred to and stored in the image memory 33 by the control of the memory control circuit 32.

Then, when the using right of the image forming means 18 is obtained, the compressed image data is read from the image memory 33 to the compression and expansion circuit 34. In the compression and expansion circuit 34, after the compressed image data is expanded, the image data is inputted into the image processing circuit 35, by the control of the memory control circuit 32. In the image processing circuit 35, after a predetermined image processing is conducted on the image data, the input/output timing of the image data is adjusted through the FIFO memory 36c. Because the image data is successively read from the FIFO memory 36c to the image forming means 18, the document image can be formed on the recording sheet 30 shown in FIG. 5.

1-5. At Memory Copy Booklet

Figure 20:
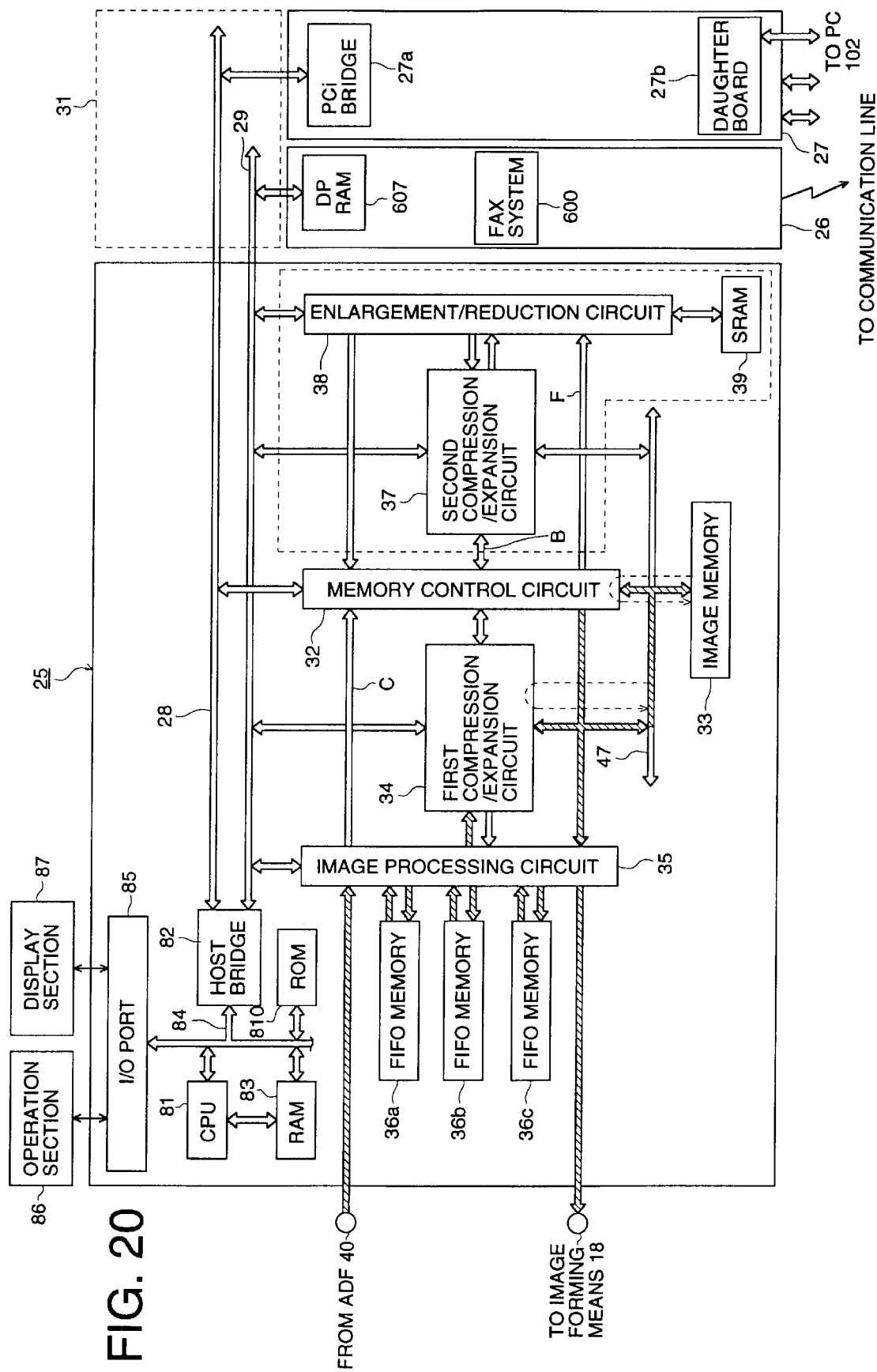
FIG. 20 is a block diagram showing an example of operation (at memory copy booklet) of the hybrid machine 200.
Figure 21:
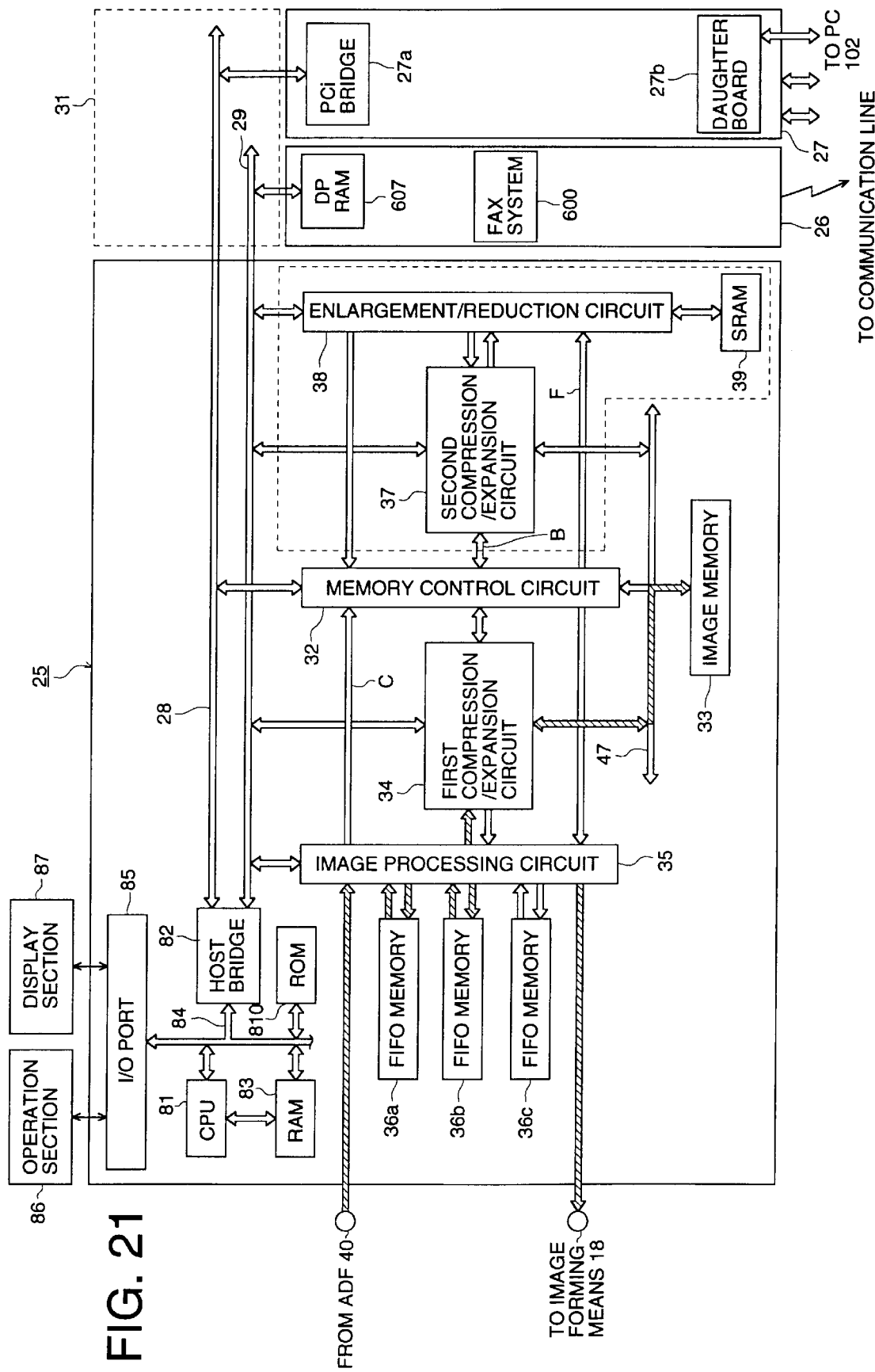
FIG. 21 is a block diagram showing an example of operation (at FCOT copy) of the hybrid machine 200.
Figure 22:
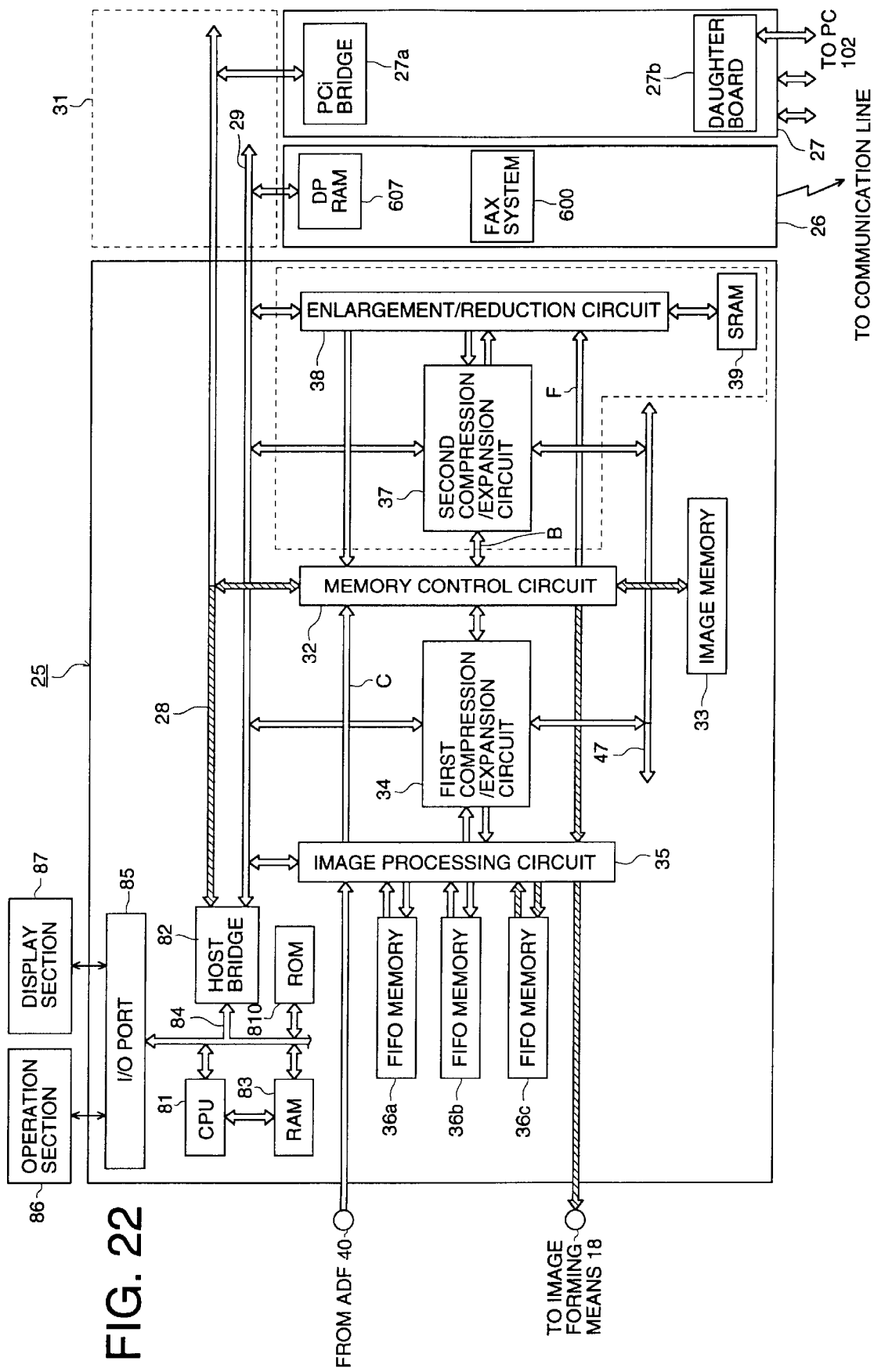
FIG. 22 is a block diagram showing an example of operation (at list print) of the hybrid machine 200.

FIG. 20 is a block diagram showing an example of operations of the hybrid machine 200 at memory copy booklet. This "memory copy booklet" means that all pages of the document are read, and 2 pages of the document are formed on the left and right portions of 1 sheet of the recording sheets 30, that is, formed into double-leaf type which is opened for reading. In this example, in the same manner as described above, when a request for the "booklet" copy is made to the CPU 81 through the operation section 86 by the operator, image data for all pages read by the ADF 40 is successively inputted into the image processing circuit 35 through the FIFO memory 36a. Then, the image data received from the ADF 40 is subjected to predetermined image processing in the image processing circuit 35, and timing of input/output of the image data is adjusted through the FIFO memory 36b.

After that, the image data is transferred from the FIFO memory 36b to the compression and expansion circuit 34. In the compression and expansion circuit 34, after the image data has been compressed, the compressed image data is transferred to the image memory 33 is stored therein by the control of the memory control circuit 32. Then, when the using right of the image forming means 18 is obtained, the compressed image data for 2 pages is read from the image memory 33 to the compression and expansion circuit 34. In the compression and expansion circuit 34, after the compressed image data is expanded, the image data is inputted into the image processing circuit 35, by the control of the memory control circuit 32.

In the image processing circuit 35, after predetermined image processing is conducted on the image data, the input/output timing of the image data is adjusted through the FIFO memory 36c. Because the image data for 2 pages is successively read from the FIFO memory 36c to the image forming means 18, the document image can be formed on the left and right portions of one sheet of the recording sheet 30 shown in FIG. 5 as the double-leaf type.

1-6. At FCOT Copy

FIG. 20 is a block diagram showing an example of operations of the hybrid machine 200 at FCOT (First Copy Out Time) copy. This "FCOT copy" means that a first one sheet of the document is copied and the image data is stored in the image memory 33. In this example, in the same manner as described above, when a request for the "FCOT copy" is made to the CPU 81 through the operation section 86 by the operator, image data for several lines read by the ADF 40 is temporarily stored in the FIFO memory 36a, then, inputted into the image processing circuit 35.

Then, in the image processing circuit 35, after the image data received from the ADF 40 is subjected to predetermined image processing, the image data is directly sent to the image forming means 18. Simultaneous with this, the image data is transferred from the FIFO memory 36b to the compression and expansion circuit 34. In the compression and expansion circuit 34, after the image data is compressed, the compressed image data is transferred to the image memory 33 and stored therein by the control of the memory control circuit 32. Accordingly, one page of the document can be FCOT copied, and together with that, its image data can be stored in the image memory 33.

1-7. At List Print

FIG. 20 is a block diagram showing an example of operations of the hybrid machine 200 at list print. This "list print" means that control data, or the like, recorded in the RAM 83 is printed out on the recording sheet 30. In this example, in the same manner as described above, when a request for the "list print" is made to the CPU 81 through the operation section 86 by the operator, in the CPU 81, in order to develop the list, control data is read from the RAM 83 through the CPU bus 84.

The control data read from the RAM 83 is transferred from the host bridge 82 to the memory control circuit 32 through the data bus 28. The image data read from the image memory 33 based on the control data is inputted into the image processing circuit 35 through the internal bus E by the control of the memory control circuit 32.

Then, in the image processing circuit 35, after the image data received from the memory control circuit 32 is subjected to predetermined image processing, input/output timing is adjusted through the FIFO memory 36c. The image data successively read from the FIFO memory 36c is transferred to the image forming means 18. Accordingly, the image based on the control data recorded in the RAM 83 can be printed out on the recording sheet 30.

2-1. At Memory FAX Transmission without Rotation

Figure 23:
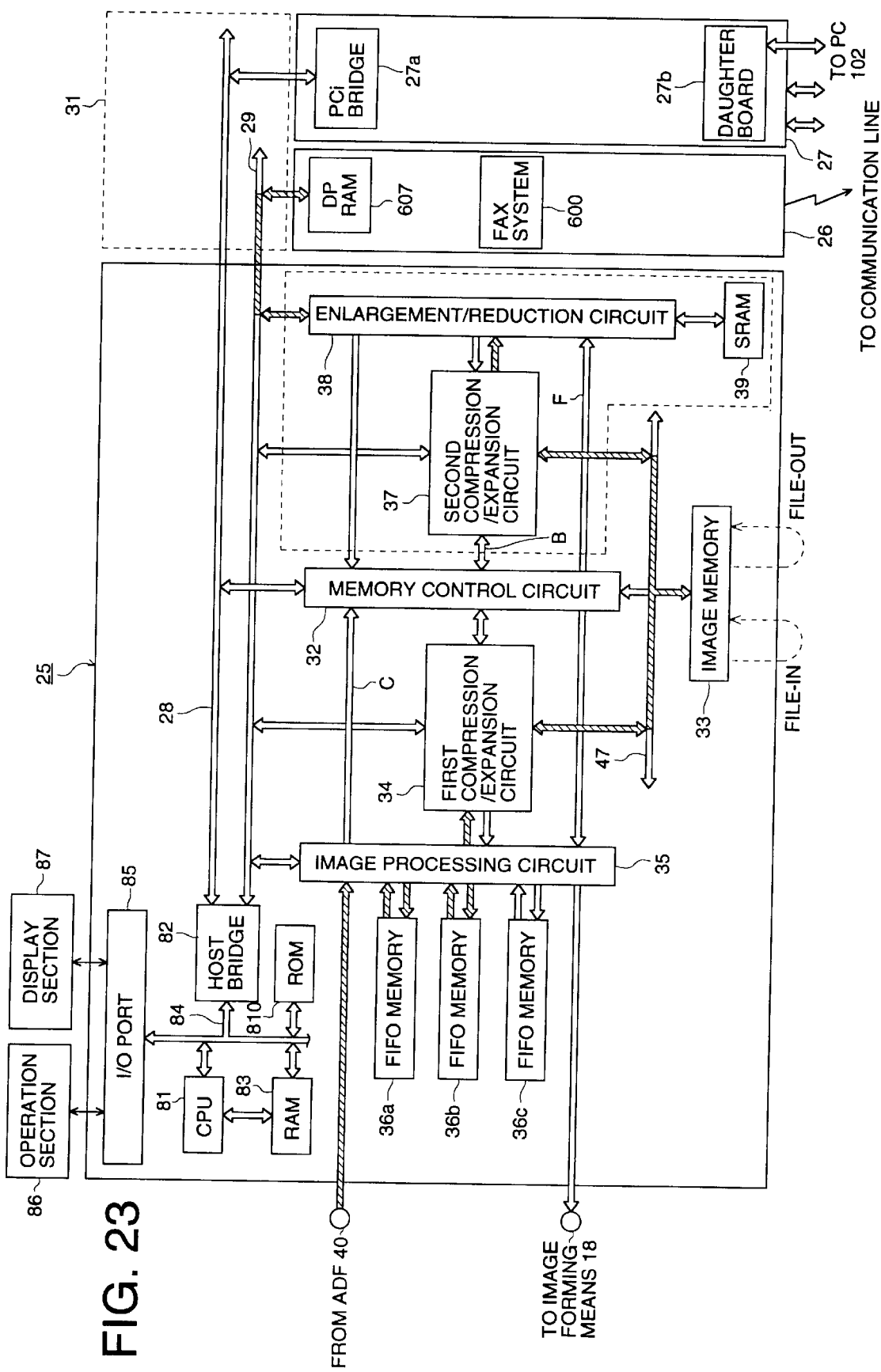
FIG. 23 is a block diagram showing an example of operation (at memory in FAX transmission without rotation) of the hybrid machine 200.

FIG. 23 is a block diagram showing an example of operations of the hybrid machine 200 at memory FAX transmission without rotation. In this example, in the same manner as described above, in the case where a request for normal FAX is made to the CPU 81 through the operation section 86 by the operator or when the time is up, the image data read by the ADF 40 is inputted into the image processing circuit 35 through the FIFO memory 36a. Then, in the image processing circuit 35, after the image data received from the ADF 40 is subjected to predetermined image processing, or through the FIFO memory 36b, input/output timing of the image data received from the ADF 40 is adjusted.

Then, the image data is transferred from the FIFO memory 36b to the compression and expansion circuit 34. In the compression and expansion circuit 34, after the image data is compressed, the compressed image data is transferred to the image memory 33 and stored therein (file in) by the control of the memory control circuit 32. Then, the communication line is connected by the FAX substrate 26, the compressed image data is read (file out) from the image memory 33 to the compression and expansion circuit 37 by 1 page unit. In the compression and expansion circuit 37, after the compressed image data is expanded, the image data is inputted into the enlargement and reduction circuit 38 by the control of the memory control circuit 32.

In the enlargement and reduction circuit 38, after the image data is subjected to predetermined enlargement and reduction processing, the processed image data is transferred to the FAX substrate 26 as the transmission image data. This transmission image data is subjected to coding processing in the FAX substrate 26 shown in FIG. 9. The coded image data is modulated by the communication modem 602 so that the image data matches with the frequency band of the public network. The modulation signal by the communication modem 602 is outputted to the communication line through the NCU 601 (refer to FIG. 9). Accordingly, the previously set memory FAX transmission without rotation of the document can be carried out.

2-2. At Memory FAX Transmission with Rotation

Figure 24:
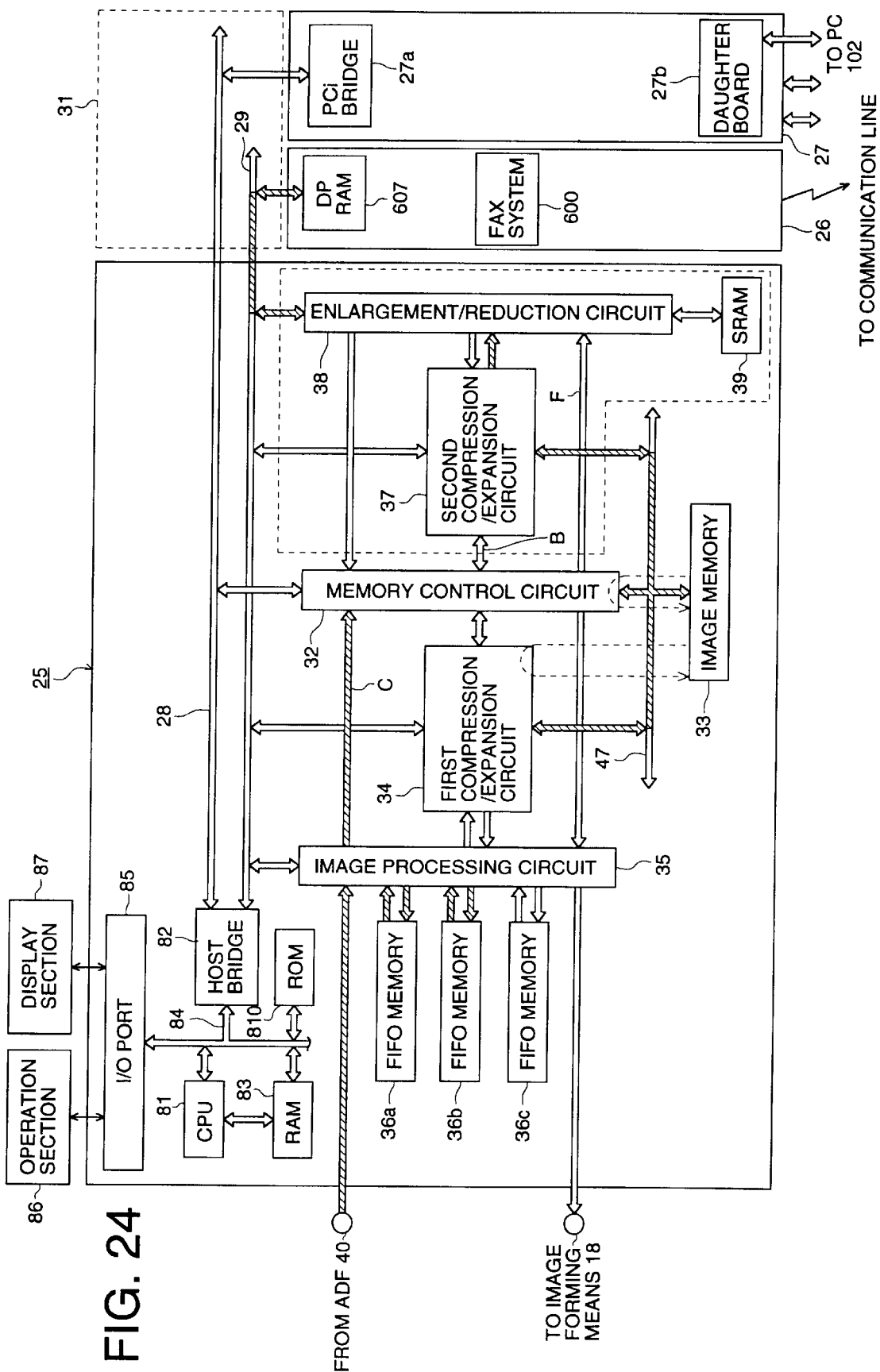
FIG. 24 is a block diagram showing an example of operation (at memory in FAX transmission with rotation) of the hybrid machine 200.

FIG. 24 is a block diagram showing an example of operations of the hybrid machine 200 at memory FAX transmission with rotation. In this example, in the same manner as described above, in the case where a request for FAX with rotation is made to the CPU 81 through the operation section 86 by the operator or when the time is up, the image data for several lines read by the ADF 40 is inputted into the image processing circuit 35 through the FIFO memory 36a.

Then, in the image processing circuit 35, after the image data received from the ADF 40 is subjected to image rotation processing or the like, for example, so that the size of the image data matches with the size of a previously prepared recording sheet at the terminal equipment of the remote station, input/output timing of the image data after the image rotation is adjusted through the FIFO memory 36b.

The image data after the image rotation passes through the internal bus C from the FIFO memory 36b, and temporarily stored in the image memory 33 by the control of the memory control circuit 32. After that, the image data is read from the image memory 33 to the compression and expansion circuit 34 and transferred. In the compression and expansion circuit 34, after the image data is compressed, the compressed image data is transferred again to the image memory 33 and stored therein (file in), by the control of the memory control circuit 32.

Then, the communication line is connected by the FAX substrate 26, the compressed image data is read (file out) from the image memory 33 to the compression and expansion circuit 37 by 1 page unit, in the same manner as in the memory FAX transmission without rotation. In the compression and expansion circuit 37, after the compressed image data is expanded, the image data is inputted into the enlargement and reduction circuit 38 by the control of the memory control circuit 32.

In the enlargement and reduction circuit 38, after the image data is subjected to predetermined enlargement and reduction processing, the processed image data is transferred to the FAX substrate 26 as the transmission image data. This transmission image data is subjected to coding processing in the FAX substrate 26 shown in FIG. 9. After the coded image data is modulated by the communication modem 602, the modulated signal is outputted to the communication line through the NCU 601 (refer to FIG. 9). Accordingly, the previously set memory FAX transmission with rotation of the document can be carried out.

2-3. At Memory FAX, Quick Transmission

Figure 25:
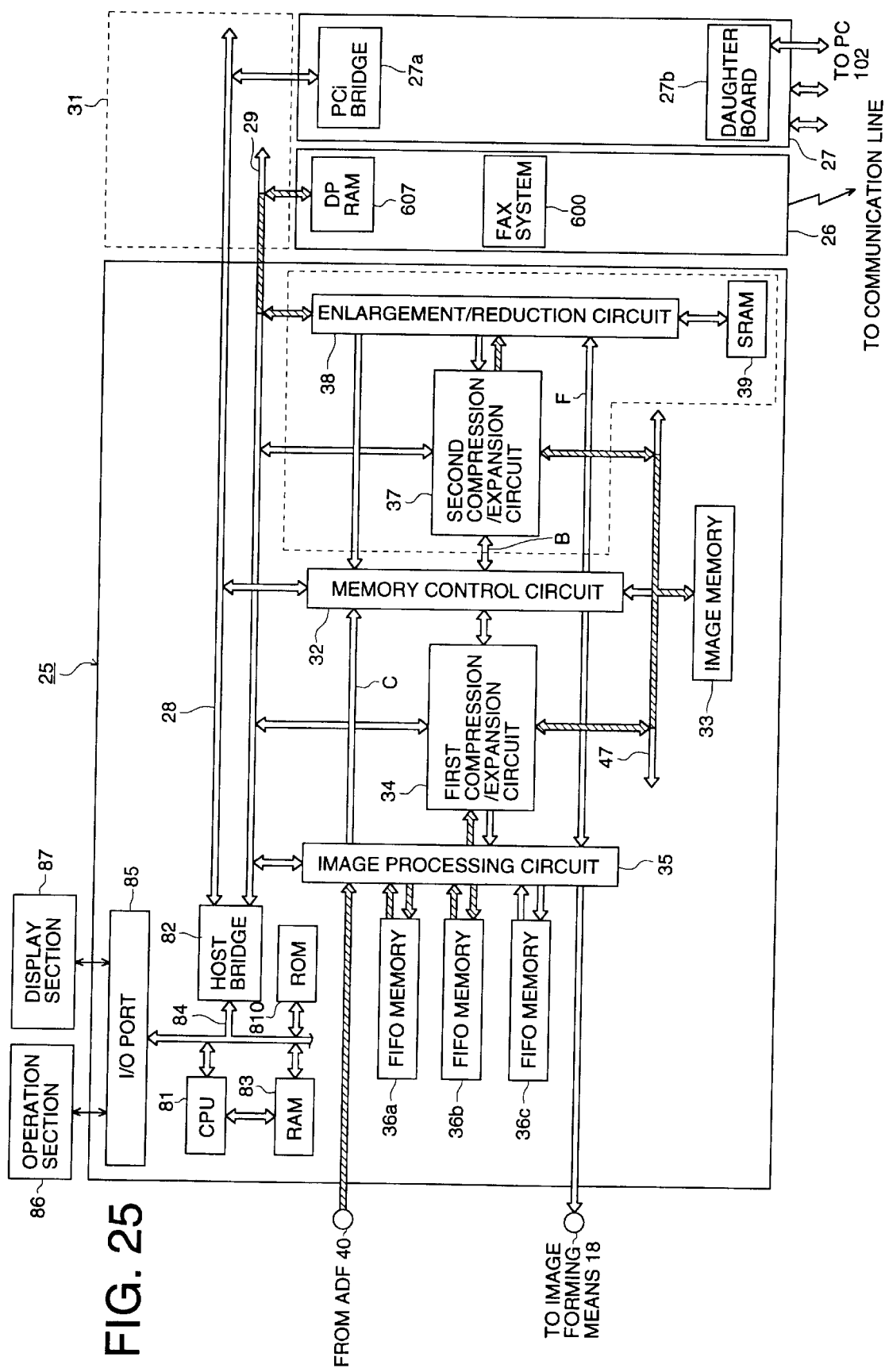
FIG. 25 is a block diagram showing an example of operation (at memory in FAX, quick transmission) of the hybrid machine 200.

FIG. 25 is a block diagram showing an example of operations of the hybrid machine 200 at memory FAX.quick transmission. In this example, in the same manner as described above, in the case where a request for memory FAX/quick transmission is made to the CPU 81 through the operation section 86 by the operator or when the time is up, the image data for several lines read by the ADF 40 is inputted into the image processing circuit 35 through the FIFO memory 36a.

Then, in the image processing circuit 35, after the image data received from the ADF 40 is subjected to predetermined image processing, input/output timing of the processed image data is adjusted through the FIFO memory 36c.

The image data after image processing does not pass through the internal bus C from the FIFO memory 36b, and is not stored in the image memory 33 as in the above-described memory FAX transmission with rotation, but the image data is directly transferred to the compression and expansion circuit 34, therefore, after the image data is compressed, the compressed image data is transferred from the compression and expansion circuit 34 to the image memory 33 and stored therein, by the control of the memory control circuit 32.

Then, the communication line is connected by the FAX substrate 26, the compressed image data is read (file out) from the image memory 33 to the compression and expansion circuit 37, in the same manner as in the memory FAX transmission with rotation. In the compression and expansion circuit 37, after the compressed image data is expanded, the image data is inputted into the enlargement and reduction circuit 38 by the control of the memory control circuit 32.

In the enlargement and reduction circuit 38, after the image data is subjected to predetermined enlargement and reduction processing, the processed image data is transferred to the FAX substrate 26 as the transmission image data. This transmission image data is subjected to predetermined coding processing in the FAX substrate 26 shown in FIG. 9. After the coded image data is modulated by the communication modem 602, the modulated signal is outputted to the communication line through the NCU 601 (refer to FIG. 9). Accordingly, the previously set memory FAX.quick transmission without image rotation of the document can be carried out.

2-4. At Memory FAX, Quick Transmission with Rotation

Figure 26:
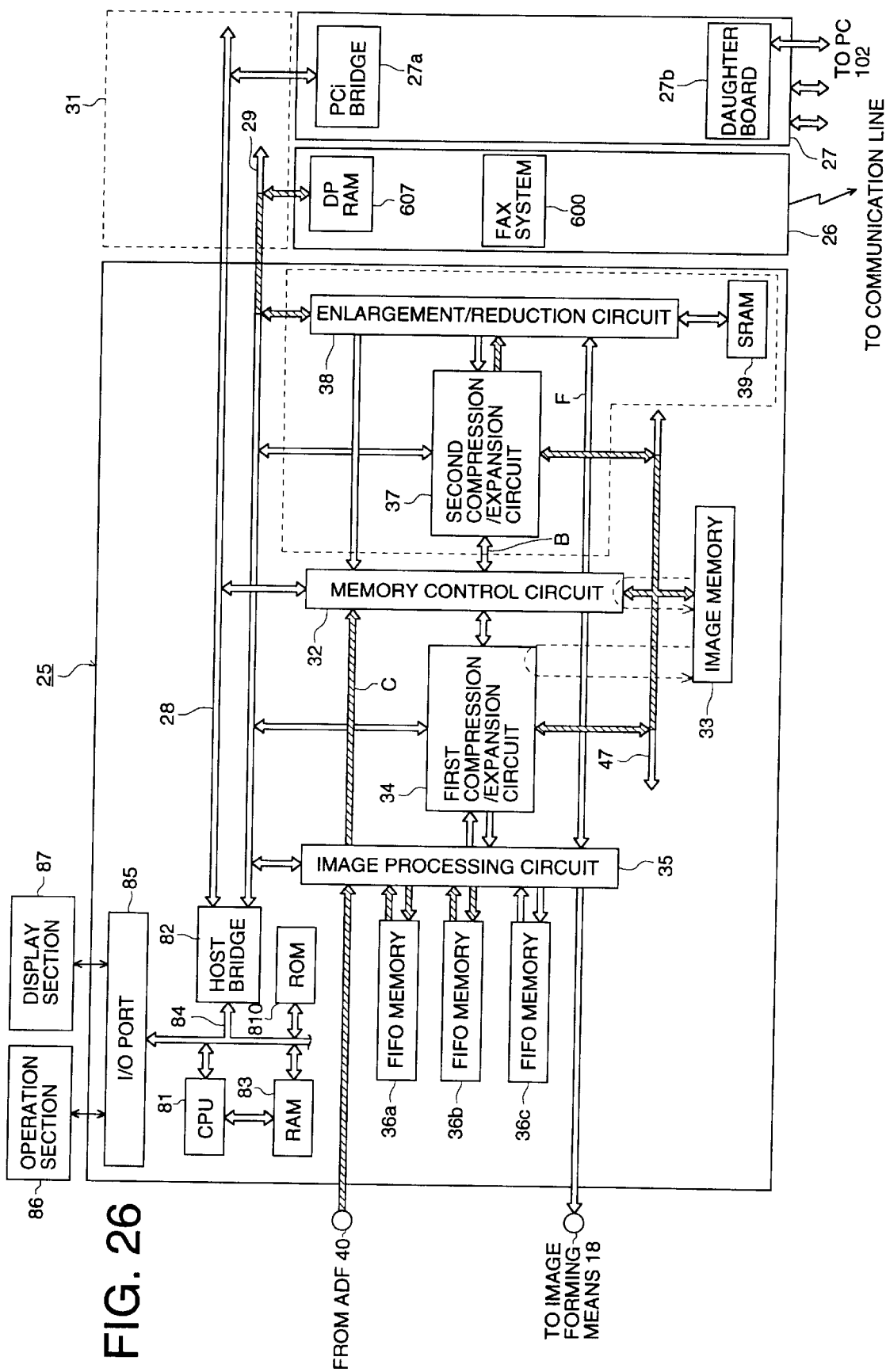
FIG. 26 is a block diagram showing an example of operation (at memory in FAX.quick transmission with rotation) of the hybrid machine 200.

FIG. 26 is a block diagram showing an example of operations of the hybrid machine 200 at memory FAX.quick transmission with rotation. In this example, in the same manner as described above, in the case where a request for memory FAX.quick transmission with rotation is made to the CPU 81 through the operation section 86 by the operator or when the time is up, the image data for several lines read by the ADF 40 is inputted into the image processing circuit 35 through the FIFO memory 36a.

Then, in the image processing circuit 35, after the image data received from the ADF 40 is subjected to image rotation processing or the like, for example, so that the size of the image data matches with the size of a previously prepared recording sheet at the terminal equipment of the remote station, input/output timing of the image data after the image rotation is adjusted through the FIFO memory 36b.

The image data after the image rotation passes through the internal bus C from the FIFO memory 36b, and temporarily stored in the image memory 33 by the control of the memory control circuit 32, as in the above-described memory FAX transmission with rotation. After that, the image data is transferred to the compression and expansion circuit 34. Accordingly, after the image data is compressed, the compressed image data is transferred from the compression and expansion circuit 34 to the image memory 33 and stored therein (file in), by the control of the memory control circuit 32.

Then, the communication line is connected by the FAX substrate 26, the compressed image data is read (file out) from the image memory 33 to the compression and expansion circuit 37 by one page unit, in the same manner as in the memory FAX transmission with rotation. In the compression and expansion circuit 37, after the compressed image data is expanded, the image data is inputted into the enlargement and reduction circuit 38 by the control of the memory control circuit 32.

In the enlargement and reduction circuit 38, after the image data is subjected to predetermined enlargement and reduction processing, the processed image data is transferred to the FAX substrate 26 as the transmission image data. This transmission image data is subjected to predetermined coding processing in the FAX substrate 26 shown in FIG. 9. After the coded image data is modulated by the communication modem 602, the modulated signal is outputted to the communication line through the NCU 601 (refer to FIG. 9).

2-5. At Facsimile Reception

Figure 27:
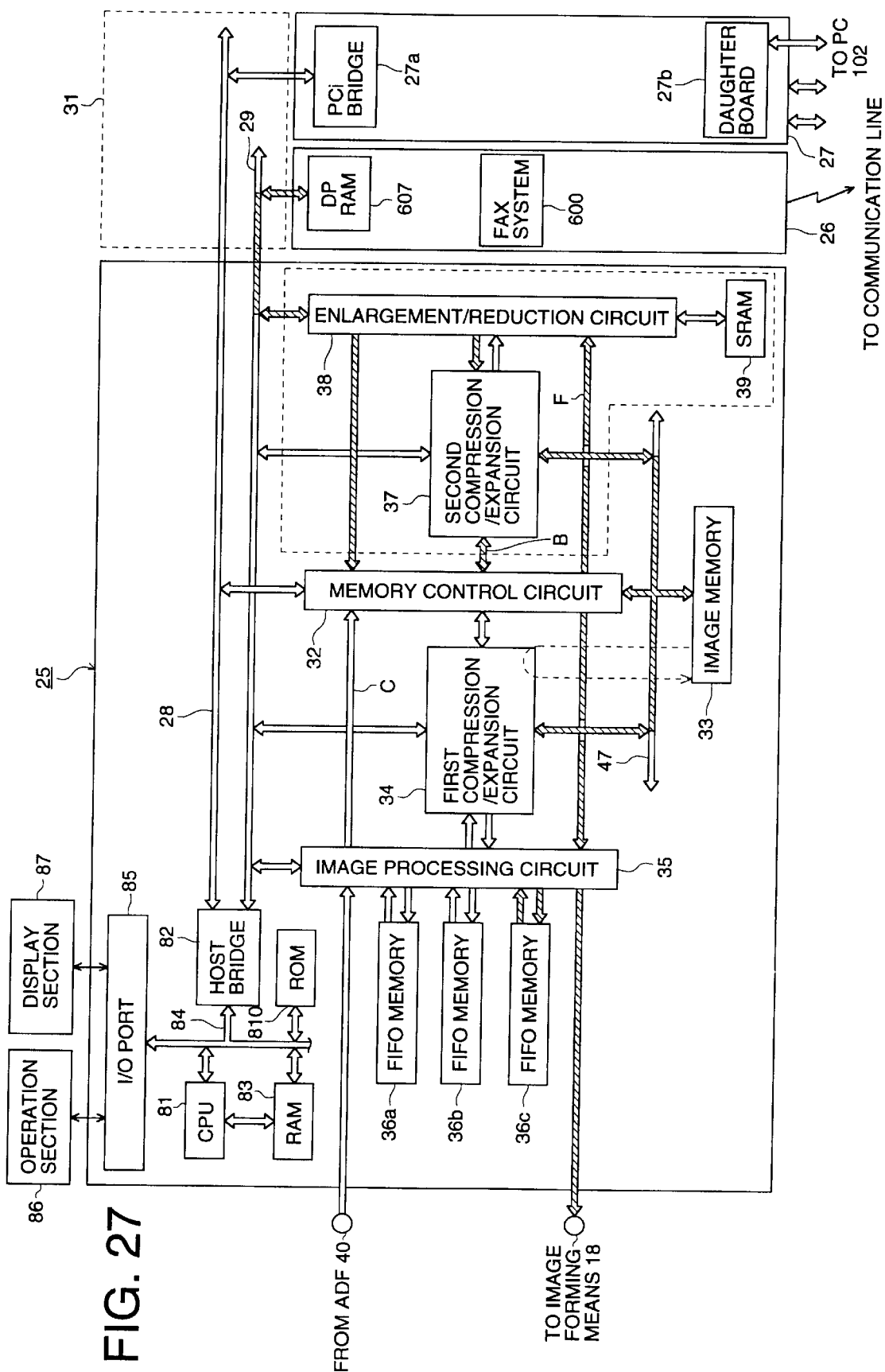
FIG. 27 is a block diagram showing an example of operation (at facsimile reception) of the hybrid machine 200.

FIG. 27 is a block diagram showing an example of operations of the hybrid machine 200 at facsimile reception. In this example, in the FAX substrate 26 connected to the communication line, when "calling" from the remote station is detected by the NCU 601, the modulated signal transferred by the public network is demodulated by the communication modem 602, the digital coded image data after the demodulation is received. In the FAX substrate 26, the reception image data in which the coded image data is decoded and expanded, is obtained, and the reception image data passes through the data bus 29 and outputted to the enlargement and reduction circuit 38. In the enlargement and reduction circuit 38, the reception image data passes through the internal bus B to the compression processing circuit 37. This is for the purpose to receive the reception image data from the remote station without any error.

Accordingly, in the compression and expansion circuit 37, the reception image data is compressed to one page unit, and the image data after the compression is stored in the FAX area 33B of the image memory 33, or the substitute reception area 33C corresponding to the ratio of use of the memory. Then, the image data is read from the image memory 33 to the enlargement and reduction circuit 38, and after the reception image data is subjected to predetermined enlargement and reduction processing, the processed image data is transferred again to the image memory 33.

Then, when the using right of the image forming means 18 is obtained in the facsimile reception function, the compressed image data is read from the image memory 33 to the compression and expansion circuit 34. In the compression and expansion circuit 34, after the compressed image data is expanded, the image data is temporarily stored in the image memory 33, by the control of the memory control circuit 32.

Then, the image data is read from the image memory 33 to the image processing circuit 35, by the control of the memory control circuit 32. In the image processing circuit 35, after predetermined image processing is conducted on the image data, the input/output timing of the image data is adjusted through the FIFO memory 36c. Because the image data is successively read from the FIFO memory 36c to the image forming means 18, the document image can be formed on the recording sheet 30 shown in FIG. 5. Accordingly, the document image sent from the remote station can be printed out.

Figure 28:
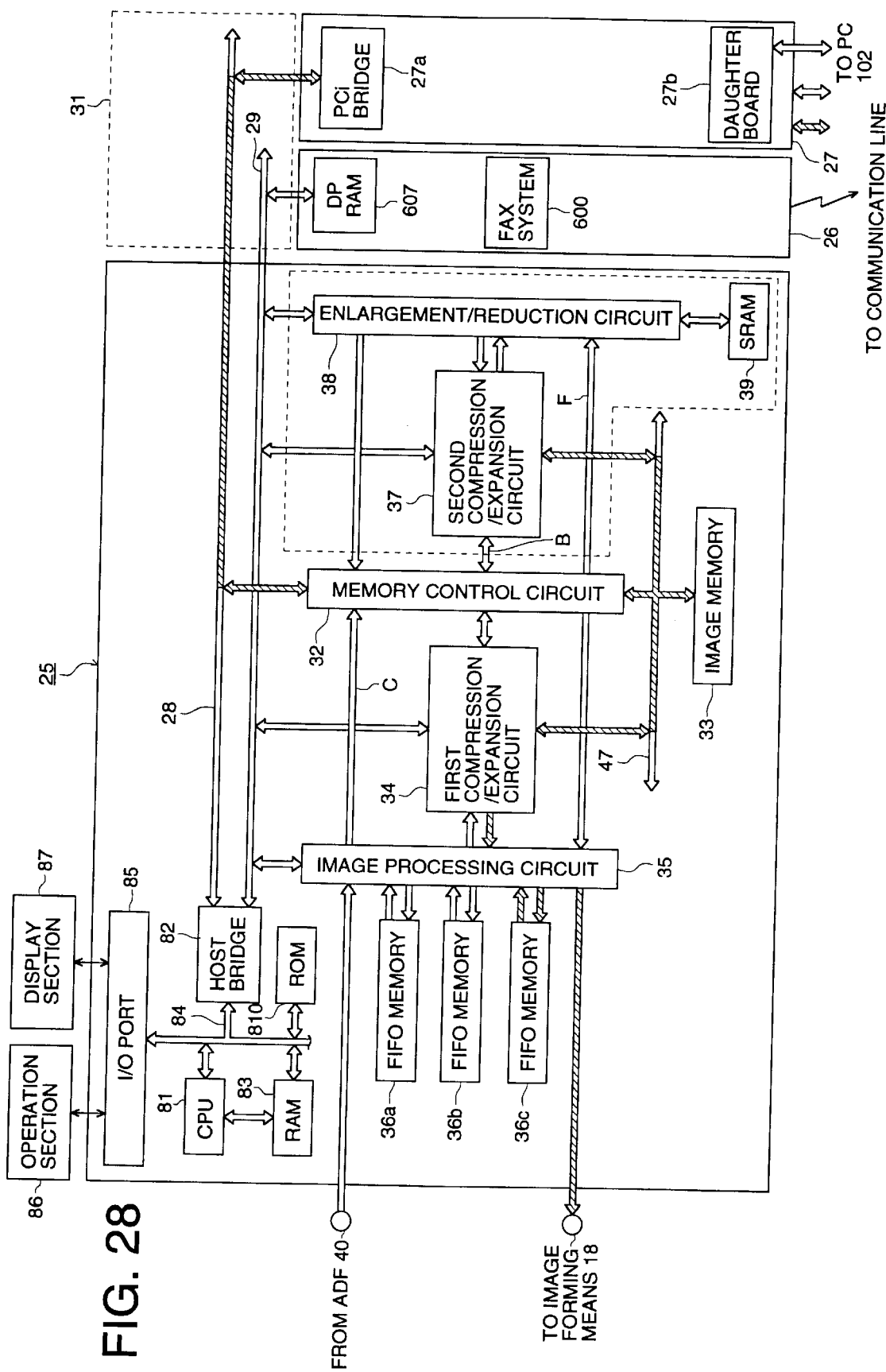
FIG. 28 is a block diagram showing an example of operation (at printing)of the hybrid machine 200.

Next, relating to the print function, a case of print out at the PC communication will be described. FIG. 28 is a block diagram showing an example of operations of the hybrid machine 200 at PC communication.

In this example, the presupposition is that the PC 102 is connected to the PC communication substrate 27. In the case of printout at the PC communication, the PCi bridge 27a of the PC communication substrate 27 requests the host bridge 82 for the use of the image forming means 18 through the data bus 28.

This request of use is noticed from the host bridge 82 to the CPU 81, therefore, the transfer processing of the image data is carried out by being divided into the case where the image forming means 18 is used, and the case where the image forming means 18 is not used. For example, when the image forming means 18 is not busy, the image data received from the PC 102 in the PC communication substrate 27 is transferred to the memory control circuit 32 through the data bus 28, and temporarily stored in the image memory 33, by the control of the memory control circuit 32. After that, the image data is read from the image memory 33 to the compression and expansion circuit 37.

In the compression and expansion circuit 37, the image data from the PC 102 is compressed to one page unit, and the compressed image data is stored in a copy/printer area 33A of the image memory 33 by the control of the memory control circuit 32. After that, in this example, because the image forming means is not busy, the compressed image data is read from the image memory 33 to the compression and expansion circuit 34 by the control of the memory control circuit 32.

In the compression and expansion circuit 34, after the compressed image data is expanded, the expanded image data is transferred to the image processing circuit 35. In the image processing circuit 35, after the predetermined image processing is conducted on the image data, input/output timing of the image data is adjusted through the FIFO memory 36c. The image data is successively read from the FIFO memory 36c to the image forming means 18, therefore, the document image can be formed on the recording sheet 30 shown in FIG. 5. Accordingly, the image data sent from the PC 102 can be printed out.

Further, when the image forming means 18 is used by another job, the image data received from the PC 102 in the PC communication substrate 27, is transferred to the memory control circuit 32 through the data bus 28, and temporarily stored in the image memory 33 by the control of the memory control circuit 32. Then, the image data is read from the image memory 33 to the compression and expansion circuit 37.

In the compression and expansion circuit 37, the image data from the PC 102 is compressed to one page unit, and the compressed image data is stored in a copy/printer area 33A of the image memory 33 by the control of the memory control circuit 32. Then, in the print function, when the using right of the image forming means 18 is obtained, the compressed image data is read from the image memory 33 to the compression and expansion circuit 34.

In the compression and expansion circuit 34, in the same manner as described above, after the compressed image data is expanded, the expanded image data is transferred to the image processing circuit 35. In the image processing circuit 35, after the predetermined image processing is conducted on the image data, input/output timing of the image data is adjusted through the FIFO memory 36c. The image data is successively read from the FIFO memory 36c to the image forming means 18, therefore, the document image can be formed on the recording sheet 30 shown in FIG. 5. Accordingly, when the copy job competes with the print job, by waiting until the image forming means 18 is not busy for the copy job, the image data sent from the PC 102 can be printed out.

As described above, according to the hybrid machine 200 of the present embodiment, because the image memory 33 is used in common to respective functions, when the memory area is not used by any one of the ADF 40, the FAX substrate 26 or the PC communication substrate 27, or although the memory area is used by the ADF 40, the FAX substrate 26 or the PC communication substrate 27, when the rate of use of the memory is low, the empty memory area can be used by the ADF 40, the FAX substrate 26 or the PC communication substrate 27, which is operating now. Accordingly, the image memory 33 can be effectively used. Thereby, a hybrid machine 200 whose operating property is very excellent, can be provided.

Further, in the present embodiment, because the input/output control of the image data can be carried out by the host bridge 82 independently of the CPU 81, even when the ADF 40 writes the image data in the image memory 33, simultaneously, the image data can be stored in the image memory 33 from the PC communication substrate 27. Accordingly, after the control command D1 is given from the CPU 81 to the host bridge 82, the CPU 81 can conducts other data processing such as the communication processing, or the like.

Further, in the present embodiment, because one data bus like as the conventional system, is divided into the data buses 28 and 29, without having concern about the influence of the data processing speed of the PC communication substrate 27, and the FAX substrate 26 including the memory control circuit 32, the DMAC can be introduced into the memory control circuit 32. Accordingly, by proving the DMAC function in the interface control section 68 in the host bridge 82, or the like, an increase of the image data transfer speed can be attained.

(3) The Control Structure of the Multiple Jobs of the Hybrid Machine 200

Figure 29:
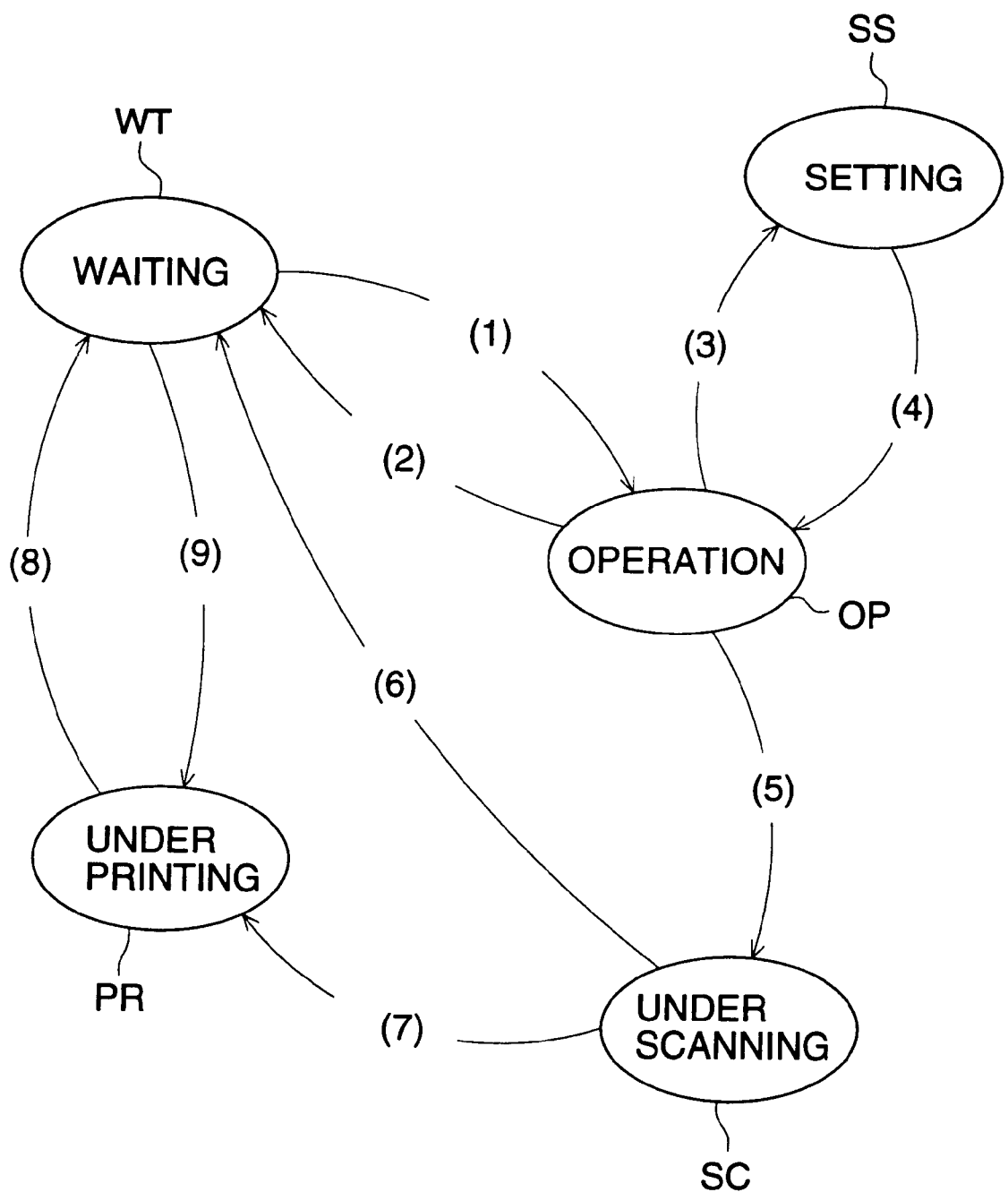
FIG. 29 is a conceptual view showing an example of the control structure of multi-jobs of the hybrid machine 200.

FIG. 29 is a view of the situation transition showing an example of the control structure of multi-jobs of the hybrid machine 200 to which the image forming apparatus as an embodiment of the present invention is applied. In this example, a panel manager function by the CPU 81, RAM 83, and operation section 87, is a center of the description.

That is, in this hybrid machine 200 (the third image forming apparatus), an image based on the image data received by the FAX substrate 26, the image data received by the PC communication substrate 27, or the image data read by the ADF 40, is formed on the recording sheet 30 for one page unit by the image forming means 18.

In the control structure of the multi-job shown in FIG. 29, 4 jobs of the waiting situation (WT), scanning situation (SC) by the image reading means 11 (ADF 40 or the image reading section 50), printing situation (PR) by the image forming means 18, and operation situation (OP) such as interruption copy operation or the like, by the operator, exist. When the setting situation (SS) by the operation section 87 is included therein, total 5 jobs exist in the control structure of the multi-job.

In this example, in the transition example (1) shown in FIG. 29, when application functions are selected, the job is shifted from the waiting situation to the operation situation. In this operation situation, when the stop/clear (OK/cancel) key 908 is pressed in the transition example (2), the job can be returned from the operation situation to the waiting situation. Incidentally, in the operation situation, the setting conditions of the copy operation or facsimile operation can be changed in the transition example (3) by the operation section 87, or in the transition example (4), these setting conditions can be canceled.

In this operation situation, when the start key 911 shown in FIG. 10 is pressed, the job is shifted from the operation situation to the scanning operation in the transition example (5), and the document image can be read by the ADF 40. In the job under this situation, when the scan end (job completion) is selected in the transition example (6), the job is shifted from the scanning situation to the waiting operation, and the operator can wait the image formation by the image forming means 18.

Further, when the printing is started at the situation of completion of the scanning operation in the transition example (7), the job is shifted from the scanning situation to the printing operation, an image can be formed on the recording sheet 30 by the image forming means 18. Under this printing situation, when the print end is selected in the transition example (8), the job is shifted from the printing situation to the waiting operation. Incidentally, in the waiting situation, when the printing is started in the transition example (9), the job is shifted from the waiting situation to the printing operation, and an image can be formed on the recording sheet 30 by the image forming means 18.

Next, the control method of jobs of the hybrid machine 200 will be described. FIGS. 30(a)–30(d) are conceptual views showing examples of transition of the situations of 4 jobs JOB 1 through 4, of the hybrid machine 200.

In this example, maximum 4 jobs are simultaneously exist according to the copy reservation or interrupt copy request, or the like. Accordingly, jobs are controlled as follows:

1. Four pairs of the state class and the copy data class are generated by the constructor of the panel manager, and jobs JOB 1 through 4 are allotted thereto;
2. Each job has a situation transition, and the panel manager distributes the event to each job;
3. The copy reservation is allotted to the job under waiting; and
4. The interrupt copy is allotted to the JOB 4.

Figure 30:
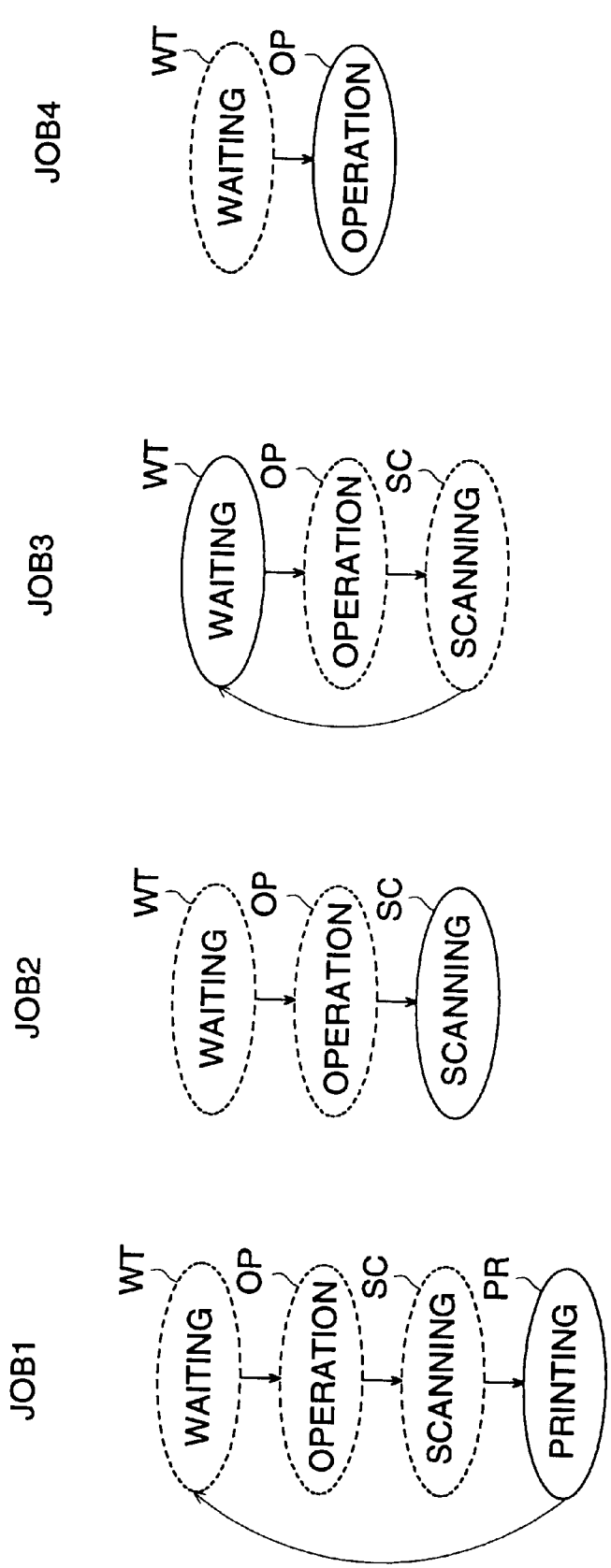
FIG. 30 is a conceptual view showing an example of a transition of each job at multi-jobs of the hybrid machine 200.

In the first job JOB 1, shown in FIG. 30(a), the scanning operation is completed and the printing operation is carried out. When the printing operation is completed in the JOB 1, the job is shifted to the waiting situation. In the second job JOB 2, shown in FIG. 30(b), the scanning operation by the copy reservation is carried out. The JOB 2 which has completed the scanning operation, is returned to the waiting situation. The copy reservation in this case is distributed to the jobs under waiting. In the third job JOB 3, shown in FIG. 30(c), the copy reservation operation is carried out while the JOB 2 is carried out. In the fourth job JOB 4, shown in FIG. 30(d), the interrupt copy reservation operation is carried out while JOB 1 through JOB 3 are carried out.

In order to control these 4 jobs JOB 1 through 4, a plurality of job commands, in which the priority levels by which the image forming means 18 can be used prior to other jobs, are previously determined, are stored in the RAM 83 shown in FIG. 4. In this example, the interrupt copy request by the operator is set to the highest priority level. Accordingly, when the interrupt copy request by the operator occurs, the image forming means 18 can be used for it prior to other jobs.

In this example, the CPU 81 shown in FIG. 4 is the panel manager, and according to the input information (the interrupt copy request by the operator, or operation conditions) by the operation section 87, and the job command by the RAM 83, controls the scanning operation by the ADF 40, the data reception by the PC communication substrate 27 or the FAX substrate 26, and the print operation by the image forming means 18, and carries out the job command.

Next, referring to FIGS. 31–35, an example of situation transition for each job will be described based on an example of the data input under printing. In this example, cases of the single copy operation, the copy reservation under printing (patterns 1 through 3), and the interrupt copy operation during the copy reservation under printing, will be described.

Figure 31:
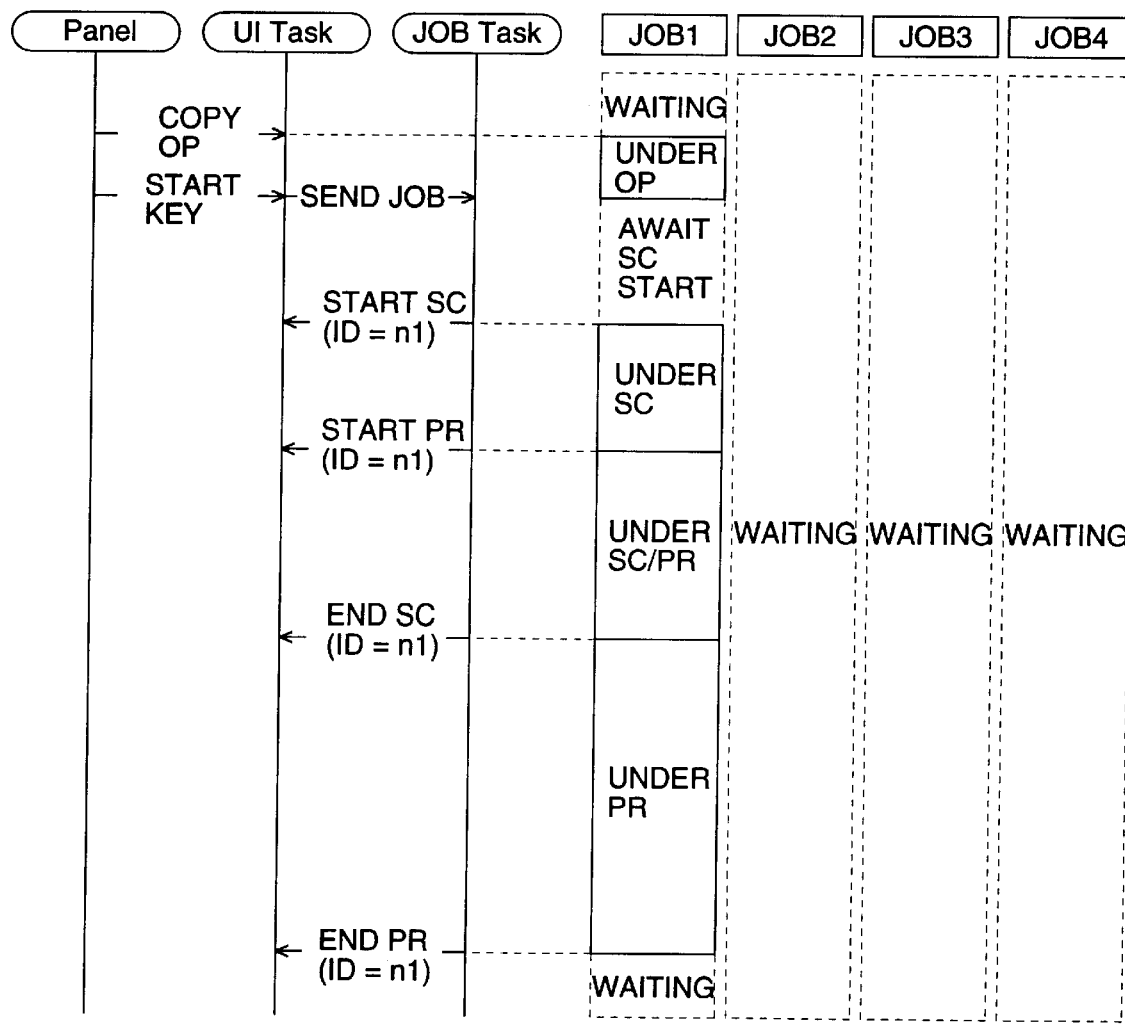
FIG. 31 is a conceptual view showing an example of a transition of a condition (at a single copy operation) of each job of the hybrid machine 200.

FIG. 31 is a conceptual view showing an example of situation transition for each job (at the single copy operation) of the hybrid machine 200. In FIG. 31, "Panel" shows the panel manager, "UI Task" shows the panel control section, and "JOB Task" shows the job control section. Hereinafter, in FIG. 32–FIG. 35, this is the same as the above.

The situation transition at the single copy operation shown in FIG. 31 is a case where there is no copy reservation, and for example, a case where one set (ID=n1) of a plurality of pages of documents are read and images are formed on the recording sheets 30, is assumed. In this case, the JOB 2 through 4 are in waiting situations. Accordingly, when the panel manager conducts copy operation on the UI task, the job is shifted from the waiting situation to the operation situation (under operation) in JOB 1. Then, when the panel manager operates start key of the UI task, the job is put in from the UI task to the JOB task, and the job is shifted from the operation situation to the scanning situation, and is made to be in a situation waiting the scan start.

Then, after a predetermined period of time passes, when the scan start of the document image of ID=n1 is noticed from the JOB task to the UI task, the job is shifted to the scan situation (under scanning) in the JOB 1. One set of document images can be successively read by the ADF 40. Then, when one page of the document image is obtained, the print start of the document image of ID=n1 is noticed from the JOB task to the UI task. In the JOB 1, the print operation is added to the scanning operation. Herein, the image formation onto the recording sheet 30 by the image forming means 18 is started.

After that, when the reading of all of the document images has been completed, the scan end of the document image of ID=n1 is noticed from the JOB task to the UI task. In the JOB 1, only print operation is conducted. Then, when the image formation of all of the documents has been completed, the print end of the document image of ID=n1 is noticed from the JOB task to the UI task. According to that, the JOB 1 is in the waiting situation, and one set of documents without copy reservation can be copied.

Figure 32:
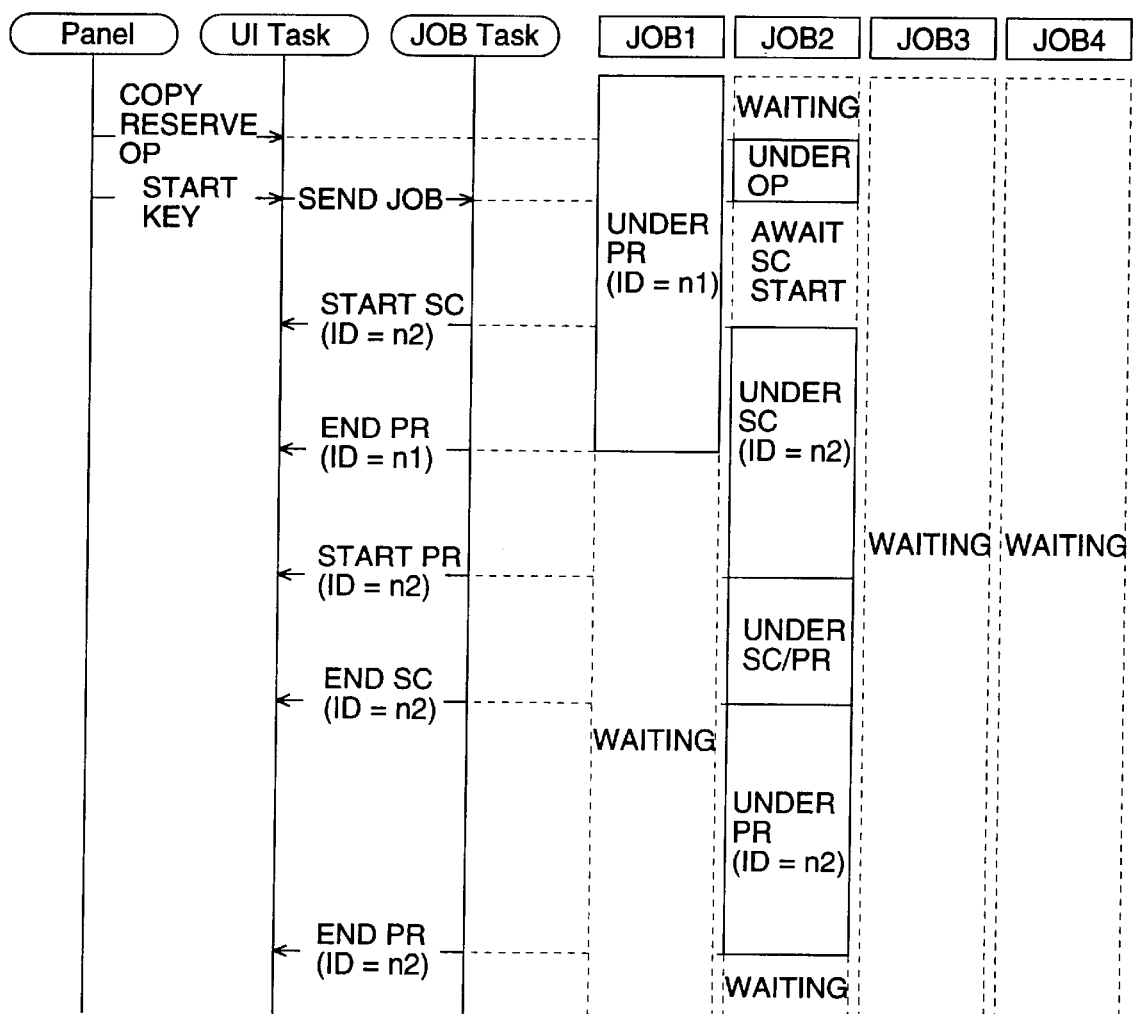
FIG. 32 is a conceptual view showing an example of a transition of a condition (a copy reserve 1 under printing) of each job of the hybrid machine 200.

FIG. 32 is a conceptual view showing an example of situation transition of copy reservation under printing (pattern 1) of the hybrid machine 200. In this example, a case where, when the document image of a plurality of document sheets of the first set (ID=n1) is formed, the next document image of a plurality of document sheets of the second set (ID=n2) is read and the image is formed on the recording sheet 30, is assumed. In this case, the JOB 3 and JOB 4 are in the waiting situation.

For example, while the document image of the first set (ID=n1) is printed in the JOB 1, when the panel manager conducts the copy reservation operation on the UI task to reserve the copy of the document of the second set, the job is shifted from the waiting situation to the operation situation (under operating). After that, when the panel manager operates the start key with respect to the UI task, the job is put in from the UI task to the JOB task, and the job is shifted from the operation situation to the scanning situation, and is made to be in the situation waiting the scan start.

Then, after a predetermined period of time passes, when the scan start of the document image of ID=n2 is noticed from the JOB task to the UI task, the job is in the scanning situation (under scanning) in the JOB 2. According to that, the document images of the second set can be successively read by the ADF 40. On the other hand, when the image formation of all document images of the first set has been completed, the print end of the document image of ID=n1 is noticed from the JOB task to the UI task. Thereby, the JOB 1 is in the waiting situation.

Then, when the first page document image of the second set is obtained, the print start of the document image of ID=n2 is noticed from the JOB task to the UI task. In JOB 2, the print operation is added to the scanning operation. Herein, the image formation of the first page document of the second set onto the recording sheet 30 by the image forming means 18 is started.

After that, when the reading of all of the document images of the second set has been completed, the scan end of the document image of ID=n2 is noticed from the JOB task to the UI task. In the JOB 2, only print operation is conducted. Then, when the image formation of all of the document images has been completed, the print end of the document image of ID=n2 is noticed from the JOB task to the UI task. According to that, the JOB 2 is in the waiting situation, and the document image of the second set can be copied following the copy of the document image of the first set.

Figure 33:
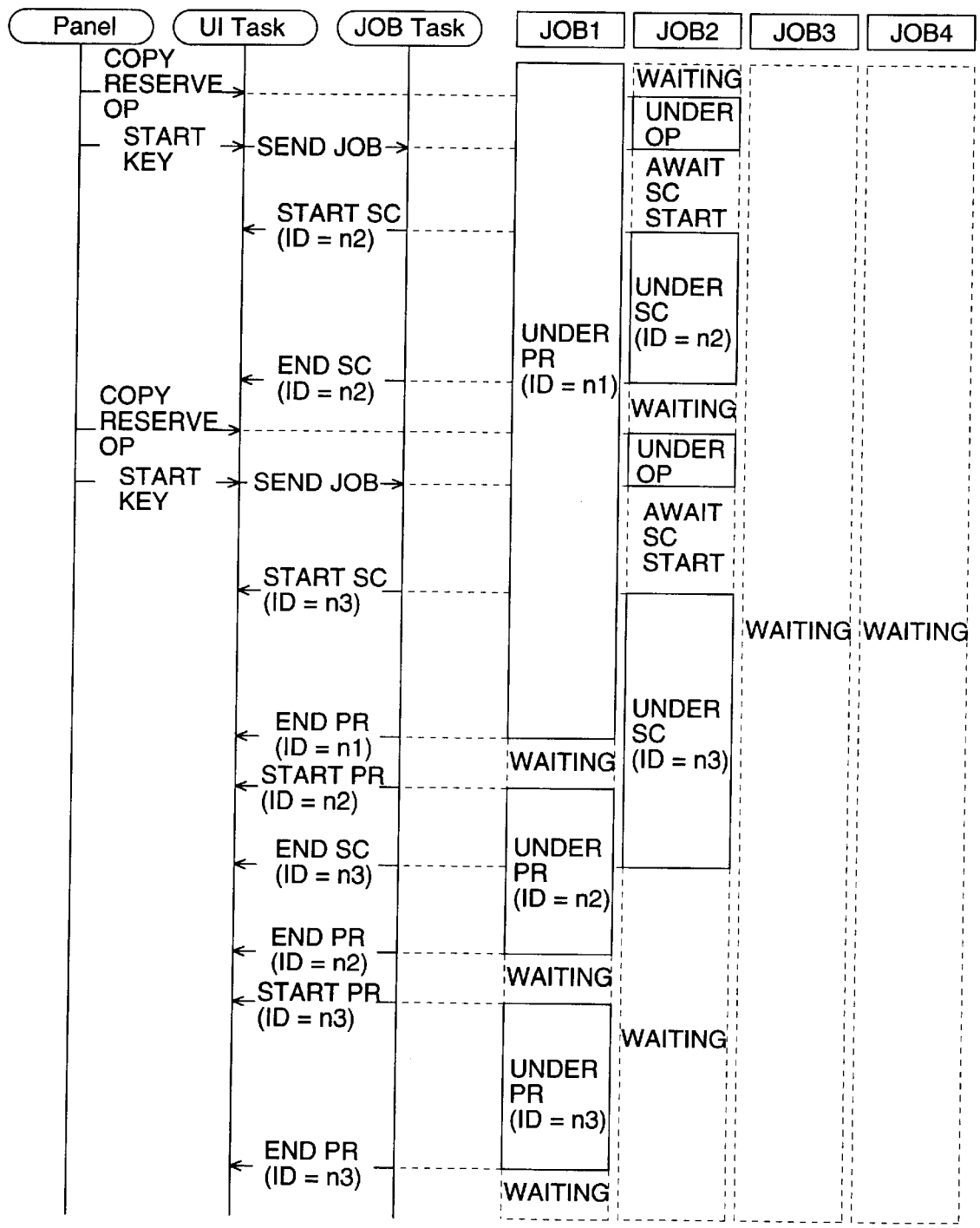
FIG. 33 is a conceptual view showing an example of a transition of a condition (a copy reserve 2 under printing) of each job of the hybrid machine 200.

FIG. 33 is a conceptual view showing an example of situation transition of copy reservation under printing (pattern 2) of the hybrid machine 200. In this example, a case where, when the document image of a plurality of document sheets, which is a large number of sheets, of the first set (ID=n1) is formed, next, the document image of a plurality of document sheets of the second set (ID=n2) is read and the image is formed on the recording sheet 30, and further, consecutively, the next document image of the third set (ID=n3) is read and the image is formed on the recording sheet 30, is assumed. Also in this case, the JOB 3 and JOB 4 are in the waiting situation. The copy reservation job is registered in the FIFO memory queue, and printed out in order of the reservation.

For example, while the document image of the first set (ID=n1) is printed in the JOB 1, when the panel manager conducts the copy reservation operation on the UI task to reserve the copy of the document of the second set, the job is shifted from the waiting situation to the operation situation (under operating). After that, when the panel manager operates the start key with respect to the UI task, the job is put in from the UI task to the JOB task, and the job is shifted from the operation situation to the scanning situation, and is made to be in the situation waiting the scan start.

Then, after a predetermined period of time passes, when the scan start of the document image of ID=n2 is noticed from the JOB task to the UI task, the JOB 2 is in the scanning situation (under scanning). According to that, the document images of the second set can be successively read by the ADF 40.

On the one hand, in this example, because the document of the first set is so many that the image formation of all of the document images is not completed, the print operation of the document image of ID=n1 is continued in the JOB 1. On the other hand, when all of the document images of the second set has been read in the JOB 2, the scan end of the document image of ID=n2 is noticed from the JOB task to the UI task.

After that, when the panel manager conducts the copy reservation operation on the UI task to reserve the copy of the document of the third set, the job is shifted from the waiting situation to the operation situation (under operating) in JOB 2. After that, when the panel manager operates the start key with respect to the UI task, the job is put in from the UI task to the JOB task, and the job is shifted from the operation situation to the scanning situation, and is made to be in the situation waiting the scan start.

Then, after a predetermined period of time passes, when the scan start of the document image of ID=n3 is noticed from the JOB task to the UI task, the job is in the scanning situation (under scanning) in the JOB 2. The document images of the third set can be successively read by the ADF 40.

On the other hand, when the image formation of all document images of the first set has been completed, the print end of the document image of ID=n1 is noticed from the JOB task to the UI task. In the JOB 1, after a predetermined period of time of waiting situation, because the first page document image of the second set has been already obtained, the print start of the document image of ID=n2 is noticed from the JOB task to the UI task. Thereby, the copy of the document image of the second set can be started following the copy of the document image of the first set.

On the other hand, when the reading of the document image of the third set has been completed in the JOB 2, the scan end of the document image of ID=n3 is noticed from the JOB task to the UI task. Thereafter, the JOB 2 is in the waiting situation.

After the scan end of the document image of ID=n3 is noticed, when the image formation of all of the document images of the second set has been completed, the print end of the document image of ID=n2 is noticed from the JOB task to the UI task. In the JOB 2, after a predetermined period of time of the waiting situation, the print start of the document image of ID=n3 is noticed from the JOB task to the UI task. In the JOB 1, the image formation onto the recording sheet 30 by the image forming means 18 of the document of the third set is started. Then, when the image formation of all of the document images of the third set has been completed, the print end of ID=n3 is noticed from the JOB task to the UI task. According to that, the JOB 1 is in the waiting situation, and the document of the second set and the document of the third set can be continuously copied following the copy of the first set.

Figure 34:
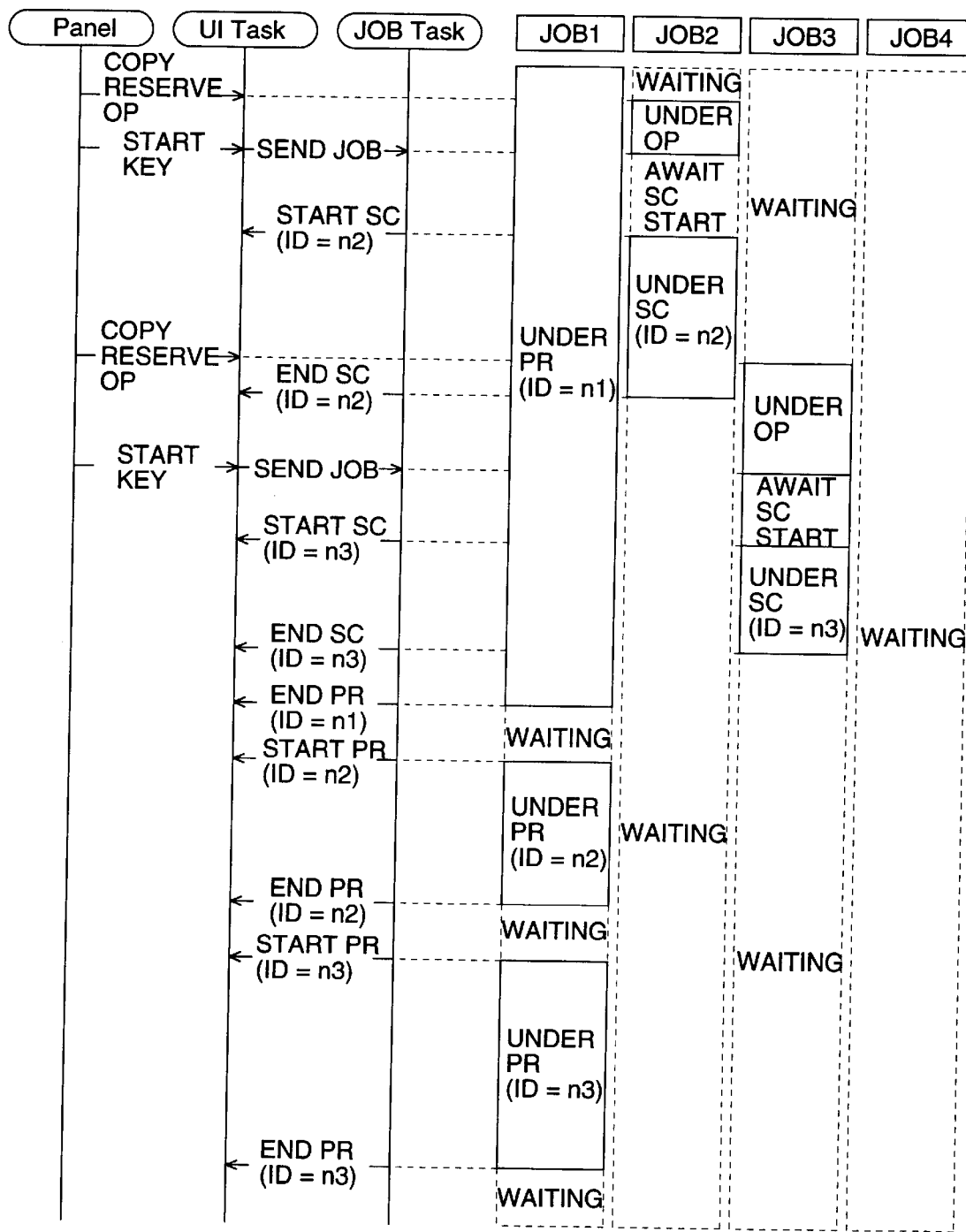
FIG. 34 is a conceptual view showing an example of a transition of a condition (a copy reserve 3 under printing) of each job of the hybrid machine 200.

FIG. 34 is a conceptual view showing an example of situation transition of copy reservation under printing (pattern 3) of the hybrid machine 200. In this example, a case where, when the document image of a plurality of document sheets, which is a large number of sheets, of the first set (ID=n1) is formed, next, the document image of the second set (ID=n2) is read and the image is formed on the recording sheet 30, and further, consecutively, the next document image of the third set (ID=n3) is read and the image is formed on the recording sheet 30, is assumed.

In this case, it is a presupposition that the document is set on the ADF 40 during the time from the copy reservation operation to the pressing of the start key. In this case, the JOB 1 through 3 are used, and only the JOB 4 is in the waiting situation. The copy reservation job is registered in the FIFO memory queue, and printed out in order of the reservation.

For example, while the document image of the first set (ID=n1) is printed in the JOB 1, when the panel manager conducts the copy reservation operation on the UI task to reserve the copy of the document of the second set, the job is shifted from the waiting situation to the operation situation (under operating) in the JOB 2. After that, when the panel manager operates the start key with respect to the UI task, the job is put in from the UI task to the JOB task, and the job is shifted from the operation situation to the scanning situation, and is made to be in the situation waiting the scan start.

Then, after a predetermined period of time passes, when the scan start of the document image of ID=n2 is noticed from the JOB task to the UI task, the JOB 2 is in the scanning situation (under scanning). The document images of the second set can be successively read by the ADF 40.

On the one hand, also in this example, because the document of the first set is so many that the image formation of all of the document images is not completed, the print operation of the document image of ID=n1 is continued in the JOB 1. On the other hand, when reading of the document images of the second set is continued in the JOB 2. Accordingly, the copy of the document image of the third set can not be set to the JOB 2.

Accordingly, in this example, the copy operation does not wait until the reading of the document image in JOB 2 is completed, but uses the JOB 3. Accordingly, when the panel manager conducts the copy reservation operation on the UI task to reserve the copy of the document of the third set, the job is shifted from the waiting situation in the JOB 3 to the operation situation (under operating), and the reservation of the third set can be set. During this, when the reading of the document image of the second set is completed in the JOB 2, the scan end of the document image of ID=n2 is noticed from the JOB task to the UI task. The JOB 2 is in the waiting situation.

Accordingly, when the panel manager operates the start key with respect to the UI task, the job is put in from the UI task to the JOB task, and the job is shifted from the operation situation to the scanning situation, and is made to be in the situation waiting the scan start.

Then, after a predetermined period of time passes, when the scan start of the document image of ID=n3 is noticed from the JOB task to the UI task, the JOB 3 is in the scanning situation (under scanning). The document images of the third set can be successively read by the ADF 40.

On one hand, because the document of the one set is so many that all of its image formation is not yet completed, when reading of all of the document images of ID=n3 is completed in the JOB 3, the scan end of the document image of ID=n3 is noticed from the JOB task to the UI task. The JOB 3 is in the waiting situation.

After that, in JOB 1, when the image formation of all of the document of the first set has been completed, the print end of the document image of ID=n1 is noticed from the JOB task to the UI task. In the JOB 1, after a predetermined period of time of the waiting situation, because the first page document image of the second set is already obtained, the print start of the document image of ID=n2 is noticed from the JOB task to the UI task. According to that, the copy of the document image of the second set can be conducted following the copy of the document image of the first set.

When the image formation of all of the document images of the second set has been completed, the print end of the document image of ID=n2 is noticed from the JOB task to the UI task. In the JOB 2, after a predetermined period of time of the waiting situation, the print start of the document image of ID=n3 is noticed from the JOB task to the UI task. In the JOB 1, the image formation onto the recording sheet 30 by the image forming means 18 of the document of the third set is started. Then, when the image formation of all of the document images of the third set has been completed, the print end of ID=n3 is noticed from the JOB task to the UI task. According to that, the JOB 1 is in the waiting situation, and the document of the second set and the document of the third set can be continuously copied following the copy of the first set.

Figure 35:
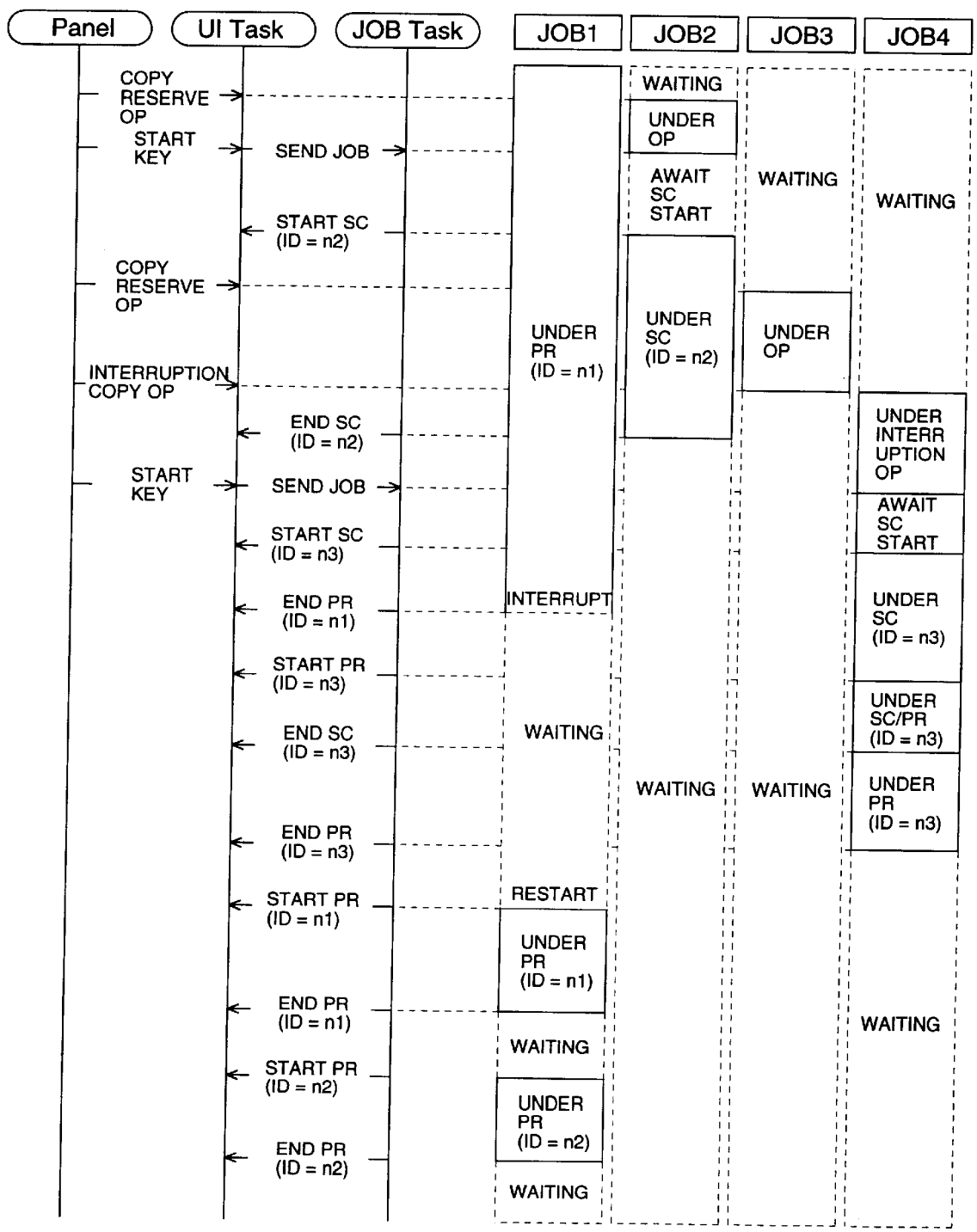
FIG. 35 is a conceptual view showing an example of a transition of a condition (an interrupt operation under printing) of each job of the hybrid machine 200.
Figure 36:
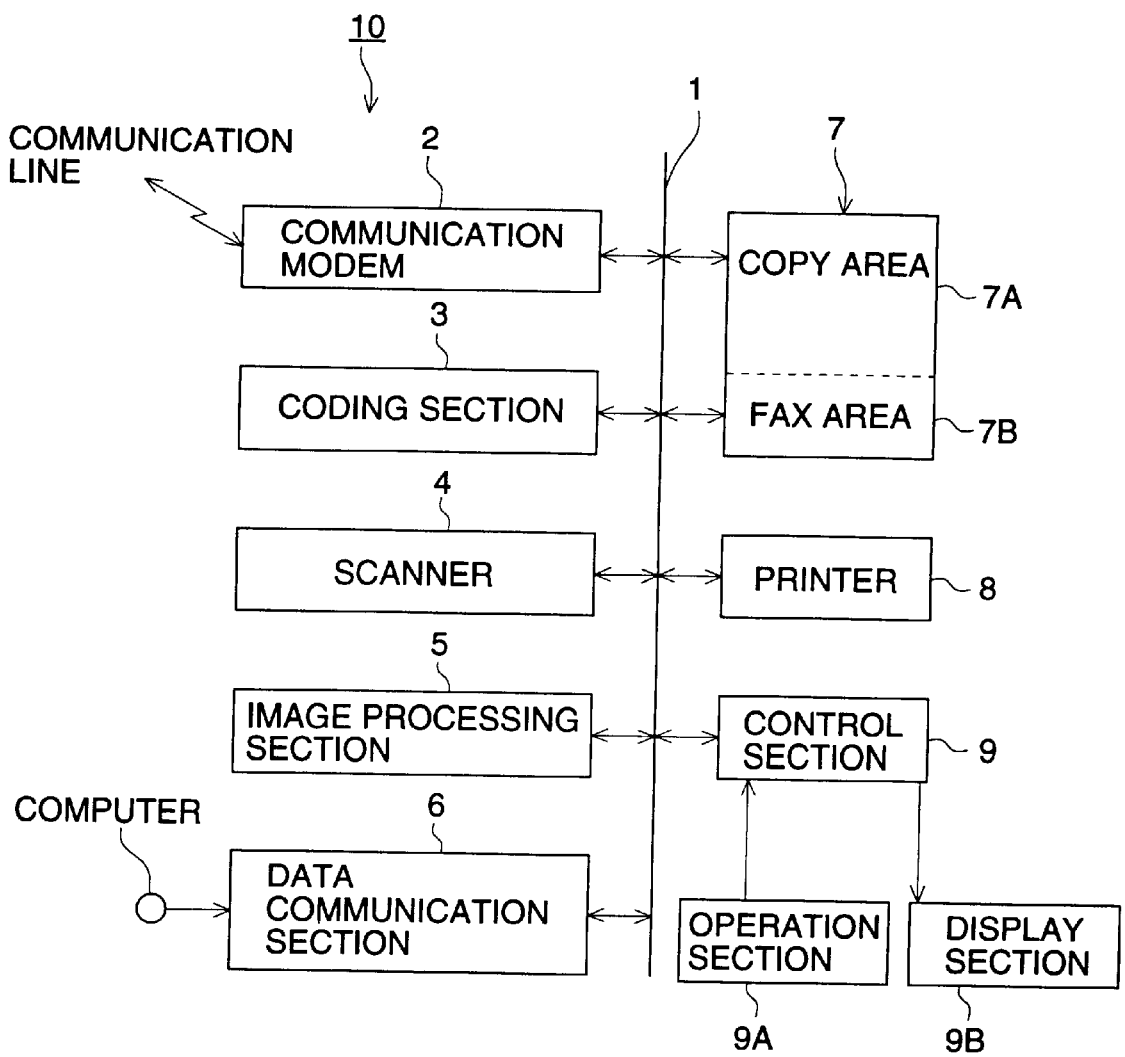
FIG. 36 is a block diagram showing an example of the structure of the conventional hybrid machine 10.

FIG. 35 is a conceptual view showing an example of situation transition of a case where the interrupt copy operation is conducted during the copy reservation under printing of the hybrid machine 200. In this example, a case where, when the document image of the first set (ID=n1), which is a large number of sheets, is formed, next, the copy reservation of the document image of the second set (ID=n2) is made, and then, at the time when the copy reservation operation of the document image of the second set (ID=n3) is started, but the copy of the document of the first set has not yet completed, the copy of the document of the third set is necessary, is assumed.

Also in this example, it is a presupposition that the document is set on the ADF 40 during the time from the copy reservation operation to the pressing of the start key. In this case, the JOB 1–4 are used. The copy reservation job is registered in the FIFO memory queue, and printed out in order of the reservation.

For example, while the document image of the first set (ID=n1) is printed in the JOB 1, when the panel manager conducts the copy reservation operation on the UI task to reserve the copy of the document of the second set, the job is shifted from the waiting situation to the operation situation (under operating) in the JOB 2. After that, when the panel manager operates the start key with respect to the UI task, the job is put in from the UI task to the JOB task, and the job is shifted from the operation situation to the scanning situation, and is made to be in the situation waiting the scan start.

Then, after a predetermined period of time passes, when the scan start of the document image of ID=n2 is noticed from the JOB task to the UI task, the JOB 2 is in the scanning situation (under scanning). The document images of the second set can be successively read by the ADF 40.

On the one hand, also in this example, because the document of the first set is so many that the image formation of all of the document images is not completed, the print operation of the document image of ID=n1 is continued in the JOB 1. On the other hand, when reading of the document images of the second set is continued in the JOB 2. Accordingly, the copy of the document image of the third set can not be set to the JOB 2.

Accordingly, also in this example, the copy operation does not wait until the reading of the document image in JOB 2 is completed, but uses the JOB 3. Accordingly, when the panel manager conducts the copy reservation operation on the UI task to reserve the copy of the document of the third set, the job is shifted from the waiting situation in the JOB 3 to the operation situation (under operating).

Incidentally, in this example, the copy of the document of the third set is not normal copy reservation, but, by the operator's request, because the copy used the image forming apparatus 18 is urgently necessary, the panel manager conducts the interrupt copy operation on the UI task. Concretely, by the CPU 81, the copy is temporarily stopped at the period of the proper page, and the content of the RAM 33 is confirmed. Then, the job command having the higher priority level in a plurality of job commands read from the RAM 83, is executed.

In this example, because the copy request by the operator has the highest priority level, at this time, the copy reservation operation of the JOB 3 is interrupted. Accordingly, the copy of the document image of the third set of the JOB 3 can not be set. Accordingly, the job is shifted from the waiting situation to the operation situation (under interrupt operation). In this example, after the JOB 4 is shifted to the operation situation, because the reading of the document image of the second set is completed in JOB 2, the scan end of the document image of ID=n2 is noticed from the JOB task to the UI task. The JOB 2 is in the waiting situation.

After that, when the panel manager operates the start key with respect to the UI task, the job is put in from the UI task to the JOB task, and the job is shifted from the operation situation to the scanning situation, and is made to be in the situation waiting the scan start. Then, after a predetermined period of time passes, when the scan start of the document image of ID=n3 is noticed from the JOB task to the UI task, the JOB 4 is in the scanning situation (under scanning). The document images of the third set can be successively read by the ADF 40.

After that, in JOB 1, the copy of all of the document of the first set has not been completed, but the copy operation is temporarily stopped at a pause of the proper page, and the copy end of the document image of ID=n1 is temporarily noticed from the JOB task to the UI task. The JOB 1 is temporarily in the waiting situation. In the JOB 1, because the first page document image of the third set is already obtained, the print start of the document image of ID=n3 is noticed from the JOB task to the UI task. According to that, in the JOB 4, the copy of the document image of the third set can be started following the copy of the document image of the first set of the JOB 1.

After that, when the reading of all of the document images of the third set has been completed, the scan end of the document image of ID=n3 is noticed from the JOB task to the UI task. In the JOB 4, only print operation is conducted. Then, in the JOB 4, when the image formation of all of the document images of the third set has been completed, the print end of the document image of ID=n3 is noticed from the JOB task to the UI task. The JOB 4 is in the waiting situation.

After that, in the JOB 1, after a predetermined period of time of the waiting situation, in order to print the document image of the remaining first set, the print start of the document image of ID=n1 is noticed from the JOB task to the UI task. In the JOB 1, the image formation of the document of the first set onto the recording sheet 30 by the image forming means 18 is re-started. Then, in the JOB 1, when the image formation of all of the document of the first set has been completed, the print end of the document image of ID=n1 is noticed from the JOB task to the UI task.

In this JOB 1, after a predetermined period of time of the waiting situation, the print start of the document image of ID=n2 is noticed from the JOB task to the UI task. In the JOB 1, the image formation of the document of the second set onto the recording sheet 30 by the image forming means 18 is started. Then, when the image formation of all of the document of the second set has been completed, the print end of the document image of ID=n2 is noticed from the JOB task to the UI task.

According to that, the JOB 1 is in the waiting situation, and after, between the copy of the document of the first set and the remaining copy of the document of the first set, the interrupt copy of the document of the third set is conducted, consecutively, the remaining copy of the document image of the first set and the document of the second set can be continuously copied.

As described above, according to the hybrid machine 200 to which the image forming apparatus as the present example is applied, when the job command to image form a plurality of pages is executed, because the priority level of the job command in the RAM 83 is confirmed every time when the image formation of one page based on the job command has been completed, when the interrupt request for the image forming means 18 occurs, the image forming means 18 can be used by the job with the highest priority level.

According to that, when the interrupt copy request with the higher priority level to the conducting job now, occurs by the operator, the interrupt copy job by the operator can be carried out prior to other copy processing. Accordingly, such a hybrid machine that the interrupt copy request of the operator is the highest priority level, can be structured. Further, in also the compounded operations such as the copy printer interruption under the FAX reception, and the copy interruption under the printer reception, the same control is carried out.

As described above, according to the image forming apparatus of the present invention, for each function realized by the combination of the facsimile means and the image memory, the image forming means can be used based on a predetermined priority level.

According to this structure, when the copy function competes with the printer function, the image forming means can be used for the copy function prior to the other, and the image data by the data communication means can be temporarily stored in the image memory. Further, when the copy function competes with the facsimile function, the image forming means is used for the copy function prior to the other, and the image data received from the remote station by the facsimile means can be temporarily stored in the image memory. When the print function competes with the facsimile function, the image forming means can be used based on a predetermined priority level.

Accordingly, the image formation and the image communication can be carried out under image reading, or the image reading and the image communication can be carried out under image forming, or the image reading and the image formation can be carried out under image communication. Together with this, because the image memory can be effectively used, thereby, the hybrid machine in which the operating property is excellent, can be structured.

What is claimed is:
1. An image forming apparatus comprising:
 (a) an image reading means for reading an image of a document to obtain image data;
 (b) a data communication means connected with a computer for receiving an image data from the computer;
 (c) a facsimile means connected with a telephone line for receiving an image data through the telephone line;
 (d) an image memory for storing the image data obtained through the image reading means, the image data obtained through the data communication means, and the image data obtained through the facsimile means;
 (e) an image memory control means for mediating an access to the image memory in a predetermined priority order for storing and reading the image data among the image reading means, the data communication means, and the facsimile means; and
 (e) an image forming means for forming the image according to the image data controlled by the image memory control means.

2. The image forming apparatus of claim 1,
 wherein when a facsimile receiving function by the facsimile means, a copying function by the image reading means or a printing function by the data communication means is requested simultaneously, the image forming means forms the image in the predetermined priority order of the image memory control means.

3. The image forming apparatus of claim 1, wherein when a copying function accomplished by the image reading means, the image memory and the image forming means conflicts with a printing function accomplished by the data communication means, the image memory and the image forming means, the image forming means is made to be preferentially used for the copying function, the image data obtained through the data communication means is stored temporarily in the image memory.

4. The image forming apparatus of claim 1, wherein when a copying function accomplished by the image reading means, image memory and image forming means conflicts with a facsimile receiving function accomplished by the facsimile means, the image memory and the image forming means, the image forming means is made to be preferentially used for the copying function, the image data is received through the facsimile means from a remote station and temporarily stored in the image memory.

5. The image forming apparatus of claim 1, wherein when a printing function accomplished by the data communication means, the image storing means and the image forming means conflicts with a facsimile receiving function accomplished by the facsimile means, image storing means and the image forming means, the image forming means is made to be used for a function having a high order of priority which has been preset, and the image data obtained through a function having a low order of priority is temporarily stored in the image storing means.

6. The image forming apparatus of claim 1 further comprising:
 a first compressing means for compressing the image data obtained through the image reading means,
 a second compressing means for compressing the image data obtained through the facsimile means, and
 an expanding means for expanding the compressed image data read from the image memory,
 wherein the compressed image data compressed by the first compressing means or the second compressing means is stored in the memory, and the image forming means conducts an image formation according to image data expanded by the expanding means.

7. The image forming apparatus of claim 6, wherein after the image data obtained through the data communication means is temporarily stored in the image memory, is read from the image memory, is compressed by either first compressing means or the second compressing means, and then is stored again in the image memory.

8. The image forming apparatus of claim 6, wherein after the image data obtained through the data communication means is temporarily stored in the image memory, is read from the image memory, is compressed by either first compressing means or the second compressing means, is processed in terms of image rotation and then is stored again in the image memory.

9. The image forming apparatus of claim 1, wherein the image memory is divided into a plurality of areas where the image data obtained through the image reading means, the image data obtained through the data communication means, and the image data obtained through the facsimile means are stored in respective areas in the image memory.

* * * * *